US011184338B2

(12) United States Patent
Chaum

(10) Patent No.: US 11,184,338 B2
(45) Date of Patent: *Nov. 23, 2021

(54) PRECOMPUTED AND TRANSACTIONAL MIXING

(71) Applicant: David Chaum, Sherman Oaks, CA (US)

(72) Inventor: David Chaum, Sherman Oaks, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 16/439,863

(22) Filed: Jun. 13, 2019

(65) Prior Publication Data

US 2019/0297062 A1 Sep. 26, 2019

Related U.S. Application Data

(63) Continuation of application No. 15/558,267, filed as application No. PCT/IB2016/002027 on Mar. 14, 2016, now Pat. No. 10,375,042.

(Continued)

(51) Int. Cl.
| | |
|---|---|
| *H04L 29/06* | (2006.01) |
| *G09C 1/00* | (2006.01) |
| *H04L 9/00* | (2006.01) |
| *G06F 21/62* | (2013.01) |
| *H04L 9/14* | (2006.01) |
| *G06Q 20/38* | (2012.01) |

(52) U.S. Cl.
CPC ...... *H04L 63/0471* (2013.01); *G06F 21/6263* (2013.01); *G09C 1/00* (2013.01);
(Continued)

(58) Field of Classification Search
CPC .......... H04L 63/0471; G06F 21/6263
(Continued)

(56) References Cited

U.S. PATENT DOCUMENTS

| 6,598,163 B1 | 7/2003 | Jakobsson |
| 2002/0026345 A1 | 2/2002 | Juels |
| 2003/0009687 A1* | 1/2003 | Ferchau ............ G06F 21/57 726/22 |

OTHER PUBLICATIONS

Danezis, G. et al., "Sphinx: A Compact and Provably Secure mix Format", proceedings of 2009 30$^{th}$ IEEE Symposium on Security and Privacy, Aug. 18, 2009, 14 pages.
(Continued)

*Primary Examiner* — Anthony D Brown
(74) *Attorney, Agent, or Firm* — Clark & Brody LP

(57) ABSTRACT

Precomputed and transactional mixing is believed to allow portable devices, such as smart phones, to send and receive messages, with little extra bandwidth or battery usage, while achieving anonymity for senders and recipients among all messages sent globally in batches defined by short time intervals. To learn anything about which inputs correspond with which outputs of such a batch of messages, the entire cascade of mix devices, each preferably operating independently in a different country, would it is believed have to be compromised.

None of the real-time computation, neither by the mixes nor smartphones, uses full public-key operations—resulting it is believed in orders of magnitude performance improvement over previously-known systems.

Aspects include untraceable return addresses, group chat, feed-following and large payloads. Transaction protocols include a variety of payments use cases. Limited anonymity and credential mechanism are based on a new approach to user identification disclosed, in which each user provides a small amount of different identifying information to each mix node, so that comparatively little is revealed to each node individually.

16 Claims, 44 Drawing Sheets

Related U.S. Application Data

(60) Provisional application No. 62/133,456, filed on Mar. 15, 2015.

(52) U.S. Cl.
CPC ............... *H04L 9/008* (2013.01); *H04L 9/14* (2013.01); *H04L 63/045* (2013.01); *H04L 63/0421* (2013.01); *H04L 63/0435* (2013.01); *G06Q 20/3829* (2013.01); *G06Q 2220/00* (2013.01); *H04L 2209/12* (2013.01); *H04L 2209/42* (2013.01)

(58) Field of Classification Search
USPC ........................................................ 713/153
See application file for complete search history.

(56) References Cited

OTHER PUBLICATIONS

Berthold O. et al., "We MIXes: A system for anonymous and unobservable Internet access", Preproceedings of the Workshop on Design issues on Anonymity and Unobservability, International Computer Science Institute, Berkeley, California, Jul. 25-26, 2000, pp. 101-115.

Jakobsson M. et al., "Millimix: Mixing in Small Batches", 1999 Technical Report Center for Discrete Mathematics & Theoretical Computer Science, ACM Digital Library, 14 pages, retrieved from the Internet Nov. 17, 2017, URL: https://people.csail.mit.edu/rivest/voting/papers/JakobssonJuels-Millimix.ps.

Ben Adida et al., "Offline/Online Mixing", Harvard, Center for Research on Computation and Society, vol. 4596, p. 484-495, Jan. 1, 2007.

George Danezis et al., "Sphinx: A Compact and Provably Secure Mix Format", International Association for Cryptologic Research, vol. 20081118:204739, Nov. 10, 2008, pp. 1-14, XP061003036.

Carlos A. Melchor et al., "pMIX: Untraceability for Small Hiding Groups", Network Computing and Applications, Fourth IEEE International Symposiu M on Cambridge, MA, USA Jul. 27-29, 2005. XP010870636.

David A. Cooper et al., "Preserving privacy in a network of mobile computers", Security and Privacy, 1995. Proceedings., 1995 IEEE Symposium on Oakland, CA, USA, May 8, 1995, XP010138198

Lu, Tian-bo et al., "Research on MIX-based anonymous communications", Journal of Communications, vol. 28, No. 12, Dec. 2007.

* cited by examiner

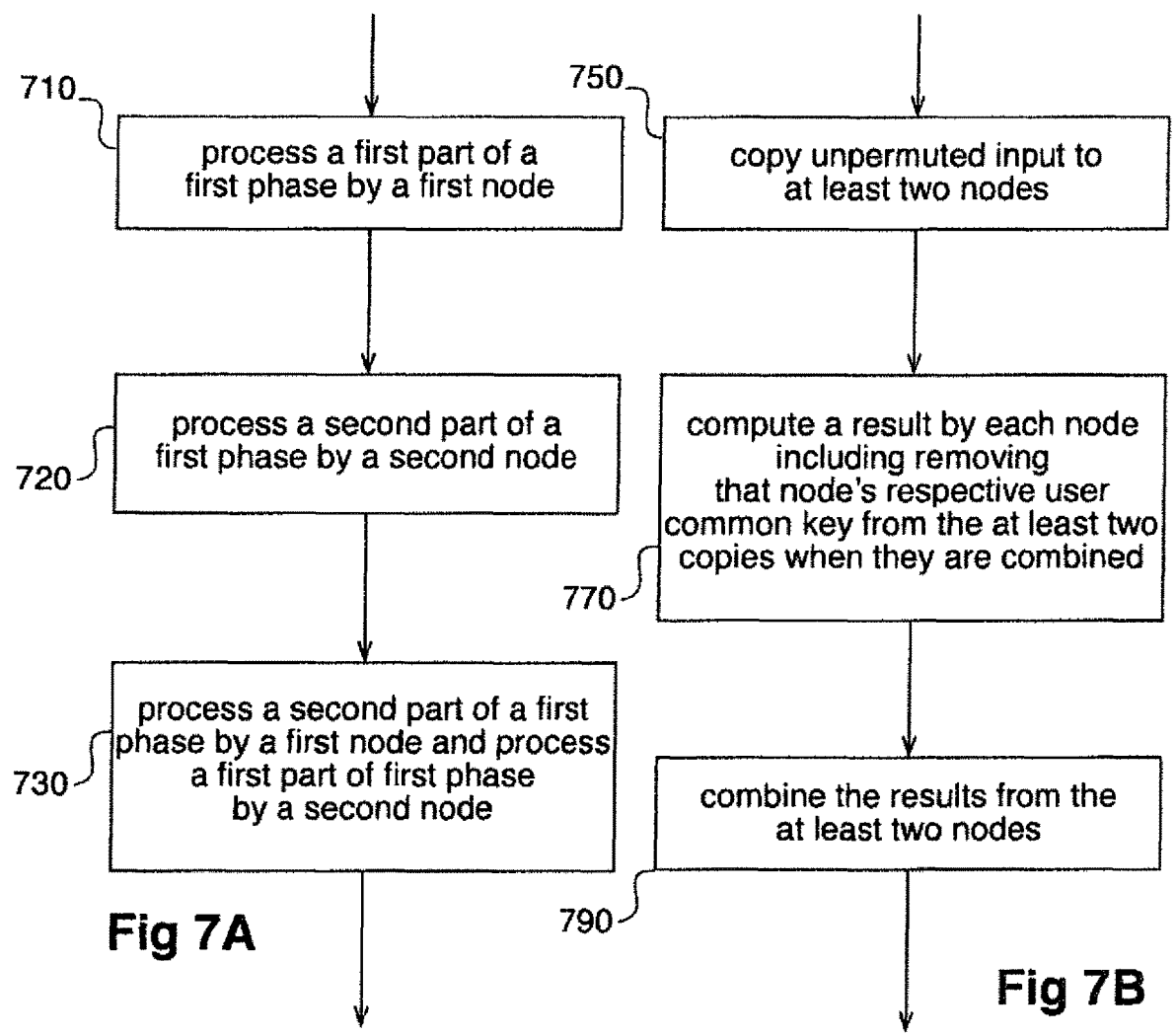

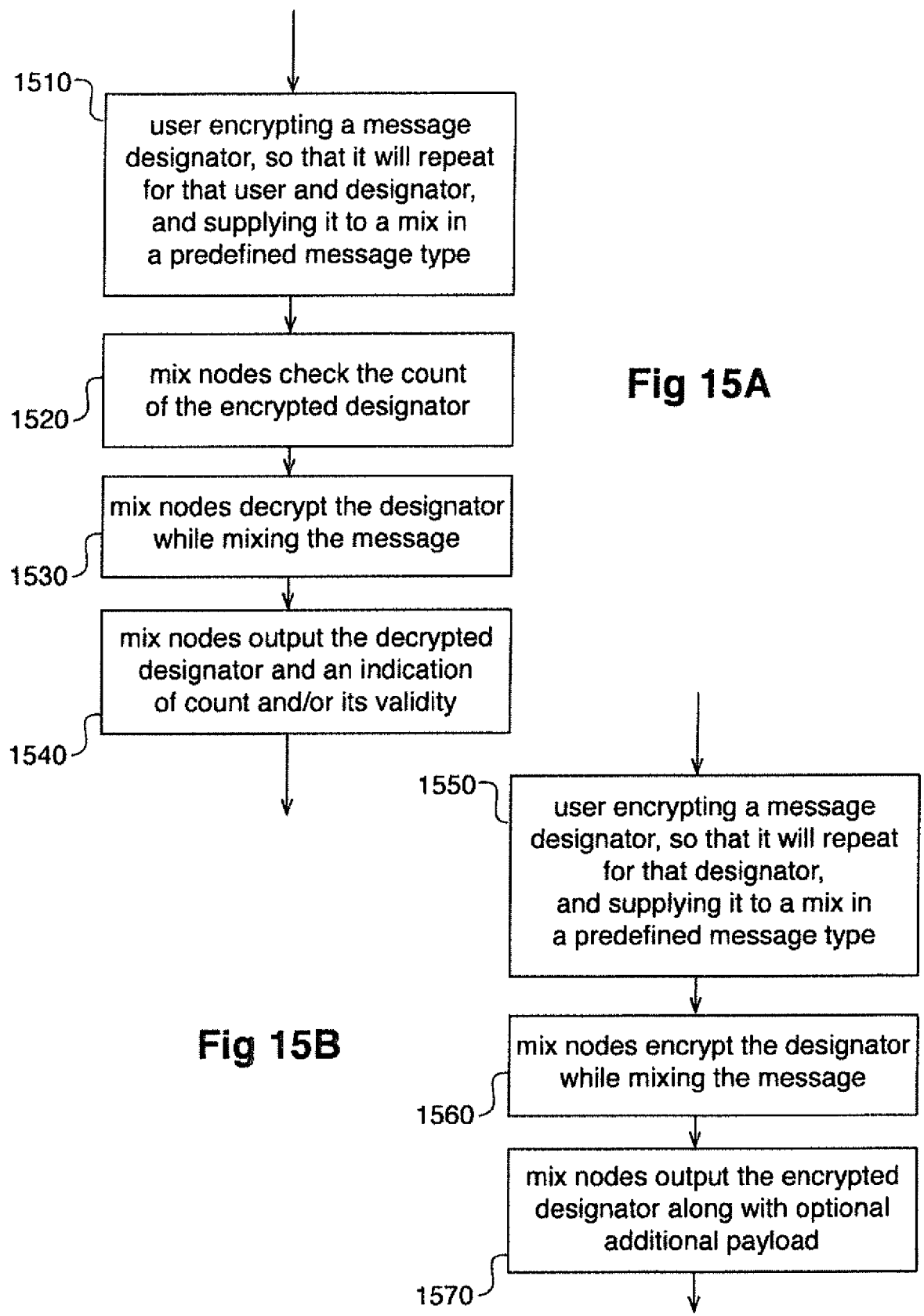

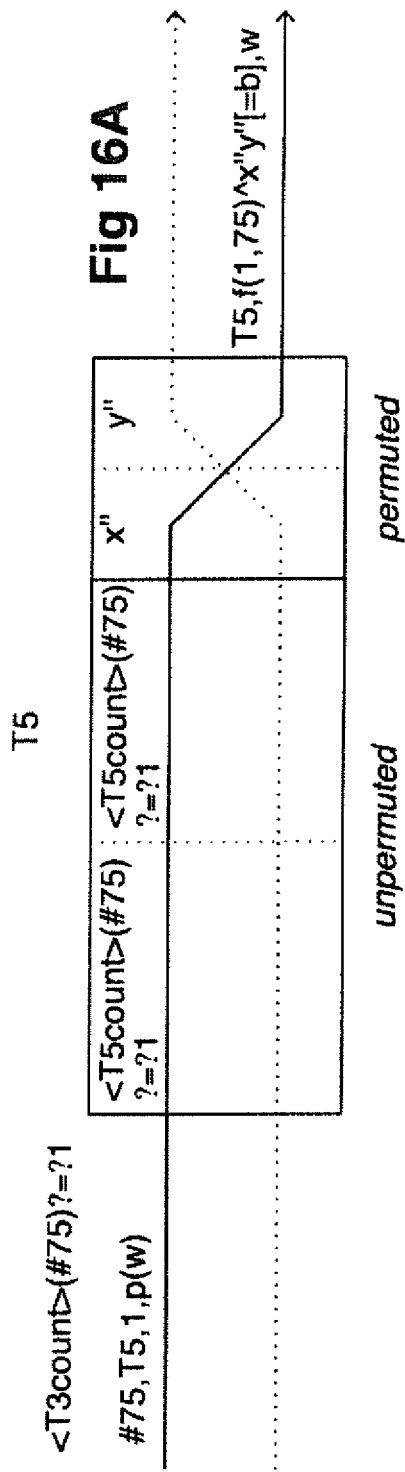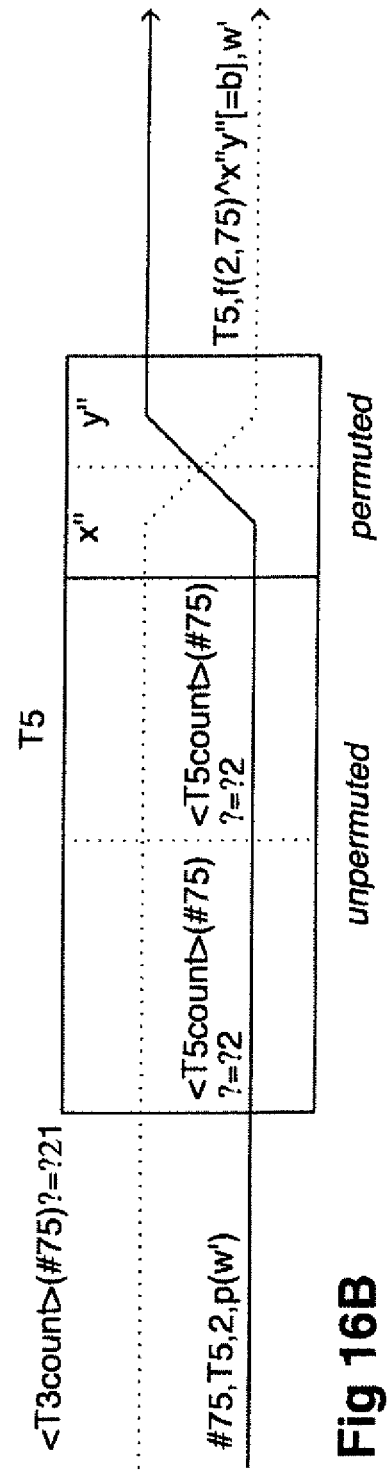

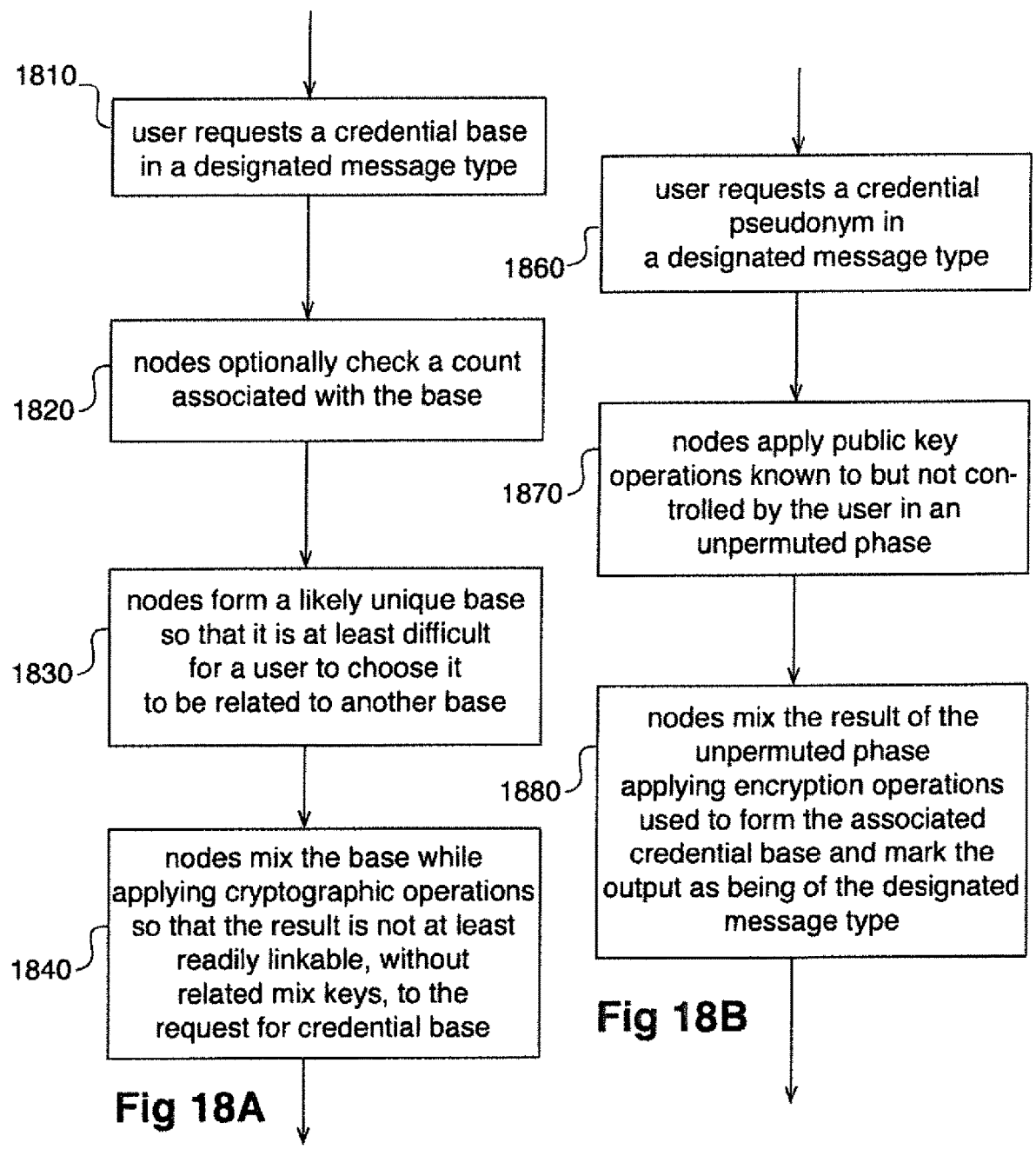

T7a (create account, optional)

T7b (deposit into account; accept payment from user)

T7c (withdraw from account; make payment to user)

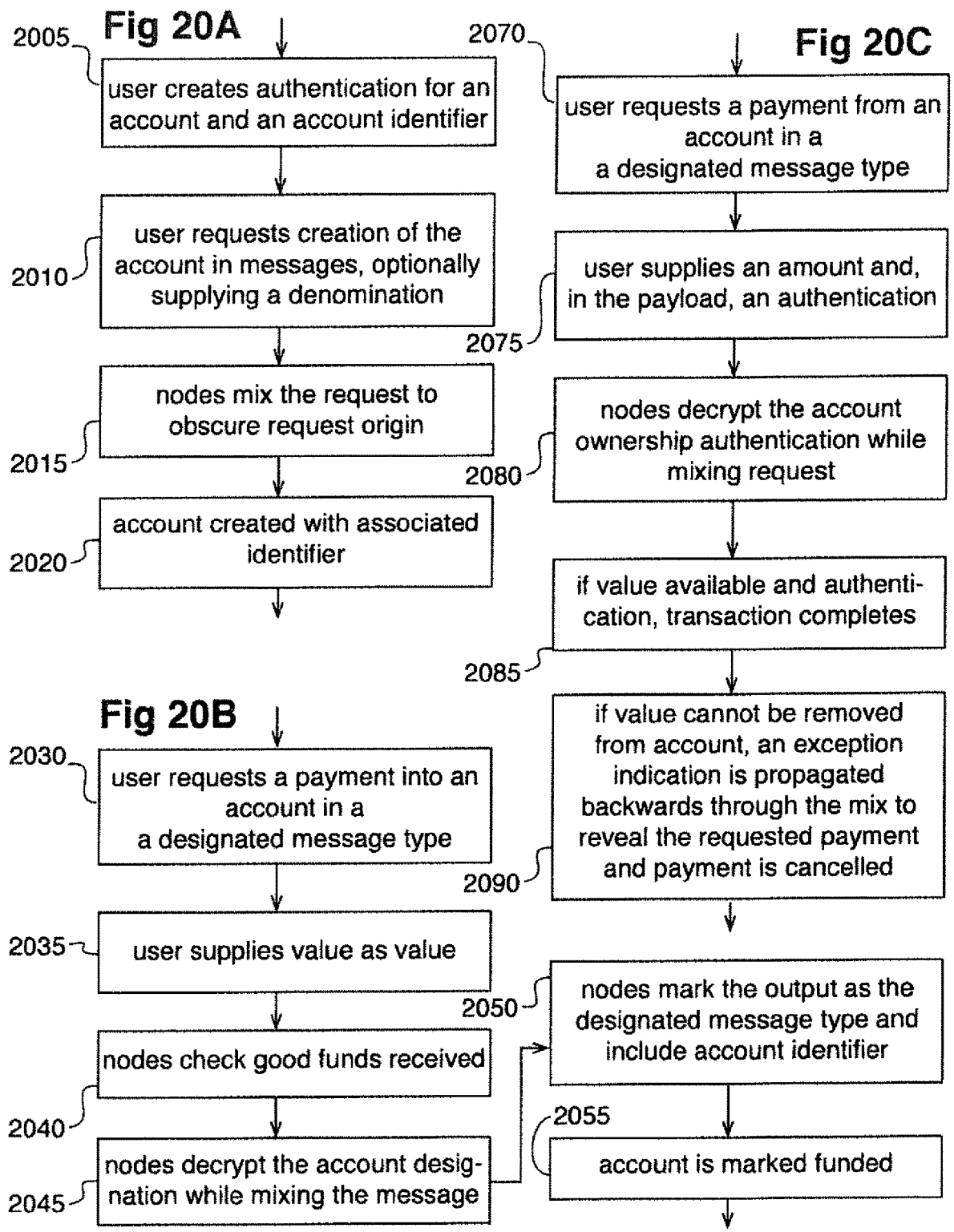

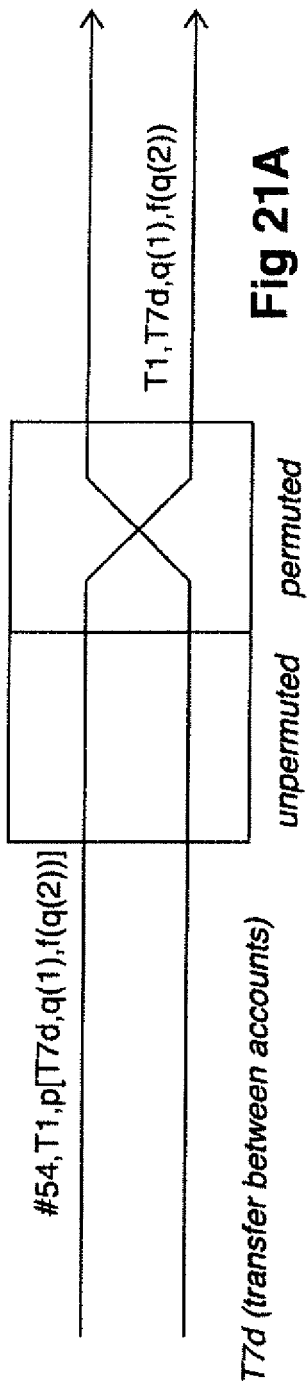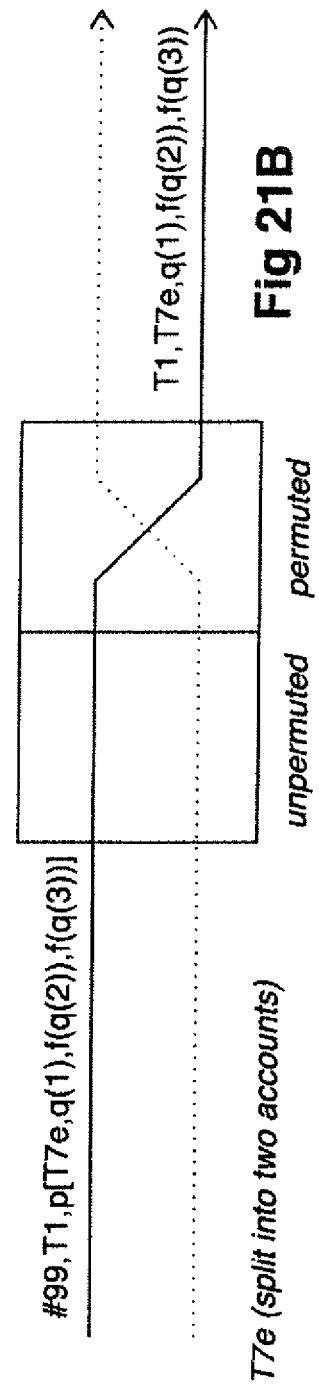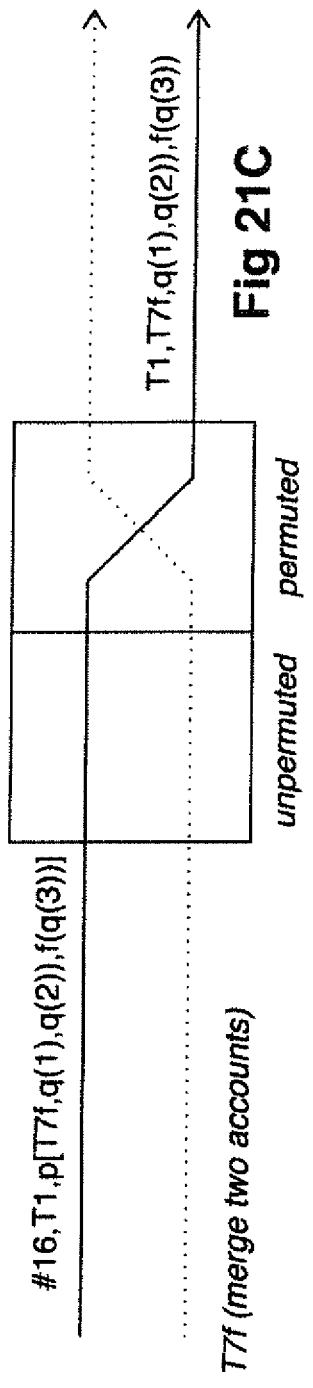

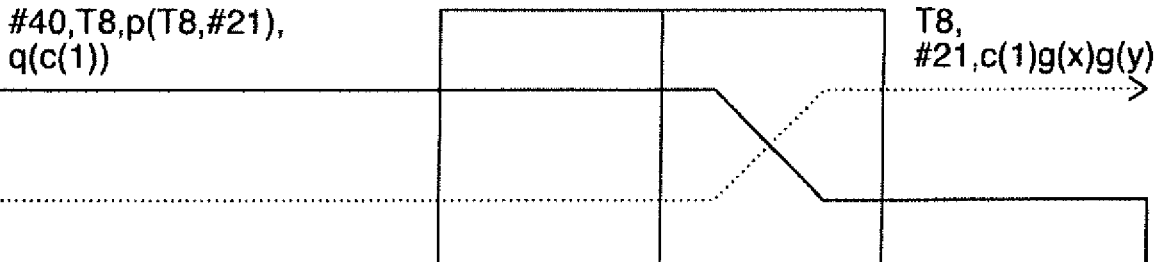
Fig 23A
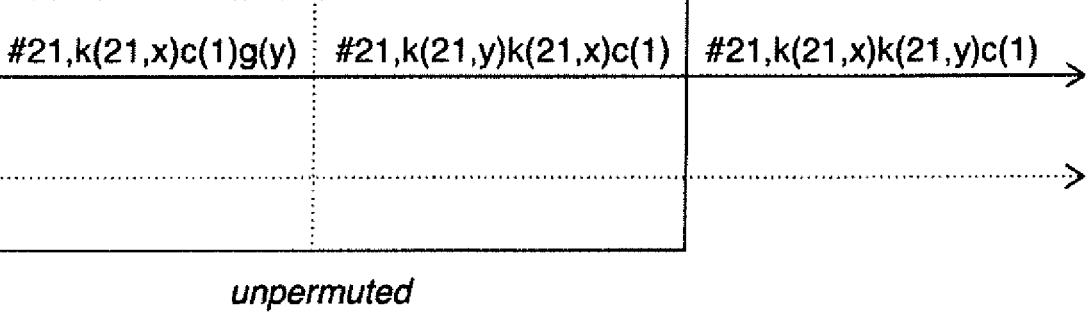
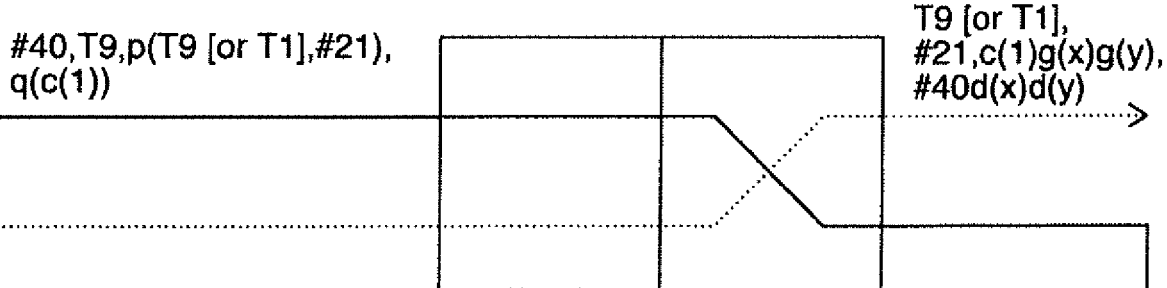
Fig 23B
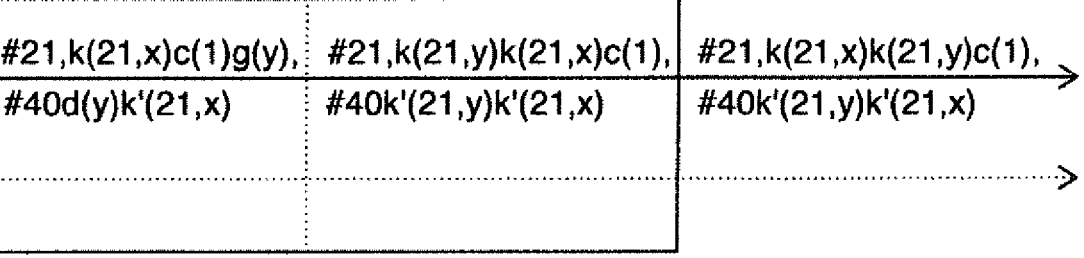

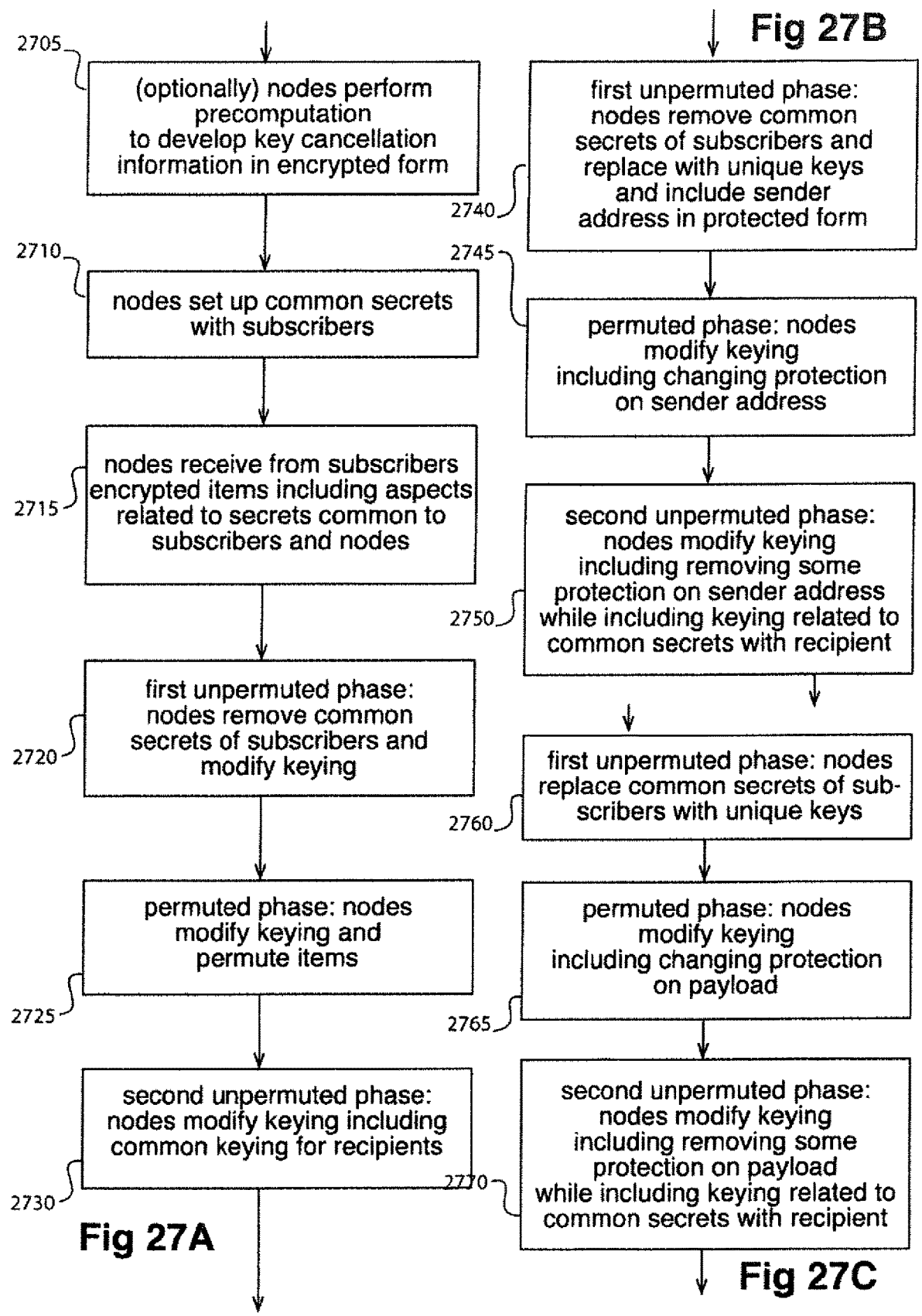

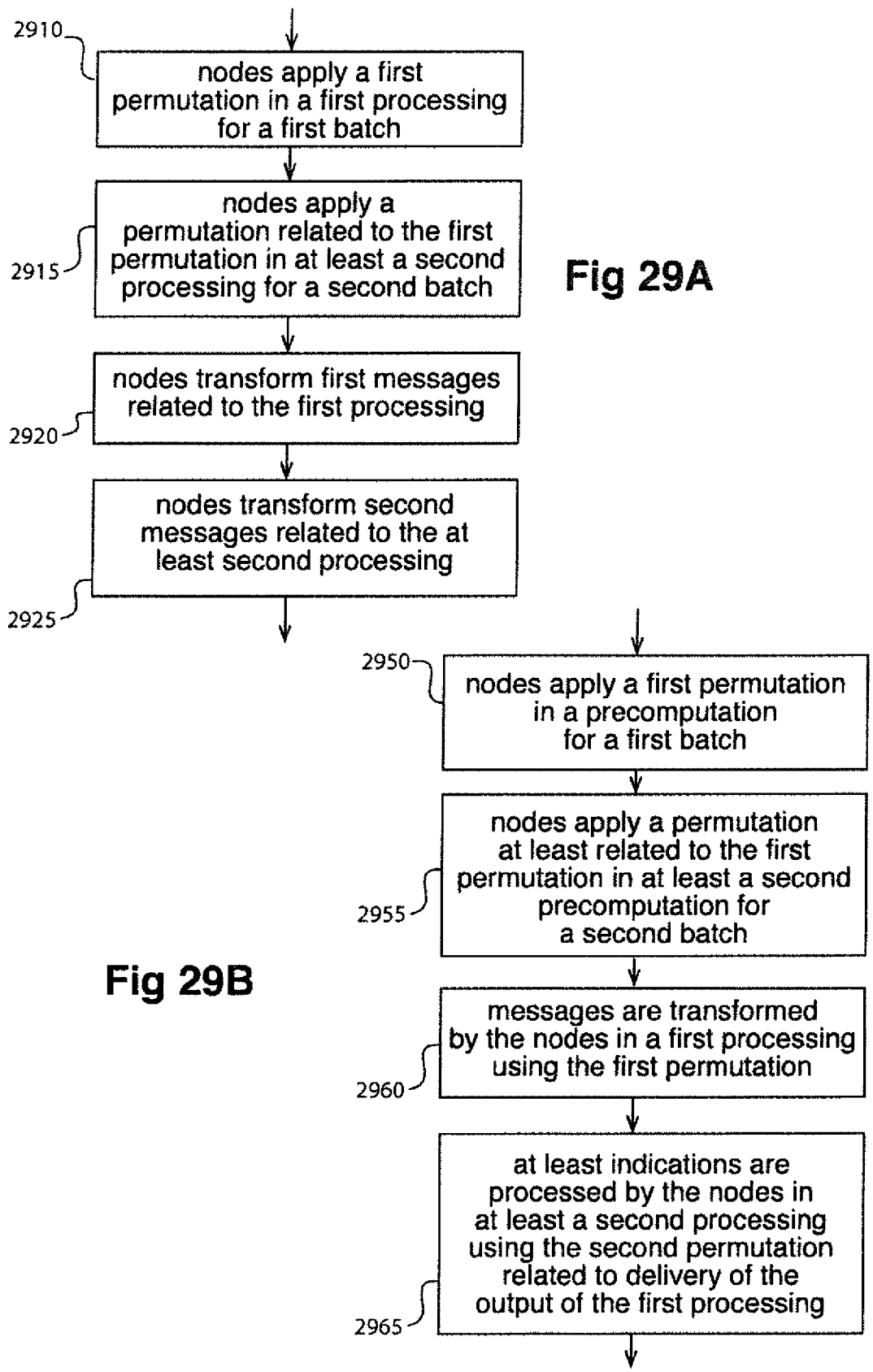

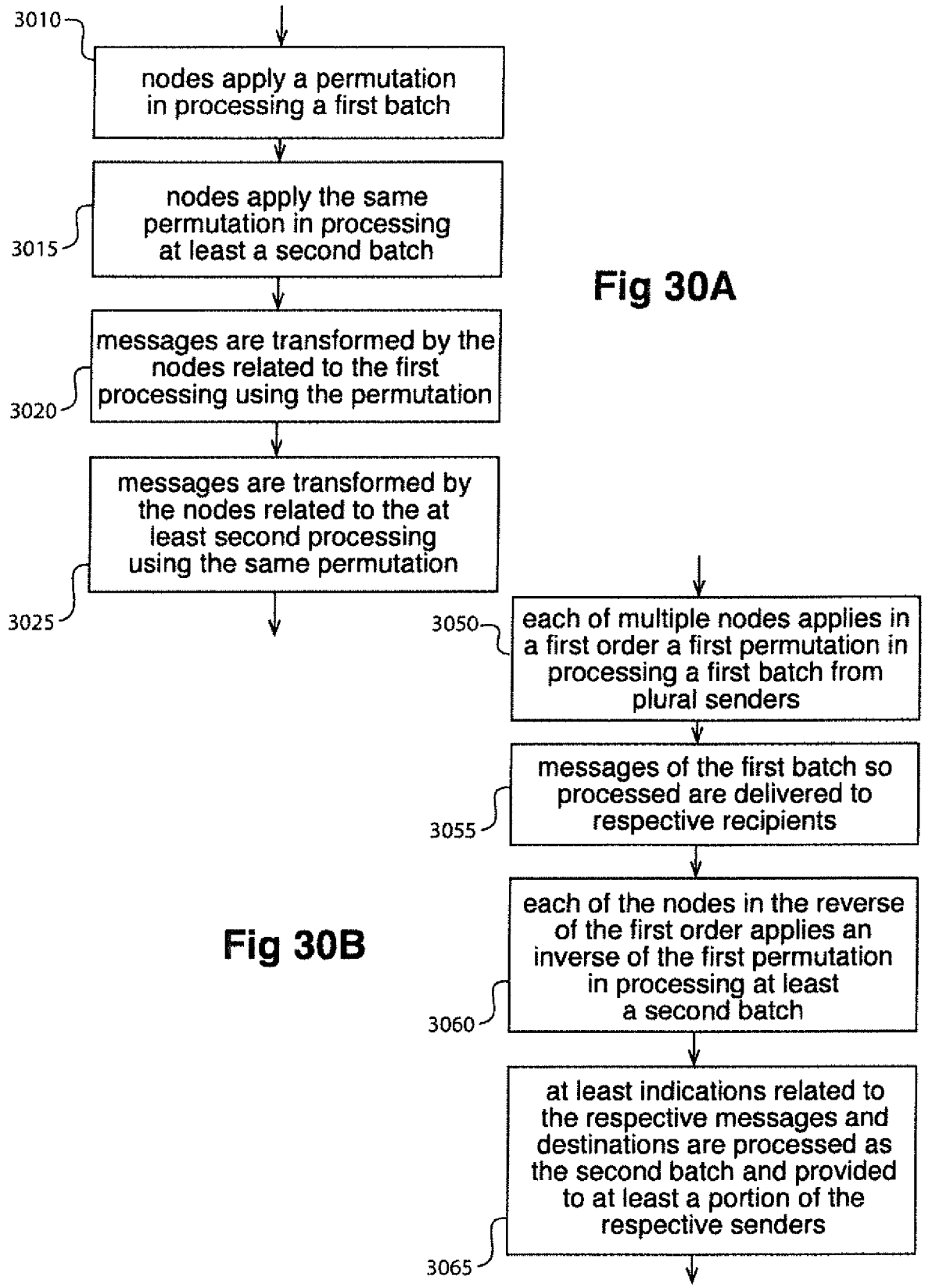

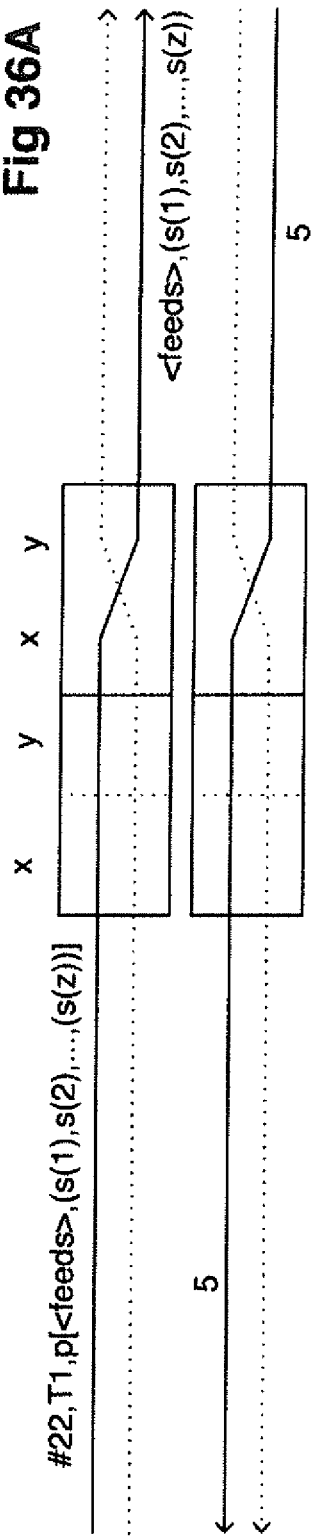
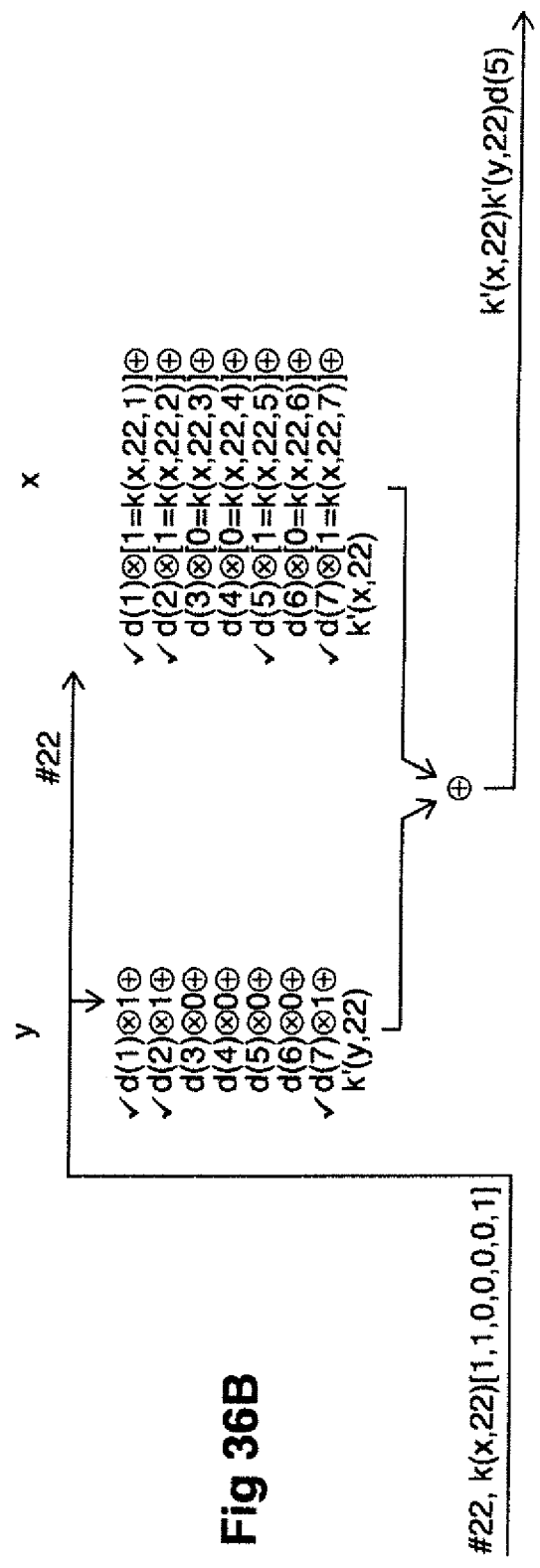
Fig 36A
Fig 36B

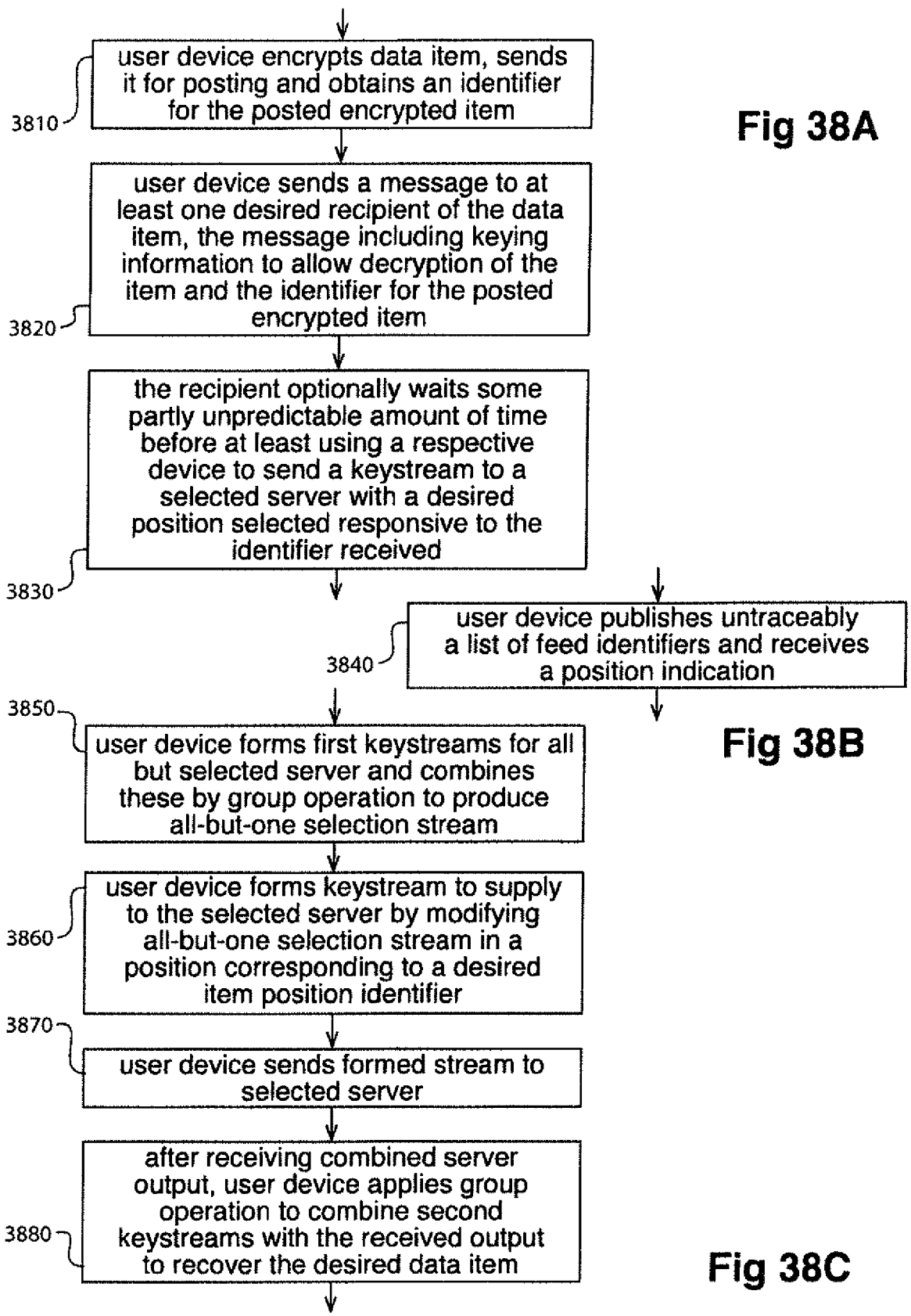

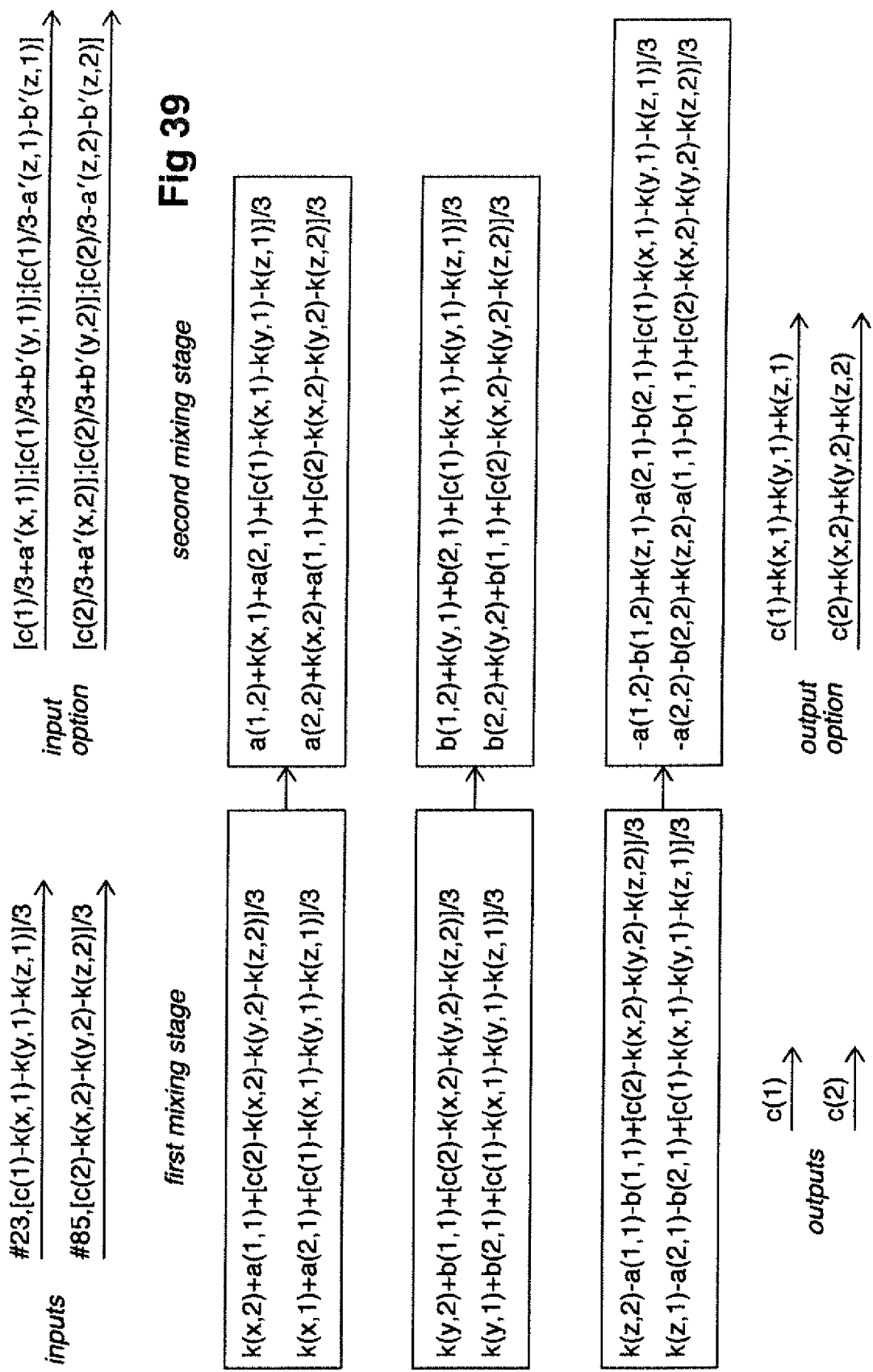

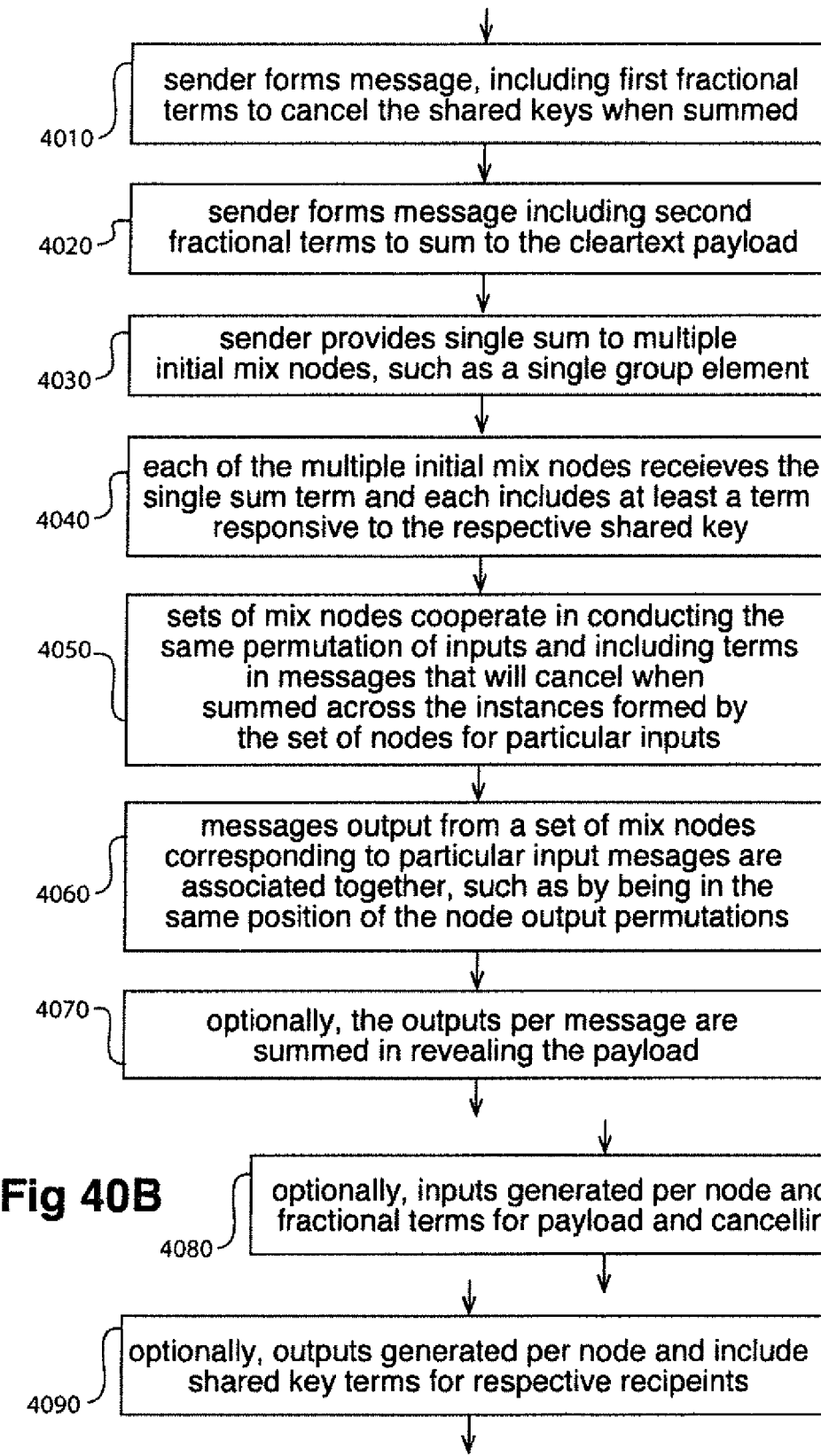

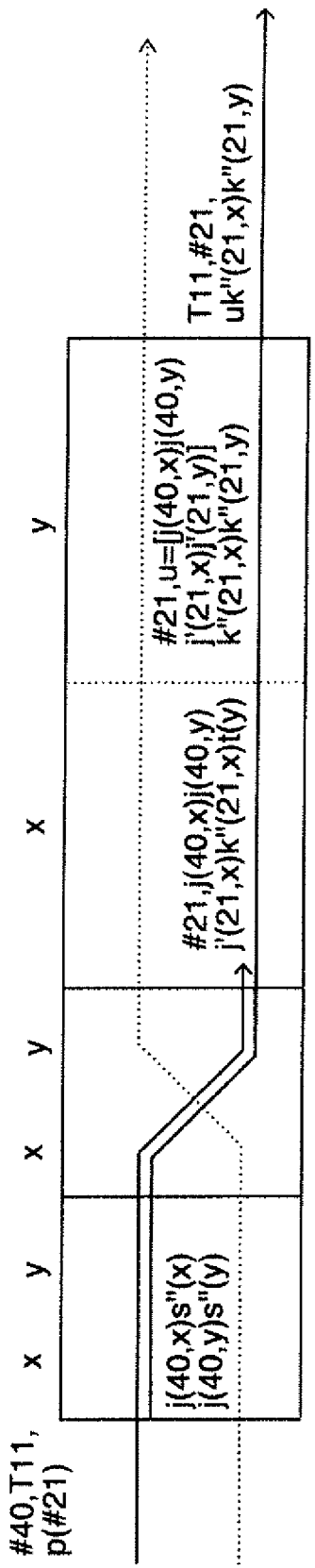

PRECOMPUTED AND TRANSACTIONAL MIXING

CROSS-REFERENCE TO RELATED APPLICATION

This application is a Continuation Application of U.S. Ser. No. 15/558,267 filed on Sep. 14, 2017, which is a National Phase of PCT/IB2016/002027 filed on Mar. 14, 2016, which claims priority to and the benefit of U.S. Provisional Application No. 62/133,456, entitled PRECOMPUTED AND TRANSACTIONAL MIXING," (EFID 21771858, confirmation number 3691, filed 2107:33), filed Mar. 15, 2015, the entire contents of which are incorporated by reference herein and as if copied in their entirety.

FIELD OF THE INVENTION

This invention relates to cryptographic apparatus and systems and more specifically to those aimed at securing communications and transactions, including protecting traffic data that allows tracing related to who communicates and transacts with whom.

BACKGROUND OF THE INVENTION

Mix networks have been the subject of significant research, commercial activity, and actual use since they were first disclosed by the present applicant in 1979. Such prior art mixing, however, generally performs public-key cryptographic processing on messages as they travel through the network. This is believed to result in significant commercial disadvantages in terms of efficiency and efficacy relative to the present invention. Moreover, use of mix networks has been limited largely to providing unlinkability of communication, whereas aspects of the present invention not only extend mixing's protections to transactions but also offer other types of protections that address broader needs of communication and interaction of users.

Novel cryptographic apparatus and methods disclosed here allow mixing that is believed significantly more efficient in terms of the amount of computation performed in realtime and consequently allow reduction both in overall delay of messages and cryptographic processing capacity. This is of commercial significance at least because it is believed that efficiency has limited the adoption as well as the efficacy of, and relates to the cost of, mixing systems both used and proposed. It is also believed of commercial significance because delay through each of a number of stages of mixing adds up, which tends towards more batches, use of less stages, reduced protections for users, and consequently less attractive offerings to users. The improved efficiency is believed further of commercial significance because it improves the reduced utilization and related hardware cost of cryptographic processing of prior art schemes. Moreover, users are believed sensitive, especially with increasingly popular portable devices, to computation time and energy usage. Also, some prior-art mixing has been based on stronger assumptions about underlying cryptographic primitives and thus may be more vulnerable to cryptanalytic attack.

In brief non-limiting summary some exemplary embodiments of some inventive aspects will now be provided. A so-called "cascade" or series of n mix devices, called here "nodes," receives b messages, each message associated with a corresponding entity/device here called a "user," "user device," or "subscriber." Included in the messages are encryptions formed by the subscribers. In what may here be called an "unpermuted" phase, each mix node processes these b inputs into what here may be called a "normalized" form, using non-pubic information held in common pairwise by nodes and corresponding subscribers, and typically employing a mathematically commutative property. Then in what may here be called a "permuting" phase, each of the b messages is transformed successively through each of the n nodes, during which the encryption remaining after normalization is removed and each node permutes the order of the b inputs it processes. The output of the cascade contains the b messages sent by potentially identified subscribers but in an order believed unpredictable to any proper subset of non-colluding nodes.

For clarity a particular non-limiting but concrete example will be described using modular exponentiation as the encryption, first without pre-computation and including successive processing in the unpermuted phase. Each of the b messages is sent by a distinct subscriber, each of which has established a different secret key in common with each of the n mix nodes. A subscriber raises its actual message content c to the power computed as the product of the secrets that subscriber shares with all the nodes, in a group where discrete log is at least believed hard. Then, in an unpermuted phase, each node successively normalizes by raising to a computed secret power that both cancels the unique subscriber power and leaves in place a single round secret power that node uses for all messages in the batch. In the permuting phase, each node permutes the b messages it receives from the preceding node in the cascade and raises each message in the batch to a power that cancels that node's single round power, so that the final output batch contains each original message content c unencrypted but re-ordered by the composition of the permutations applied by the successive nodes.

In an exemplary simplified non-limiting pre-computation embodiment described for clarity, the nodes first cooperate to produce a so-called "shared public key" for homomorphic encryption, such as one that includes independent private keys from each node. The nodes then in effect go through the motions of the two real-time phases already described, unpermuted and permuted, but instead of encrypting a message payload they homomorphicly combine keys injected at each stage, the same keys that will be used again at the corresponding stages of the realtime processing. The final accumulation of individual keys that apply to a particular position in the overall output of the cascade is then recovered by the nodes cooperating in decryption of the homomorphic encryption for that output position. Inputs for realtime processing can use the same group operation as that of the homomorphic encryption, so that the set of key group elements that are combined by the group operation with the message to encrypt the message payload in the output can be cancelled by combining with the inverse of what is recovered by decrypting the final result of the homomorphic encryption.

In some exemplary non-limiting functionality extensions, believed adaptable for mixing more generally, message types and protocols for their use are disclosed allowing applications such as, encrypted email, untraceable return addresses, polling/anti-spam, credential mechanisms, and payments including so-called "payer anonymity." The novel unpermuted phase of processing, with pairwise secured communication between subscribers and nodes, allows nodes to optionally at least partly independently verify aspects of user identity and various transaction parameters.

Prior Art Mixing

Mixing was first proposed by the present applicant in a June 1979 University of California, Berkeley technical report that was submitted for publication that year under the same title and then appeared as "Untraceable electronic mail, return addresses, and digital pseudonyms," 1981 Communications of the ACM, February 1981, vol. 24 no. 2, pp 84-88.

Included in this prior art was the notion of so-called "hybrid" encryption: that keys could be provided by public key techniques that could then be used for non-public key encryption of additional message payload. Some more recent systems have used such conventional keys for subsequent communication through the same set of mix nodes; however, use beyond the original message begins to erode untraceability, since all such uses are linkable by all nodes and traffic patterns link these to the user and the other parties that the user communicates with as well as the times and volumes of communication.

Inventive aspects of the present application retain the unlinkability as in the original proposal, while they may be able to only use group operations for encryption during transmission of messages, instead of any of the typically far more computation/data-intensive full public-key operations.

The approach to identification of users of an informational system that have been taken in the prior art are believed to be roughly divisible in the main between two alternatives: unchecked user identity or monolithic security model for identity checking. It will be appreciated that systems that do not check user identity are subject to various kinds of abuse, including the use of many identities by a single person and reduced accountability; however, what have been called "reputation" and "credential mechanisms" can potentially overcome some of these disadvantages. Unchecked systems are believed to have the unfortunate property that those few who may make the most serious abuses may take the strongest measures outside the system to remain untraceable, whereas most users of the system may be comparatively easier to link to their uses.

In a monolithic identification system, there is mainly a single authority that the user is to satisfy as to the adequacy of the user's identification. One believed kind of disadvantage of such an approach is that a single entity amasses information about a person that may allow that entity to link to aspects of a person's activities beyond the charter of the system, and in case of compromise of that single entity makes the person vulnerable to impersonation. Another type of disadvantage is that the authority may, in some cases, dilute the efficacy of the system by providing exceptions to certain persons. Well known examples include celebrities, witness protection, intelligence operatives, internal personnel, and administrators.

There are variations on the monolithic approach to identity checking involving the legal "structuring" of entities. For instance, identification checking subcontractors may be employed by a monolithic entity. As another example, so-called "federated" identity schemes allow organizations to benefit from identity checking performed by a central authority or by another organization member of the federation.

The believed novel approach to identification taken in some aspects here allows each node to form their own independent identity verification for the user such that only if the user is accepted separately by each of plural nodes is the user accepted by the system. A believed advantage of the approach is that while users may be reluctant to share a lot of identifying data with a single entity, it is believed they may be more willing to share that same amount or even more data when it is divided into separate parts with respective separate entities, especially entities under separate jurisdictions and/or when entities are not to share the data. Another example believed advantage of the approach is that false identities may be harder to inject into a system as the number of entities that would need to be deceived and/or corrupted to create a false identity.

Untraceable communication systems have been considered infrastructure for transaction systems. As just one example, such an approach was proposed for payments and credential mechanisms in, "Achieving electronic privacy," by the present applicant, Scientific American, August 1992, p. 96-101. In some few examples, mixing has alternatively been considered as a component for a larger system, such as in an election system or in processing payment orders already approved.

Inventive aspects of the present system advantageously integrate transactions with the mixing communication infrastructure. This is believed to, for one thing, potentially increase the amount of traffic in the underlying system and thereby increase the privacy protection offered. As another example, it is also believed to benefit users by the integration of services and adoption by the bundling of services. Moreover, it is believed that there are significant technical economies, such as in terms of key management, computation, infrastructure, system administration, and so forth. More fundamentally, the security model and/or arrangements of the communication system can be applied to the transaction systems as well.

General Description

Several related general aspects are disclosed here without any limitation.

Examples of mix cascades may be described for concreteness and clarity using two nodes, for example, but it will readily be understood and appreciated that any number of nodes may be used. Similarly, in some examples every user may send a single message per batch; in other examples, each user may send more than one message in some batches; and more generally, each user may send zero or one or more messages per batch and in a way that differs per batch.

The keys known to pairs made up of a user and a node are referred to as "common" keys or keys that are "common" to the pair. Common keys are optionally used also for authentication of input messages, such as by so-called MAC's. In some examples a subset of nodes may be sufficient to authenticate the MAC's.

For some commutative encryption functions, such as the well-known discrete log, composition of a series of encryptions can be computed almost as efficiently as a single encryption, using knowledge of the public order of the group to reduce the size of the exponent.

More flexible flows are anticipated, such as if the mixing of inputs proceeds in sub-batches, sliding windows, and/or probabilistically. As just one non-limiting example, each node could delay an item from one batch to a next according to some probability distribution associated with that node and/or other factors in system operation. As another such example, each node could delay each message some amount of time chosen from a suitable distribution.

Proof or auditing that the mixes perform their mixing transformations correctly may be provided, for instance, by multiparty computation techniques, as are known in the art.

For an exponentiation-based system, such as without pre-computation, an example is where it is believed that a mix can "prove" that it has raised each input item to the same power in the realtime phase. For instance, a so-called "challenge" may be formed as set of exponents; the mix publishes a value; and a binary choice is made between the mix being required to provide the power that takes that product of powers of the inputs to the published value or the power that takes the product of powers of the outputs to the shared published value. Such a procedure can be repeated for more certainty and the choice of exponents can be reduced and the number of repeats increased. An example reduces the exponents to zero and one, in the case when the number of repeats may be on the order of one hundred.

As an example of proofs believed suitable for a pre-computation system, a subset of the messages, such as in the input and/or output can be selected by a multi-party secure method as are known and those messages opened all the way through the cascade. This can be done at the pre-computation stage to detect deviation from protocol at that stage. Unpermuted phase processing can, for example, be checked by senders because they can inspect the order-preserving transformations of their inputs in the unpermuted phase processing. During a permuting phase, nodes can use commitments they already published in an audited pre-computation phase as part of their proofs. For instance, a pre-computation publication of quotients for each pair of input and output item that are in the same position in the ordering (i.e. first input to first output, second input to second output, etc.) allows checking of the mix processing from the published data and data communicated between nodes.

It may be desired to have so-called "forward secrecy," a term that is believed applied to a variety of properties in the art. Persistent shared-keys are believed best transformed in an irreversible manner for each transmission, so as to prevent earlier messages from being compromised by any subsequent leak of key state. By conducting key agreement protocols from time to time, which is believed also desirable, even compromised persistent keys only reach forward till the next agreement protocol. Furthermore, by including persistent state in with the agreement protocols, an adversary capable of breaking such agreement protocols may be thwarted.

The non-permuting phase can be so-called "pipelined," by dividing the input into separate portions that are each processed by a different ordering of the nodes, as will readily be understood. This lets each node process at more or less a so-called high "duty cycle," as there are no major forced time delays during which a node cannot be processing. Pipelining of the permuting phase in a similar manner, as will be understood, it is believed would divide the input into portions that could, depending on parameters, be linked to corresponding portions in the output-thereby reducing unlinkability. Pipelining the mix phase for a first half of the nodes and then providing the output of this as input to a pipeline for a second half of the nodes is believed to improve unlinkability over a single pipeline. This can be generalized to pipelines of distinct or overlapping nodes with whatever multiplicity.

In some further non-limiting examples of pipelining of the permuting phase, the division into separate portions may not be public but instead known to each respective node. For example, each node can be assigned a "random" or "unpredictable" subset of the inputs to start the corresponding sequential processing. In some examples, the nodes can perform a multiparty computation to assign these portions without subsets of nodes knowing more than their own subset partition. For instance, one example type of multi-party computation to accomplish this can use the system itself to process inputs provided by each node and the position of those in the lexicographically sorted output, known and recognizable by a node, would be that node's portion.

As for the pre-computation phase, pipelining may be applied in a variety of ways. For instance, multiple pre-computations can be conducted in parallel and in advance of when they would actually be deployed. Other examples will be described later, such as with reference to FIG. 7.

There may be various input structures, such as buffers, routers, forwarders, aggregators, front-ends and the like that feed early parts of the processing; nevertheless, the input device may be considered the first node of the unpermuted phase processing without any loss of generality. Similarly, there may be various output buffering, forwarding, or delivery structures and processes that feed the results of the second phase of processing to other entities; nevertheless, the last node of the unpermuted phase processing may be considered the output device without any loss of generality. In some examples where a live phase uses non-sequential processing before the permuting phase, a front-end processing capability may provide information to the nodes about the identity of the entity supplying a message input and the input slot of the mix that message will occupy. The nodes may then supply the resulting contributions for aggregate application by the entity performing front-end processing. Further examples are described with reference to FIG. 7.

In some yet still further non-limiting examples mentioned, nodes do computation in advance of the processing of input, as what generally may be referred to here as a "pre-computation," ideally so that the realtime processing of input is sped and/or otherwise enhanced and/or more efficient use is made of computing resources. As just one example, a pre-processing can provide each node with enough data that the commutative operations can be what is sometimes regarded as "non-cryptographic" or "non-complexity-based"; as an example, in the absence of, for instance, an exponentiation with secret exponent as the commutative operation such examples can instead use a group operation in the group by secret values each ideally appearing in a form visible to an attacker only once. This is related to what is sometimes referred to as a "one time pad" type of arrangement, or a system where among other things the number of key values revealed is the same as the total number of values known to the adversary. It will be understood by those of skill in the cryptographic art that such key values can be arrived at in principle by a multiparty computation between the nodes.

It is believed that a pre-computation may in some examples process messages through nodes in the same order as the live phase or, in other examples, in the opposite order as the live phase. When processed in the same order, the result of the homomorphic operation may be applied at the end of the live phase; when processing in the reverse order, the result of the homomorphic operation may be applied at the beginning of the live phase, subsequent to normalization.

The input to the backwards run may be taken as a known constant vector, for instance a random vector, or what is believed more conveniently, the identity vector. The last node in the forward run, the first in the backwards run, permutes this vector using the inverse of the permutation that will be used in the forward run, which it effectively retains at least the ability to reconstruct. This node chooses and retains at least the ability to reconstruct a vector of random values and multiplies each of the permuted values by, for clarity, what may be regarded as the multiplicative inverse of the respective random value retained. The penultimate node in the forward order, adjacent this already described node, takes this resulting pre-computation vector as input from the already described node and processes its elements in this same way, with its own choice of retained values and permutation, so that they can be provided to the node that is its predecessor in the forward order. This cascade processing proceeds in this reverse order, as will readily be understood, through to and including the first node of the forward-order cascade. From this point to the overall input vector, as the reverse premix, each node successively processes the resulting vector from its predecessor in reverse order in a similar manner, ideally with essentially independent random values retained, but with the identity permutation.

The pre-computations just described may be encrypted using a so-called partially homomorphic cryptosystem, such as for instance the well known El Gamal system. In this example, the nodes can compute a so-called "shared" public key, such as by each successively raising the result of such key generation by the preceding node to its own secret-key power; the result is the agreed generator raised to the product of the private keys of the nodes, as will readily be understood by those of skill in the cryptographic art. The final vector of values encrypted with this shared key can be decrypted by the nodes each successively applying the inverse of the secret power to each element of the vector. The elements of this decrypted vector are then combined by the group operation with the respective input items of the input vector before it is processed in the forward direction in the manner already described above.

Sending through this example pre-computed system, instead of exponentiating, a user includes, using the group operation, a group element corresponding to each node. The element can, for instance, be cryptographically dependent on a secret key common to the user and the node, much as in the systems without pre-computation already described. Each of these elements will be understood to be cancelled by the corresponding node during the non-permuting processing; however, a new element, from the pre-computation phase, will be substituted by the node to replace each element as it is cancelled in the non-permuting processing. Thus, the user-supplied elements will all be cancelled and the pre-computed elements will all be included as the realtime processing moves forward from non-permuting through to permuting. Since the element that was included from the final vector of values encrypted with the shared key is the inverse of the product of all the elements from the pre-processing for a particular input, and these will be multiplied in during the forward direction processing for that input as it appears in corresponding positions in the intermediate vectors, kept together under the permutations, it is believed as will be appreciated that all the pre-processing terms will cancel, leaving the original content element in the output vector.

In some settings it is believed advantageous to allow users to send many messages but to allow messages that have a unique occurrence per user to be recognized as such. One example use, for instance, would be in elections or statements of opinion on a particular issue, where a user statement would have more weight if it were known to be the unique statement of a user related to the particular issue, even though which user made the statement remains hidden. An example way to achieve such functionality sends pairs of messages, such as even and odd positions in the input vector, one message providing the uniqueness for the payload contained in the other message. Such a uniqueness message can be processed by the nodes using a fixed transformation per user in the non-permuting phase; the changing transformations described elsewhere here for the non-permuting phase would still be used for the payload carrying message of the pair.

In some settings it may be desired to provide robustness in case some mix nodes fail or otherwise leave the system. In one example approach to such robustness nodes use so-called "verifiable secret sharing" to provide shares of their keying material so that in their absence a quorum of other nodes can recover the keying material, as is known. So-called "secret sharing" techniques or those proposed earlier by the present applicant using various combined encryptions to achieve similar but more general results can be applied.

In some settings it may be desired for the nodes to selectively trace certain messages back to their origin. Such tracing is possible if the nodes retain suitable records or otherwise access to earlier processing.

What will be called here "shared-key homomorphic cryptosystems" are known. In such systems each of a number of parties can cooperate to create what may be called here a "shared public key," which is in effect information that defines an encryption operation that at least each party can use to encrypt an input value. Encryptions formed with the shared public key operation can be combined with a group operation, typically addition or multiplication, such that the parties can cooperate to decrypt the combined encryptions and the resulting cleartext is equivalent to the input values combined by the group operation.

This homomorphic property may be shown as $h(r_1)h(r_2)$ equals $h(r_1 r_2)$, where anyone can apply h to encrypt using the shared public key; but cooperation of the parties can invert h or decrypt by computation of the inverse $h^{-1}$.

An illustrative example, without any limitation whatsoever and for concreteness and clarity, is what is believed to be a multiplicative shared-key homomorphic cryptosystem, based on the encryption operation of the well known so-called "El Gamal" cryptosystem. This cryptosystem uses a multiplicative group where discrete log is assumed hard and encrypts each value using a random value and public key.

It is believed that such example systems can be implemented in whatever group where the so-called property "discrete log is hard" holds, which is currently believed to include for example arithmetic modulo a large prime, such as a one thousand or two thousand bit prime, particularly a so-called "safe" or even a "strong" prime. It is further believed that not all elements of such groups are generators but that the structure of the cyclic group allows elements chosen from the whole group uniformly to hide other such elements in products; alternatively, however, elements could be restricted to a subgroup where all elements are generators, such as the quadratic residues.

The following example shows for clarity the use of such a system by two parties, each encrypting its own secret value, forming the product of the encryptions, and decryption of the product by cooperation of the parties; however, extension to any number of parties and any number of factors will readily be understood:

"definitions":

g:=Agreed generator of multiplicative group in which all arithmetic (except that in the exponent) is shown, where group operation is relatively efficient and discrete log is hard.

x,y:=Secret exponents of nodes X and Y, respectively.

$g^x, g^y$:=Public keys of X and Y, respectively.

a,b:=Temporary secret exponents of X and Y, respectively.

$r_x, r_y$ := Secret elements of X and Y, respectively, whose product is revealed in the homomorphic decryption.

"shared-key set up":
X and Y form and make public
$g^{xy}$, by X revealing $g^x$
(which is the public key of X)
and then Y revealing
$(g^x)^y$.

"homomorphic encryption":
X reveals the El Gamal pair $(g^{xya}, r_x g^a)$;
Y reveals the corresponding pair $(g^{xyb}, r_y g^b)$; and then
everyone can compute the component-wise product of the two:
$(g^{xya} g^{xyb}, r_x g^a r_y g^b) =$
$(g^{xy(a+b)}, r_x r_y g^{a+b})$ "homomorphic decryption":
X reveals $g^{y(a+b)}$,
by decrypting first component of step 2; and then
Y reveals $g^{(a-b)}$; and then everyone can compute
$r_x r_y$ from the second component of step 2.

FURTHER BACKGROUND OF THE INVENTION

The following claim like language is copied from the application from which priority is claimed as mentioned above:

(a) Message transport apparatus for delivering messages from an input device to an output device, comprising: An input device receiving plural messages, each such message identified as related to at least one of a set of common keys; Plural first phase processing devices, each privy to plural common keys and each applying a transformation to messages received responsive to a corresponding one of the common keys and including the transformation related to a key corresponding to at least a second phase processing device; Plural second phase processing devices, each receiving at least some messages processed by the first phase processing devices and each further processing messages by re-arranging the order of messages substantially unpredictably and applying transformations responsive at least to values known to respective second-phase processing devices; and Such that the order of the items received by the input device substantially different from the order of items output by the output device, and the linking between items in the input and items in the output hidden from those without knowledge of the values known to the devices.

(a1) The apparatus of claim a, including a third phase without permutations and processing related to the third phase using keys common to recipients of messages.

(a2) The apparatus of claim a-a1 [to be read throughout these claims as the present claim is multiply dependent on all claims from claim "a" to claim "a1," inclusive, with method/apparatus/system language adapted as may be understood], including:

A pre-computation phase during which said processing devices develop keying values responsive to permutations of their respective inputs and invertible transformation of such inputs later decrypted by cooperation of the processing devices; and where the first phase and the second phase processing are responsive to the values developed during the pre-computation phase and the second phase responsive to the permutations developed during the pre-computation phase; and the computation performed during the combination of the first and second phases is substantially reduced by the pre-computation phase.

(a3) The apparatus of claim a-a2, comprising: the first and second phase processing devices arranged so that at least one first first-phase processing device is substantially the input device and at least one last second-phase processing device is substantially the output device for at least some messages.

(a4) The apparatus of claim a-a3, such that each of plural messages sent by the same user are unlinkable in the output.

(a5) The apparatus of claim a-a4, including at least one first phase processing device [sic] and a second phase processing device.

(a6) The apparatus of claim a-a5, including the pre-computation phase including keying values transformed by the permutations used in the second phase.

(b1) A cryptographic system for a set of nodes substantially to hide the correspondence between at least a set of inputs supplied to the nodes by subscribers and a responsive set of outputs developed by the nodes, comprising the steps of: Nodes apply a first permutation in a first processing for a first batch; Nodes apply a permutation related to the first permutation in at least a second processing for a second batch; Nodes transform first messages related to the first processing; and Nodes transform second messages related to the at least second processing.

(b2) A cryptographic system for a set of nodes substantially to hide the correspondence between at least a set of inputs supplied to the nodes by subscribers and a responsive set of outputs developed by the nodes, comprising the steps of: Nodes apply a first permutation in a precomputation for a first batch; Nodes apply a permutation at least related to the first permutation in at least a second precomputation for a second batch; Messages are transformed by the nodes in a first processing using the first permutation; and At least indications are processed by the nodes in at least a second processing using the second permutation related to delivery of the output of the first processing.

(c) A cryptographic method for a set of nodes substantially to hide the correspondence between at least a set of inputs supplied to the nodes by subscribers and a responsive set of outputs developed by the nodes, comprising the steps of: Establishing common first keys by nodes that are in common with subscribers; Accepting by at least one node of subscriber submitted encrypted input items including encryption with keying responsive to the common first keys;

An unpermuted phase wherein the common first key aspects of items are replaced with node second keys known to respective nodes; A permuting phase wherein said node second keys are cancelled and the items re-arrange; and So that the relative arrangement of the input and output items is substantially unpredictable to those without knowledge of the common first keys, the permutations, and node second keys.

(c1) The method of claim c, including: A pre-computation phase developing values responsive to permutations of respective inputs and invertible transformation of such inputs, where the non-permuting phase and the permuting phase processing are responsive to the values developed during the pre-computation phase; and the computation performed during the combination of the non-permuting and permuting phases is substantially reduced because of the pre-computation performed in the pre-computation phase.

(c2) The method of claim c-c1, including: each payload message paired with a uniqueness message; the first phase processing of the uniqueness messages the same across instances; the uniqueness messages in the input being enforced as unique per user; and so that the uniqueness message in the output are unique per user and are substantially unlinkable to the input uniqueness messages.

(c3) The method of claim c-c2 including: payload messages being associated with a re-blinded form of at least a master credential per user.

(c4) The method of claim c-c3 including: payload messages including provision for transfers of value between accounts where authentication is included in payloads for source accounts.

(c5) The method of claim c-c4 including: payload messages including provision for an exception to be raised if a withdrawal transaction fails to be consummated and the exception being linked to a corresponding input withdrawal message type.

(c5.1) The method of claim c5 including: transfer payloads resulting in confirming messages.

(c6) The method of claim c-5.1 including untraceable return addresses.

(c7) The method of claims c-c6 including: a third phase encrypting messages with the respective common key of the intended recipient.

(d1) Apparatus or system claims a-c, including plural users forming messages supplied for input processing.

(d2) Apparatus or system claims a-d1, including proofs by nodes that the processing is correct.

(d3) Apparatus or system claims a-d2, including forward secrecy on at least some keys in common between nodes and subscribers.

(d4) Apparatus or system claims a-d3, including authentication checkable by nodes using at least some keys in common between nodes and subscribers.

(d5) Apparatus or system claims a-d4, including a broadcast of messages to nodes during the non-permuting phase.

(e) A mix method or apparatus comprising plural entities receiving encrypted input items in a first order and producing as output at least differently encrypted items in a second order, such that the relationship between the orderings is at least difficult to predict without secrets of at least a quorum of the plural entities.

(e1) The mix of claim e including: each payload message paired with a uniqueness message so that the uniqueness message in the output is unique per user and substantially unlinkable to the input uniqueness messages.

(e1.1) The mix of claim e1 including: so that the user can substantially choose the uniqueness message.

(e1.2) The mix of claim e1.1 including: so that the user can substantially choose the uniqueness message.

(e1.2) The mix of claim e1.2 including: so that the uniqueness message includes a count.

(e1.3) The mix of claim e including: a payload message paired with a designator so that the designator in the output substantially unlinkable to the inputs and substantially unpredictable to users and substantially repeatable by any user supplying the same designator in the input.

(e2) The mix of claim e including: payload messages being associated with a re-blinded form of at least a master credential per user.

(e3) The mix of claim e including: payload messages including provision for transfers of value between accounts where authentication is included in payloads for source accounts.

(e4) The mix of claim e including: payload messages including provision for an exception to be raised if a withdrawal transaction fails to be consummated and the exception being linked to a corresponding input withdrawal message type.

(e5) The mix of claim e including: encrypting messages with the respective common key of the intended recipient.

(e6) The mix of claim e including: providing an authentication of the sender to the recipient of the message.

(e7) The mix of claim e including: decrypting messages by nodes with the respective common keys of senders.

(e8) The mix of claim e including: at least some of the output items associated with persistent pseudonym information that remains the same across at least some output items from the same sender.

(f1) A cryptographic system for a set of nodes substantially to hide the correspondence between at least a set of inputs supplied to the nodes by subscribers and a responsive set of outputs developed by the nodes, comprising the steps of: Nodes apply a permutation in processing a first batch; Nodes apply the same permutation in processing at least a second batch; Messages are transformed by the nodes related to the first processing using the permutation; and Messages are transformed by the nodes related to the at least second processing using the same permutation.

(f2) A cryptographic system for a set of nodes substantially to hide the correspondence between at least a set of inputs supplied to the nodes by subscribers and a responsive set of outputs developed by the nodes, comprising the steps of: Each of multiple nodes applies in a first order a first permutation in processing a first batch from plural senders; Messages of the first batch so processed delivered to respective recipients; Each of the nodes in the reverse of the first order applies an inverse of the first permutation in processing at least a second batch; and At least indications related to the respective messages and destinations processed as the second batch and provided to at least a portion of the respective senders.

(g) A multi-server private information retrieval system, the improvement comprising: each of multiple servers each shares two separate keystreams with each user device; at least one of the first keystreams is supplied by the user device to at least one of the servers; each server combines items inverted responsive to a corresponding first keystream of the user device by a group operation to produce a pre-output; each server combines the pre-output with the respective second keystream from the user device by a group operation to produce a respective encrypted individual server output; servers cooperate to combine individual encrypted server outputs by related group operations to produce a combined server output; and the combined server output is supplied to the user device.

(g1) The retrieval system of claim G, including: a server hub broadcasting all items to multiple server front-end processors; and at least one of the server front-end processors combining, using a group operation, items broadcast, inverting items corresponding to said first keystream known to that front-end processor.

(g2) The retrieval system of claim G or G1, including said user device publishes untraceably a list of feed identifiers and receives a position indication.

(g3) The retrieval system of claim G, G1 or G2, including: a user device encrypting a data item, sending it for posting and obtaining an identifier for the posted encrypted item; the user device sending a message to at least one desired recipient of the data item, the message including keying information to allow decryption of the item and the identifier for the posted encrypted item; and the recipient using a respective device to send a keystream to a selected server with a desired position selected responsive to the identifier received.

(h) In a mixing system, the improvement comprising: an establisher entity forming mix-stage keys and providing each of plural mix nodes with a respective different one of the keys as a payload of a corresponding establishing mixing, one such establishing mixing for each mix-stage key; the mixes in each establishing mixing cooperating to mix the keys so that a corresponding mix receives the respective mix-stage key and the key, and the correspondence between sender and key, substantially kept from other mixes; a sender entity, optionally distinct from establisher entity, successively processing, where the processing is selected from the group including encrypting or decrypting, a payload using the mix-stage keys, as a layer, and including along with the layer a fingerprint of the respective mix-stage key used with each such successive layer and providing the result to at least a first mix; at least a first mix receiving at least a partially such successively processed payload and the at least first mix locating the mix-stage key received earlier by matching the fingerprint of the key with the associated key previously received and then using the located key to process, where the processing is selected from the group including encrypting or decrypting, the layer and forward the result as an output; and at least a second mix receiving at least the output of at least an earlier mix and locating the mix-stage key received previously by matching the fingerprint of the key with the associated key previously received and then using the located key to process, where the processing is selected from the group including encrypting or decrypting, the layer and to forward the result to a receiving party.

(i) In a mixing system, the improvement comprising: nodes creating a coordinated component for a message during an unpermuted phase that includes values representing unique cryptographic functions of the sender identity, so that the sender identity results in a unique value unpredictable to other than the nodes; nodes process the created message along with plural components during a permuting phase and optionally including respective values representing substantially cryptographic functions of the recipient of the message, so that the resulting pseudonym is a substantially unique value corresponding to the sender recipient pair and substantially unpredictable other than to the nodes; and nodes processing the created message along with the other component(s) and revealing the combination of created values in output of the mixing system, whether public or delivered privately to a recipient.

BRIEF DESCRIPTION OF THE DRAWINGS

FIGS. 7A and 7B shows flowcharts of pipelined and star unpermuted phases in accordance with aspects of the teachings of the present invention, with FIG. 7A relating to the pipelined configuration already described with reference to FIG. 5 and FIG. 7B relating to the star configuration described already with reference to FIG. 6.

FIGS. 15A and 15B are flowcharts for limitation of multi-sending and other encrypted payloads in accordance with aspects and teachings of the present invention, with FIG. 15A related to the operation according to FIG. 14A and FIG. 14B, as already described, and with FIG. 15B related to those of FIG. 14C.

FIGS. 16A and 16B are combination block and cryptographic schematic diagrams for credential base establishing in accordance with aspects and teachings of the present invention, with FIG. 16A related to the establishing of a single base credential for a user and FIG. 16B related to establishment of a second credential base for the user.

FIGS. 18A and 18B are flowcharts for credential base and credential pseudonym issuing in accordance with aspects and teachings of the present invention, with 18A related to the operation according to FIG. 16A and FIG. 16B, as already described, and with FIG. 18B related to FIG. 17A and FIG. 17B as already described.

FIGS. 20A, 20B and 20C, are flowcharts for establishing accounts and transferring value between the accounts and external systems in accordance with aspects and teachings of the present invention, with FIG. 20A related to the creation of an account without initial funding, FIG. 20B related to the funding of an account from value held by a subscriber outside the accounts, and with FIG. 20C relating to the transfer of value from an account to value held by a subscriber outside the accounts.

FIGS. 21A, 21B and 21C are combination block and cryptographic schematic diagrams for payment transfers between accounts in accordance with aspects and teachings of the present invention, with FIG. 21A related to transfer from one account to another. FIG. 21B related value funding two different accounts, and FIG. 21C related to consolidation of change from two accounts to a single account.

FIGS. 23A and 23B are combination block and cryptographic schematic diagrams for protected communication from a first to a second subscriber in accordance with aspects and teachings of the present invention, with FIG. 23A related to message confidentiality and FIG. 23B related to both message confidentiality and authentication of sender.

FIGS. 27A, 27B and 27C are combination block diagrams and flowcharts of mixing with output delivery in accordance with aspects and teaching of the present invention, with FIG. 27A related to three-phase embodiments, FIG. 27B related to authentication of sender to recipient, and FIG. 27C related to secrecy of payload delivered to recipient.

FIGS. 29A and 29B are combination block diagrams and flowcharts of mixing with general coordinated instances in accordance with aspects and teachings of the present invention, with FIG. 29A related to embodiments including those without pre-computation and FIG. 29B related to examples including pre-computation.

FIGS. 30A and 30B are combination block diagrams and flowcharts of mixing with specific coordinated instances in accordance with aspects and teachings of the present invention, with FIG. 30A relating to embodiments with application of the same permutation and FIG. 30B relating to examples including application of an inverse permutation.

FIGS. 36A and 36B are combination block and cryptographic schematic diagrams for anonymous selection of feeds in accordance with aspects and teachings of the present invention, with FIG. 36A related to the recipient establishing the choice of feeds and FIG. 36B related to the recipient polling the feeds.

FIGS. 38A, 38B and 38C are combination block diagram and flowchart of anonymous selected data and subsets of data and user computation in accordance with aspects and teachings of the present invention, with FIG. 38A related to posting of data and forwarding of access to it and subsequent downloading by the recipient and FIG. 38B related to the posting by a user of a set of feed identifiers and their subsequent use in receiving feeds and FIG. 38C related to the user device side of the embodiments described with reference to FIG. 37AB.

FIG. 39 is a combination block and cryptographic schematic diagram for additive split mixing in accordance with aspects and teachings of the present invention.

FIGS. 40A 40B and 40C are combination block diagram and flowchart of additive split mixing in accordance with aspects and teachings of the present invention, with FIG. 40A related to the case shown on the left of FIG. 39, with FIG. 40B and with FIG. 40C related to the input and output options already described with reference to the right side of FIG. 39.

FIG. 41 provides a combination block and cryptographic schematic diagram for pseudonymous sender authentication in accordance with aspects and teachings of the present invention.

DETAILED DESCRIPTION

A description adequate to allow those of skill in the art to make and use will now be provided but it will be understood that simplifications and restrictions may be included for clarity but without any limitation whatsoever.

Figure 1:
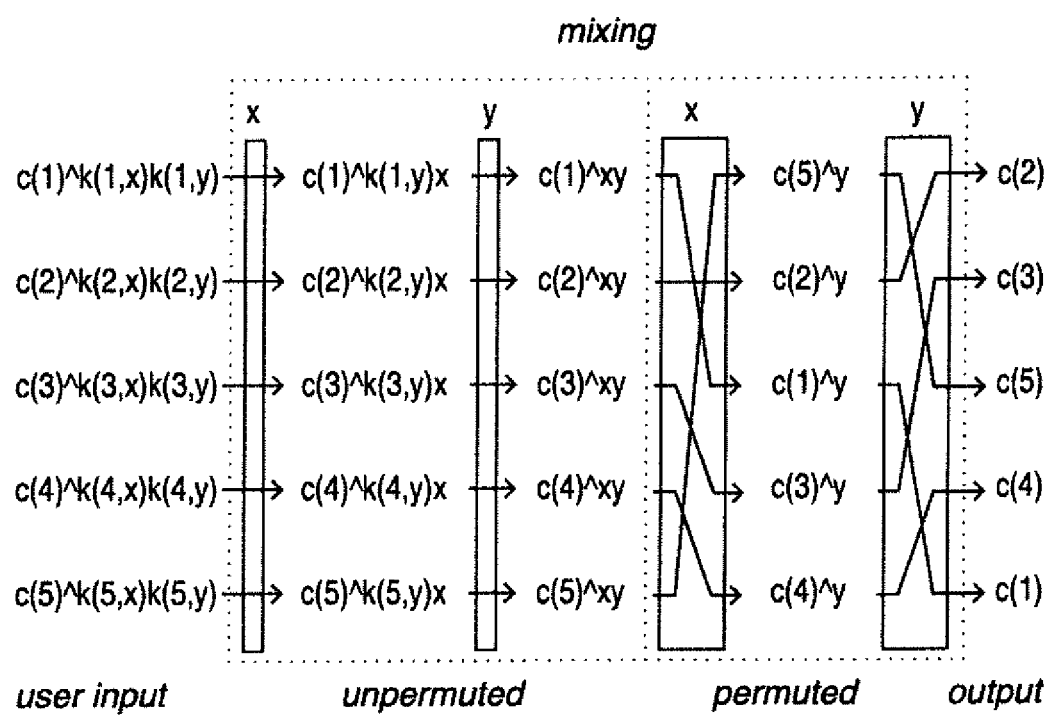
FIG. 1, shown is a combination block diagram and cryptographic protocol schematic of a mix without pre-computation in accordance with aspects of the teachings of the present invention.

Turning now to FIG. 1, a combination block diagram and cryptographic protocol schematic of a mix without pre-computation is shown in accordance with aspects of the teachings of the present invention. The user input indicated in the column on the left, the mix nodes and intermediate values in the middle, and the payload messages output in the column on the right. The values are shown using a multiplicative group with exponentiation indicated by a carrot "^" as will be understood.

The dotted rectangle indicates the mix hardware device extent. It may also be considered to be an example of the boundary of the mix network, such as in terms of a block diagram, with the inputs and outputs outside the boundary as already mentioned. The internal structure of the mix configuration is indicated as including an unpermuted section and a permuted section, as will be understood as an example. The input vector is shown on the left and the output vector on the right, as labeled. Similar conventions will be used to some extent in subsequent diagrams, as will be appreciated.

The message content, c, is shown indexed by a natural number, chosen for clarity as if the first user is user number one, the second, two, and so forth; but of course it will be understood that in general the users participating in a particular cascade may be whatever subset of subscribers and they may appear in whatever order, such as the order in which they send their input in. Thus, c(1) may be considered for clarity and concreteness to be as an example the message content, which is sometimes also referred to as the "payload," of the message of the first user to send a message in for this cascade instance.

The input items, making up the left column as mentioned, are each raised to a power that is shown as the product of two applications of the function k. The first application includes the "x" as the second argument; the second application of k includes "y" as the second argument. The first parameter shown in both cases is the subscriber index as already mentioned. Accordingly, k(1,x) is the key held as a secret in common between subscriber one and mix node x; and k(2,x) known to subscriber two and mix node x; similarly, k(4,y) for example, is that known to the fourth subscriber and node y.

The processing by node x is indicated by the arrows passing through the box labeled x. Thus, as will readily be appreciated, this node knows the keys it has in common with the subscribers, who are identified in this unpermuted phase, as indicated by the horizontal arrows, and the node cancels these factors, such as by multiplying by the multiplicative inverse of them, as will readily be understood. The node also applies the same key, x, to all the messages, as mentioned, thereby leaving the messages in a normalized form.

The processing by node y is similar, using the keys known to y. Accordingly, y raises the messages to the inverse power corresponding to the keys in common with the respective users and also includes the power y known to it. This leaves the content, c(i), sent by the subscribers but raised to both the x and the y power.

Next the vector of such messages is processed, in this example, by node x, in the permuting phase. There are two operations performed by a node on the messages during this phase: permuting and decrypting. Accordingly, x chooses a permutation, ideally one that is hard for others to predict, such as a random permutation, for instance chosen independently and uniformly from all permutations of the number of messages used. The decrypting can be by raising the elements to the power that is the inverse of the key x. These two operations can be performed in whatever order with the same result.

The final operation of the permuting phase, in this example with two nodes, is the similar permuting and decrypting by the second node, as will be seen. Of course, any number of nodes can be used in the mix cascade in general, as is known and will be readily understood is applicable generally to all descriptions provided in the present application.

The result output by the mix, shown as the column on the right as mentioned, is the message content items or payloads sent by the subscribers, but in an order that represents the composition of the permutations chosen by each successive node.

As an example, for further concreteness as may be appreciated, the first input item shown, in the upper left, $c(1)\char`\^k(1,x)k(1,y)$, represents the message content c(1) raised to a power that is the product of two exponents: k(1,x), the power common to the user and node x, and k(1,y), the power common to the same user and node y. Following this same message along, in the unpermuted phase, it appears in the first position of the intermediate vector between nodes x and y in the form: $c(1)\char`\^k(1,y)x$, showing that x has removed the common key and replaced it with the power x. Similarly, the output from y, the second intermediate vector, includes this message in the form: $c(1)\char`\^xy$, where the common key between user one and y has been cancelled and the power y injected to normalize the message. Following the message through processing by x, which as indicated includes the permutation that takes one into three, the message can be seen in the third position in the output vector as of the form $c(1)\char`\^y$. And, similarly, following it to the output vector, through processing by y, it appears in the fifth position as c(1).

Figure 2:
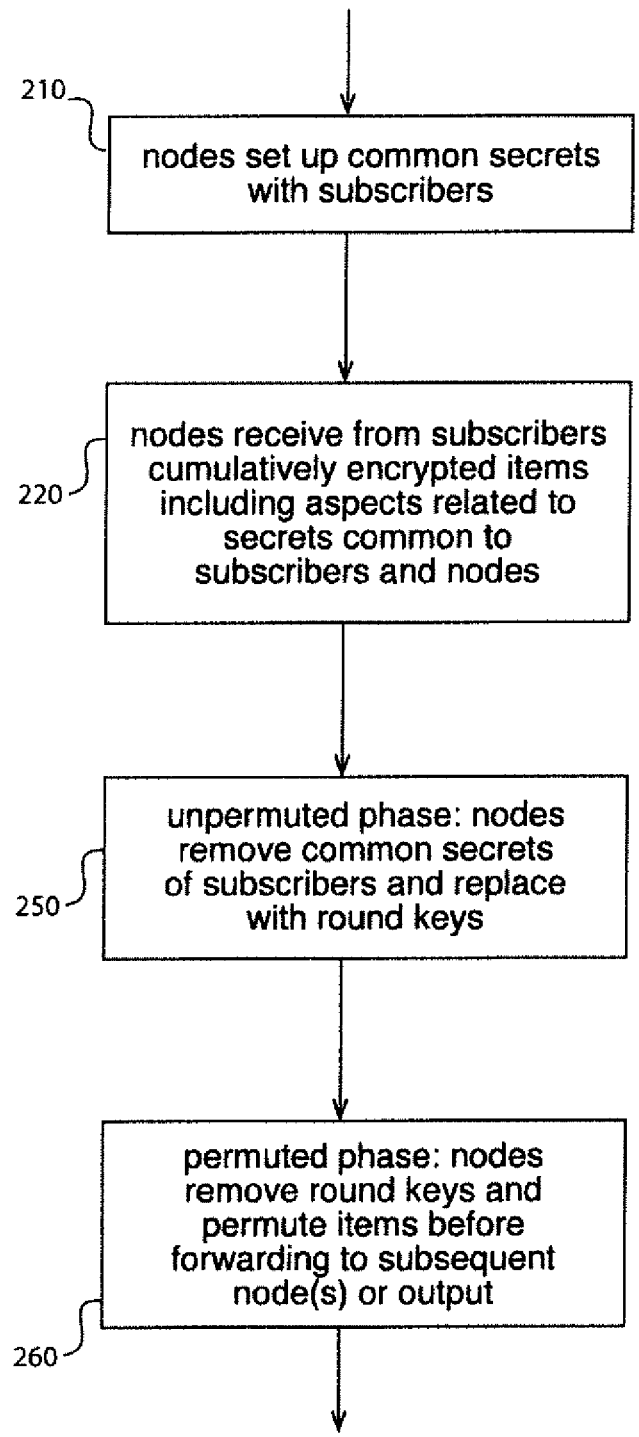
FIG. 2 is a combination block diagram and flowchart of a mix without pre-computation, shown in accordance with aspects teachings of the present invention.

Turning to FIG. 2, a combination block diagram and flowchart of a mix without pre-computation is shown in accordance with aspects and the teachings of the present invention. Initially, ideally secret keys become known to each node for each subscriber, such as by being established for subscribers by nodes and/or with various levels of cooperation by subscribers, as indicated by box 210. These were shown as k(i,j), where i is the user and j the node. Various means and methods for establishing keys are known in the art, as will be understood, including for instance physical exchange of key material, key agreement protocols, public key systems, as mentioned more generally earlier.

The input received by the mix, as described in box 220, includes encryption, such as commutative encryption in the examples, that includes keys held in common by a subscriber and a node. The next step shown 250 is the unpermuted phase, during which nodes know the subscriber or subscriber index and normalize by canceling the common keys while introducing the node keys, as already described with reference to FIG. 1. Then, finally, the permuted phase 260, also detailed with reference to FIG. 1, where the nodes remove the round keys installed on the items in the previous phase, the unpermuted phase, and the message payload emerges as output.

Figure 3:
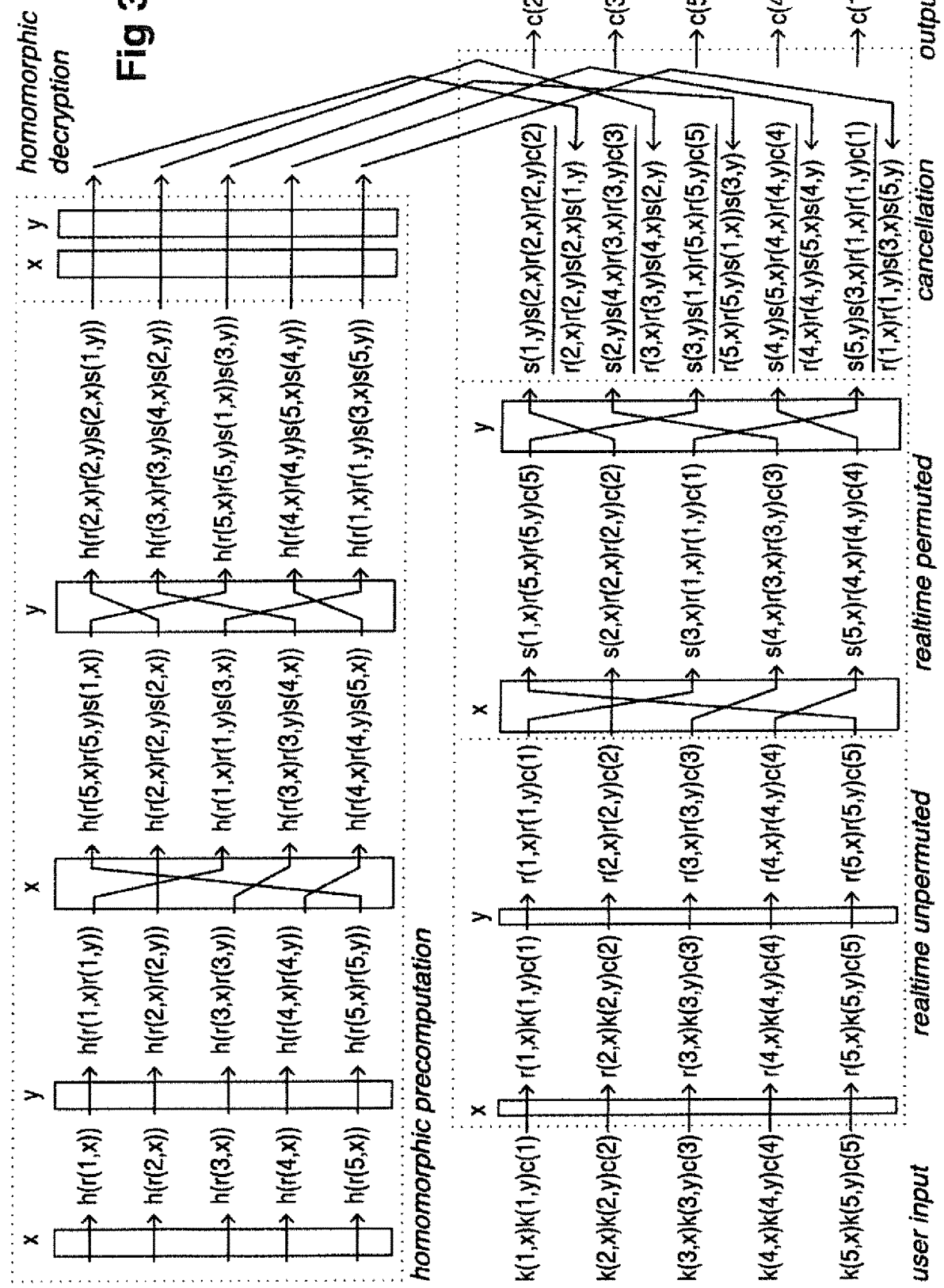
FIG. 3 shows an exemplary combination block diagram and cryptographic schematic of a precomputation mix is shown in accordance with aspects and teachings of the present invention.

Turning now to FIG. 3, an exemplary combination block diagram and cryptographic schematic of a precomputation mix is shown in accordance with aspects and the teachings of the present invention. The upper portion shows the precomputation and the lower portion the realtime portion. The user input and the output messages are shown on the left and right of the lower dotted rectangle, respectively, much as already described with reference to FIG. 1. The values shown are in a group denoted multiplicatively, for clarity, as will be appreciated. Also, a homomorphic encryption function, h, for instance over the same group, is used in the precomputation and then decrypted by the nodes, again in the example for clarity.

The example shown uses two nodes, x and y, for clarity; however, use of any number of nodes will readily be understood from the description, as already mentioned more generally. The example performs the precomputation in the forward directions, but other directions may be used, such as the reverse direction, as will be understood.

In the pre-computation, the first node x begins, by applying the homomorphic encryption in the unpermuted precomputation phase, shown in the upper left. Each of the five example unpermuted input what will be called here "slots" receives a random group element, shown as r(i,x), where i ranges over the input slot indices, as will be seen.

The homomorphic function, h(i), allows for the accumulation of elements by the group operation, in this case shown multiplicatively, as is well known. For instance, h(i)h(j) is equal to h(ij). The vector of random values or keys known to x, r(i,x), is the vector of homomorphic intermediate values shown intermediate to x and y. The next values included in or what may be called here "injected into" the homomorphic encryptions are the keys from node y, shown as r(i,y). Thus, the homomorphic encryption is of the component-wise product of the vector of keys from x and the vector of keys from y.

Next node x performs the first permutation of the permuted pre-computation. This rearrangement is indicated by the paths of the respective arrows within the rectangle labeled by x. The output of this, shown intermediate to the similar operation by y, is thus the permutation of the homomorphic encryption vector input with the component wise inclusion of a second vector of keys known to x, the s(i,x). The indices of the input vector can be seen to have been re-arranged in accordance with the arrows and the new vector included subsequently with its unpermuted indices, for clarity.

Then node y performs similar transformations, as just described for x, but with permutation and keys known to y.

The vector of products under the homomorphic encryption is thus permuted again and has additional factor from y, the s(i,y).

The homomorphic encryption layer, shown as h( ), can as is well known be removed by cooperation of the nodes who have shared the secret key of the homomorphic system. In the well-known El Gamal homomorphic encryption system (its additive group operation being shown here multiplicatively for clarity), for example, the nodes cooperate to compute a public power of the agreed generator, by each node successively applying its secret exponent. Then, for the corresponding decryption of the homomorphic system, the nodes apply the inverse of their secret exponents successively to remove the encryption on each element of the vector. This is indicated by the vector passing unpermuted through the rectangles of each of the two nodes in the upper right corner. This computation or decryption operation, may, as will be appreciated, be conducted well in advance or, for instance, once the realtime phase completes successfully in some examples.

The realtime portion of the mixing is shown beginning with input items submitted by subscribers, as indicated on the left of the lower portion of the figure. Instead of the exponentiation already described with reference to FIG. 1, the users include elements in the input message by applying the group operation, which is shown multiplicatively for clarity. In an example El Gamal homomorphic system, however, the subscribers would add their group elements modulo the public modulus to form their respective messages, which is believed a very efficient operation.

The elements included by the subscribers are, again similar to the system already described with reference to FIG. 1, the keys they have in common with the nodes and the message content they wish to send. Here these three are shown as factors, multiplicatively, as mentioned.

These inputs to the realtime mix are shown then being processed by x in this first part of the unpermuted phase. The vector that x injects into the message vector at this point is the r(i,x) that were the first elements include in the homomorphic unpermuted phase already described. Also, x removes or what may be called here "cancels," such as by applying the inverse group operation, the value of the respective k(i,x), the keys in common with x and the subscriber i. Thus, the k(i,x) factors are replaced by r(i,x) factors. Again, as will be appreciated has been detailed with reference to FIG. 1, the indices of the subscribers are shown as successive natural numbers, but need not have been known during the pre-computation nor need be related to the indices of the keys r(i,x).

The next processing, by y, is similar, as would be processing by any number of successive nodes. The common key vector is divided out and the corresponding r vector multiplied in (at least in the notation used, but the group operation may actually be addition, as mentioned).

Next, the realtime permuted phase begins, in the example shown for clarity with the first node x. As with the corresponding processing already described with regard to the pre-computation permuted phase, x permutes the input vector with the same rearrangement as in the pre-computation and performs a component wise group operation with the random vector, s(i,x). This leaves four factors in the intermediate value.

The operation performed by the next node, in this example y, is similar: the same permutation is applied to the input vector and the group operation is used to combine component-wise with the same random/key vector used in the pre-computation, in this example s(i,y). Again, any number of nodes will readily be understood, two having been shown as merely an example for clarity.

At this point the cancellation may be accomplished. (In other non-limiting examples, it may be accomplished at other points; this point being believed advantageous and shown for clarity.) It will be appreciated that the output of the homomorphic decryption includes all the factors of each message that remain, apart from the message content. Accordingly, forming the inverse in the group and combining by the group operation, shown as division in this multiplicative notion for clarity, leaves the message content in permuted order as the output vector.

As an example, for further concreteness as may be appreciated, the upper left corner shows x producing an output vector with first component $h(r(1,x))$ representing injection into the homomorphic system the key $r(1,x)$ for the first slot. Then when y injects $r(1,y)$, the vector contains $h(r(1,x)r(1,y))$ as first component. Of course, as will readily be understood, this can also be written as $h(r(1,x)r(1,y))$, because of the homomorphic property of the cryptosystem as already described, but the form shown is believed more readily understood.

Next the component is permuted as shown by x to the third position $h(r(1,x)r(1,y)s(3,x))$, and the additional key $s(3,x)$ is injected. Once y permutes this to the sixth position (the permutations here being the same as those of FIG. 1 for clarity but without loss of generality) this item has the form $h(r(1,x)r(1,y)s(3,x)s(5,y))$. Now the homomorphic decryption is shown as involving successive operations by x and by y, for concreteness, without limitation. The result of the decryption then, for the sixth element, is shown below the line, in the "denominator," suggesting that the group operation is applied after the inverse in the group has been computed, as will be understood. It is of the form $r(1,x)r(1,y)s(3,x)s(5,y)$, where the factors were included from left to right for clarity. The numerator shows the same factors, apart from the message $c(1)$, but in the reverse order, as they were included from right to left. Accordingly, the result is the payload message $c(1)$ appearing in position six of the output vector, as indicated.

The realtime processing that leads up to this output is shown beginning again in the upper left of the realtime phase as the first component or slot of user input $k(1,x)k(1,y)c(1)$, again with the index being assigned to match the slot number here for clarity in description and notation, but without any limitation whatsoever. (It will be understood that an assignment of senders to slots that is randomized in a way outside the control of less than all the nodes may be advantageous.) This is the product of the input message and the keys in common between this user and the two respective nodes. The output vector from x contains the first element as $r(1,x)k(1,y)c(1)$, where the factor $k(1,x)$ has been replaced on the left by $r(1,x)$. Similarly, the processing by y yields $r(1,x)r(1,y)c(1)$ in the first unpermuted component, with $k(1,y)$ shown replaced in the same position for clarity by $r(1,y)$. Now the permutation by x takes this component to the third position (same permutation as in the pre-computation) and includes $s(3,x)$ as a factor to yield $s(3,x)r(1,x)r(1,y)c(1)$. And finally, processing by y takes this to the fifth position and includes $s(5,y)$ on the left, giving $s(5,y)s(3,x)r(1,x)r(1,y)c(1)$. So, the fifth position of the output vector is the output of message $c(1)$.

Figure 4:
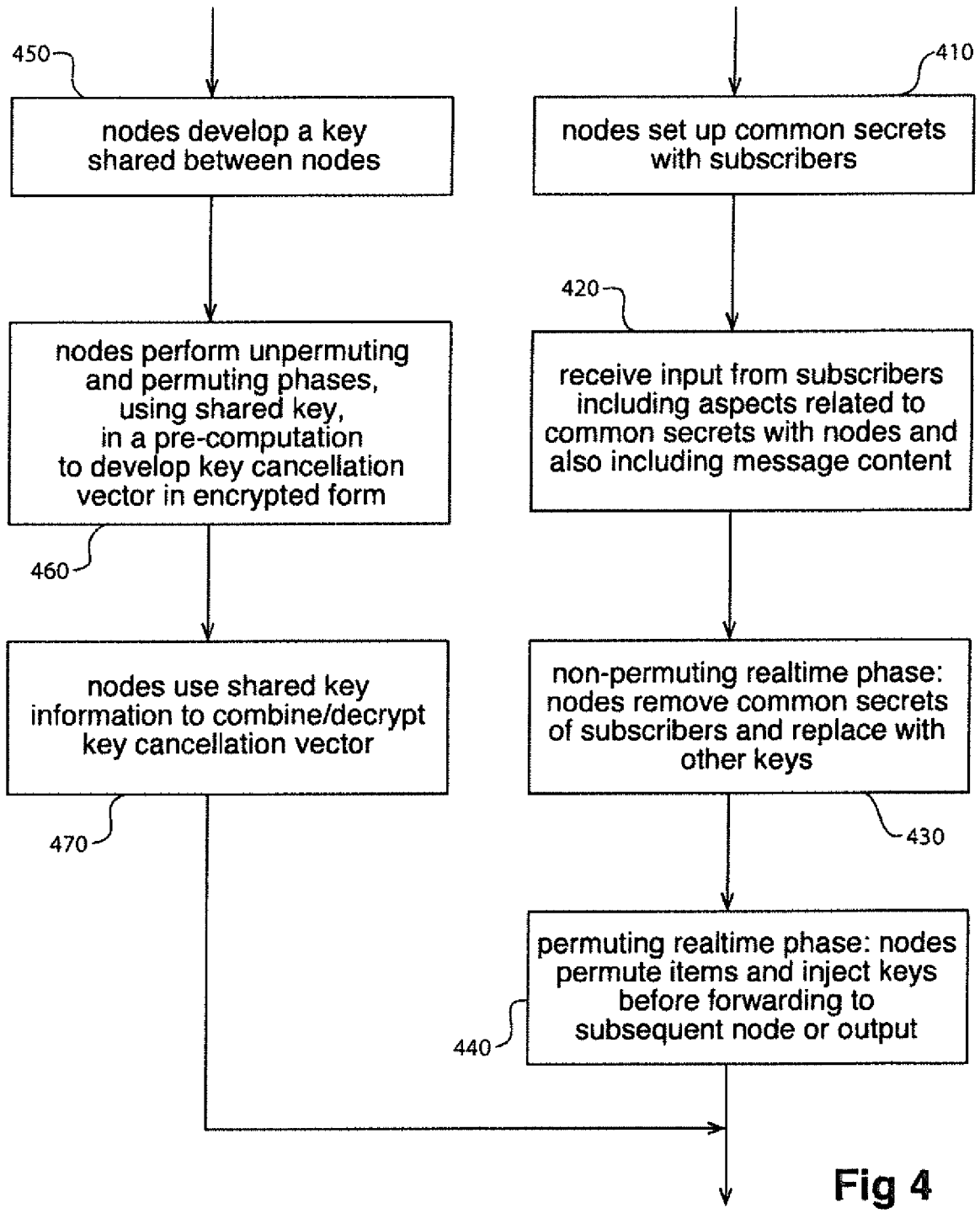
FIG. 4 shows a flowchart of exemplary pre-computation mixing in accordance with aspects of the teachings of the present invention.

Turning to FIG. 4, a flowchart is shown of exemplary pre-computation mixing in accordance with aspects of the teachings of the present invention. The realtime portion, similar to that already described with reference to FIG. 2 is shown on the right and the pre-computation portion is shown on the left.

The first step 450 of the pre-computation, as already described with reference to the example of FIG. 3, is the creation of a multi-party encrypted computation system, such as a homomorphic encryption system. In the example, mentioned for clarity and concreteness but without any limitation, this is accomplished by the development of a public key whose private key is divided among the nodes, such as by the raising to the respective secret powers of the nodes an agreed generator in a discrete log group, as per the El Gamal cryptosystem.

The next step 460 is the unpermuted and then the permuted phases of the pre-computation using the shared key to, in the example, develop the homomorphic encryption or otherwise of the cancellation vector, still in encrypted form, such as already described with reference to FIG. 3.

In step 470 the combining and/or decryption to obtain the cancellation information, shown in the example of the homomorphism encryption, is before being applied to the messages in order to cancel the various keys included by the nodes that hide the messages during processing. The decrypted cancellation vector can be included at various points in the processing, such as already mentioned. For instance, including it at the end, as in the example described with reference to FIG. 3, corresponds to the forward order of the pre-computation and is believed advantageous. However, other orders for the pre-computation and/or other locations to insert the cancellation vector, are anticipated.

As already described with reference to FIG. 2, the nodes develop common keys with subscribers pairwise, at least in some examples, as shown in box 410. The nodes receive 420 input provided by subscribers to the mix that include aspects related to the common keys as well as the message content.

The realtime processing of the input begins with the non-permuting phase 430, as already detailed in the example of FIG. 3, during which the subscriber common keys are replaced by other keys of the nodes, such as in the example r keys. Before or after this processing, in some examples the pre-computation output may enter. However, in the example described with forward pre-computation, the pre-computation enters at the end of the realtime phase, as shown after box 440.

Finally, box 440 is the realtime permuting processing of the input messages. Each node processes, in the example, by permuting and injecting key material, with the example s key injection. When the cancellation vector is included, these remaining keys are cancelled, leaving the message content as output in the example.

Figure 5:
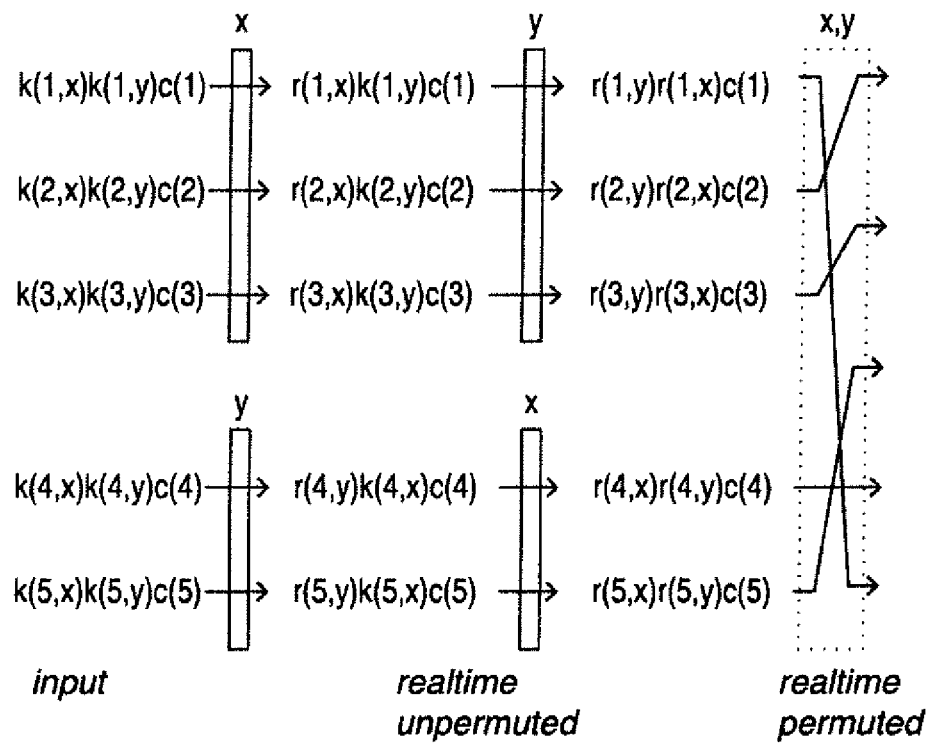
FIG. 5 presents a combination block diagram and cryptographic schematic of a pipelined unpermuted phase described in accordance with aspects and teachings of the present invention.

Turning now to FIG. 5, a combination block diagram and cryptographic schematic of a pipelined unpermuted phase is described in accordance with aspects and the teachings of the present invention. Portions of the input vector are shown processed first by different nodes and then the portions are interchanged so that each portion is ultimately processed by each node. Such arrangements are referred to here as "pipelining."

It will again be appreciated that a network topology other than a sequence of hops may result in lower end-to-end delay, for instance, and thereby may be advantageous. It will also be understood that some users may be "closer" in terms of latency to different "entrance" nodes.

With reference to the example of the figure, the first three subscribers are shown supplying their input directly to node x, whereas the last two are shown supplying to node y. After processing by these first-line nodes, the messages are then routed through the other nodes so that all the processing as described, for instance with reference to FIG. 3, may be accomplished. The result of the this realtime pipeline is shown limited to the unpermuted phase and delivering its output to the permuted phase in parallel.

Although the example is shown with reference to the pre-computation example, it may be applied to other examples, such as those described with reference to FIG. 1 or FIG. 2.

Figure 6:
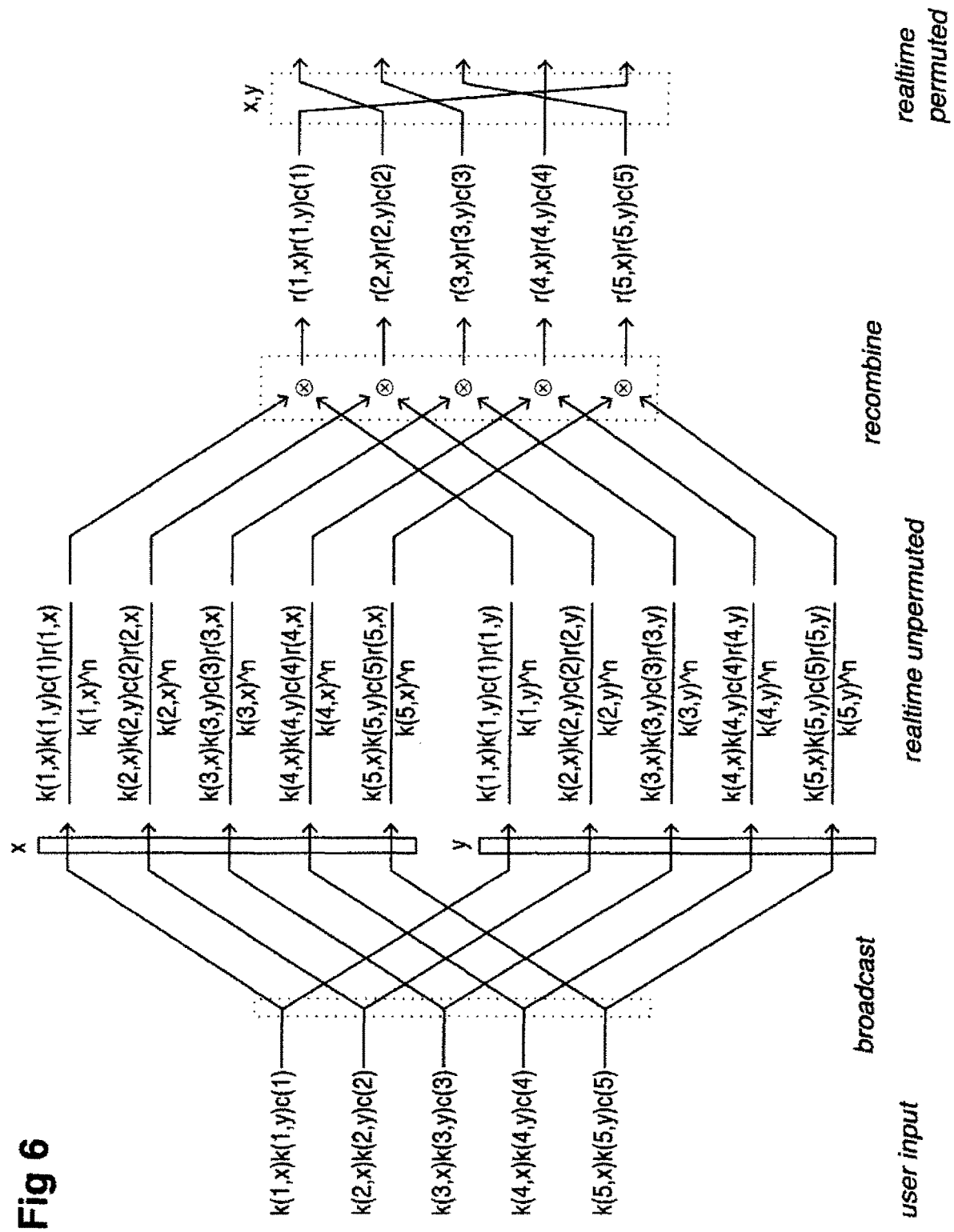
FIG. 6 shows an example broadcast unpermuted phase in combination block and cryptographic schematic, in accordance with aspects and teachings of the present invention.

Turning now to FIG. 6, an example broadcast unpermuted phase is shown in combination block and cryptographic schematic in accordance with aspects and the teachings of the present invention. The user input to the mix is shown on the left, as already described with reference to FIG. 3. This input is copied or broadcast to more than one node.

In the example two nodes are shown for clarity; however, broadcast to any number of nodes will readily be understood. It will be appreciated that a network topology of a star rather than a sequence of hops with the same number of nodes may result in lower end-to-end delay, for instance, and thereby may be advantageous.

Each node receiving the broadcast includes the key information, in the example r(i,x) or r(i,y), and removes the subscriber common keys it knows. However, and as will be appreciated, the common key is advantageously in effect removed also from the other copies when they are re-combined as shown. Thus, accordingly in such examples, the common keys enter in the inverse under the group operation with a multiplicity equal the number of copies, one for each node. For instance, as indicated in the example, the common key divided out by the node appears with multiplicity two, but one copy is shown in the numerator, so the net result is that the inverse appears with multiplicity one; but this is believed what is wanted to cancel the appearance of the factor when recombined as shown.

When the copies are recombined using the group operation, as shown, the result is that the common keys are cancelled and the key matter, r( ) in the example, included by the respective nodes remains. Thus, as will be appreciated, this result is suitable for processing by the realtime permuted phase, shown as a dotted rectangle labeled x,y and including the composition of the permutations used in other examples here.

Very concretely, as may be appreciated for clarity, the third component output by x, k(3,x)k(3,y)c(3)r(3,x)/k(3,x)^n, can be written includes k(3,x)k(3,y)c(3)/k(3,x) and so when it is multiplied by the third component of the output vector of y, k(3,x)c(3)r(3,y)/k(3,y), the k( )'s drop out and the result is the desired r(3,x)r(3,y)c(3), the same as shown as the third component of the input to the realtime permuted phase in FIG. 3 already described.

Turning now to FIG. 7AB, flowcharts of pipelined and star unpermuted phases are shown in accordance with aspects of the teachings of the present invention. FIG. 7A relates to the pipelined configuration already described with reference to FIG. 5. FIG. 7B relates to the star configuration described already with reference to FIG. 6.

Referring specifically to FIG. 7A, first step 710 shows processing of a portion of the input by a first node. A second node processes 720 a separate portion of the input, at about the same time as the first node processes the first portion. Then, the at least two nodes each process 730 the portions already processed by the other node. In some examples such pipelining may relate to unpermuted phases of a pre-computed mix, such as already described in detail with reference to FIG. 5. However, it will also be readily appreciated, and in view of the more general description earlier, that this figure may be applicable to a pipelining of a mix without pre-computation.

Referring specifically now to FIG. 7B, first step 750 is shown copying data into at least two copies related to the input to the unpermuted phase, whether direct input or, as will be understood, such as in examples where pipelining and star configurations are combined. Then nodes include 770 keys in copies related to the node. Finally, the processed copies are combined 790 using in the example the appropriate group operation and provided to the permuted phase for further processing. Steps 770 and 790 cooperate so that the common keys are removed.

It will readily be appreciated that variations include combinations of the approaches described with reference to FIGS. 7A and 7B, and the corresponding FIG. 5 and FIG. 6. For instance, as just one non-limiting example, some pipelining may allow entrance nodes to be located near senders, but some broadcast by those nodes may reduce overall delay compared to pure pipelining.

Figure 8A:
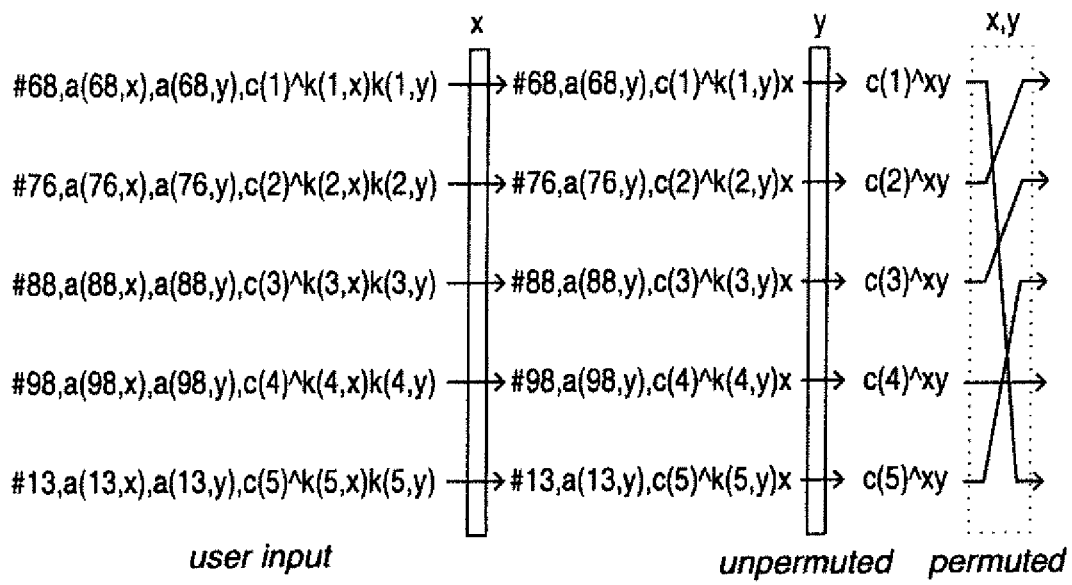
FIGS. 8A and 8B show combination block diagrams and cryptographic schematics of exemplary authentication from users to nodes are shown in accordance with aspects and teachings of the present invention, with FIG. 8A relating to the subscriber identification and explicit authentication provided nodes by subscribers shown in FIG. 1 and with FIG. 8B relating to FIG. 3 shown with subscriber identification and explicit authentication provided to each node.

Turning now to FIG. 8AB, combination block diagrams and cryptographic schematics of exemplary authentication from users to nodes are shown in accordance with aspects and teachings of the present invention. It will be understood as mentioned more generally that authentication by more than one node may be advantageous compared to authentication by a single node; for instance, in terms of credibility with various user populations who may have varying trust in authentication by different nodes. Authenticators aimed at individual nodes are shown in examples related to the examples already detailed without and then with pre-computation. In some examples, if a node's test of an authenticator concludes that the authenticator is invalid, that node should follow protocol and signal other nodes by raising an error condition and the input is ideally rejected and/or regarded as inauthentic.

Referring specifically now to FIG. 8A, an example from FIG. 1 is shown with subscriber identification and explicit authentication provided to each node by each subscriber. The subscriber corresponding to the first input, even though the index is shown as one, as already described with reference to FIG. 1 and FIG. 3, is shown as #68 for the first input, and #76 for the second, and so on. In addition to the explicit indication of the subscriber identity along with the input, authentication information is shown explicitly.

In the example, each node receives separate authentication information from each subscriber. In some instances, such authentication may for example include cryptographic authenticators, such as for instance code-words, so-called "MAC"s, "digital signatures," or whatever type of authenticator. These authenticators are shown using the notation: a(<sender>, <node>). For instance, the third line shows sender with identity #88 providing authenticator a(88,x) to node x. In the example the authenticators are removed by a node that is to check them, though this may be optional and may or may not actually result in an efficiency improvement and forwarding all authenticators to all nodes may be advantageous, such as because of simplicity or robustness in the face of changes in processing.

In some examples authenticators may be a single MAC based on the common key between the node and the sender; the authenticator may even be small compared to conventional prior art practice, as the authentication effect is believe to be cumulative across nodes in some examples. For instance, if there are twenty nodes and each authenticator is merely a single eight-bit byte, the combined effect may be considered to be equivalent to a one-hundred-sixty-bit authenticator by those who trust all nodes and an eighty-bit authenticator by those who trust whatever half of the nodes.

Figure 8B:
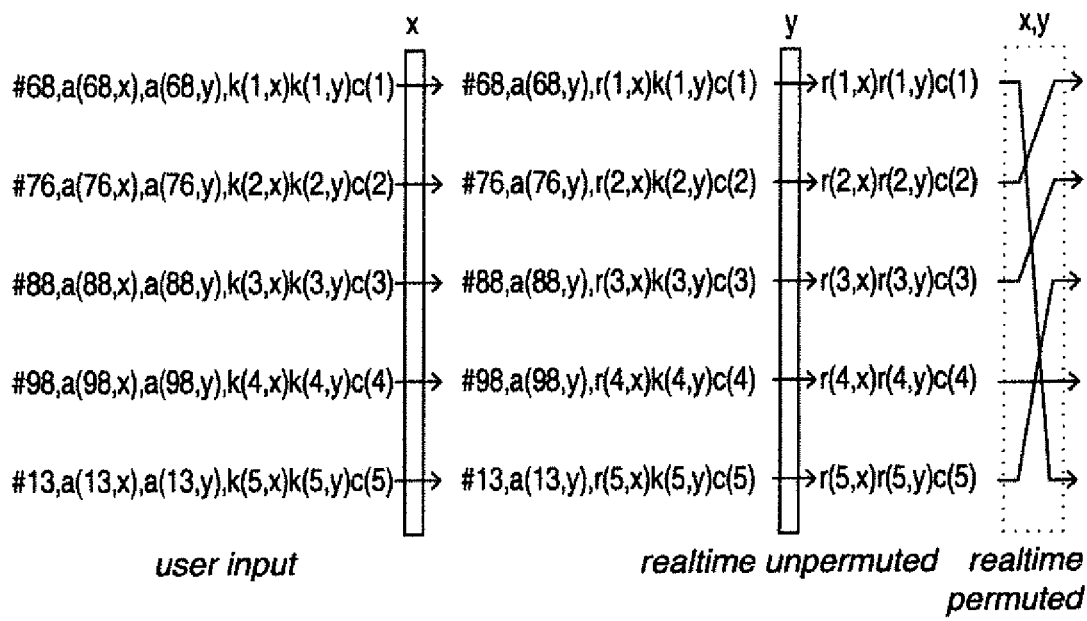

Referring now to FIG. 8B, an example from FIG. 3 is shown for concreteness with subscriber identification and explicit authentication provided to each node. The subscriber corresponding to the third input, #88, provides the authenticator a(88,x) to node x and a(88,y) to y.

Figure 9:
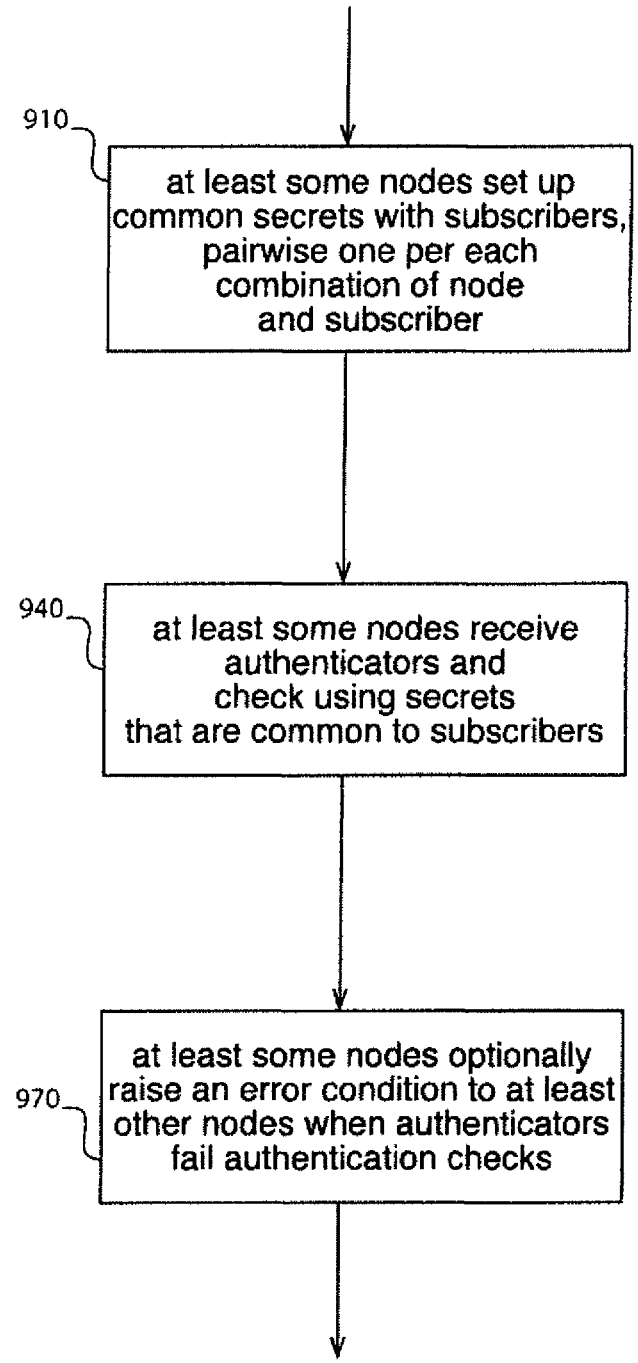
FIG. 9 is a flowchart for exemplary authentication aspects in accordance with aspects and teachings of the present invention.

Turning to FIG. 9, a flowchart is shown of exemplary authentication aspects in accordance with aspects and teachings of the present invention. The authentication examples already described with reference to FIG. 8A and FIG. 8B are described in terms of more general combined flow with some or all nodes participating.

The nodes establish common secrets with subscribers at least for other purposes as described here, such as with reference to FIG. 1 and FIG. 3, for unlinkability. These same keys additionally, and/or optionally other keys, may be used for authentication; however, the common keys will be taken here as used for authentication without limitation or loss of generality. As mentioned already with reference to FIG. 8, such authentication can be by one or more nodes. It need not be applied uniformly for all users. It may be applied adaptively, such as changing users and nodes based on past experience. Public key authentication of subscriber submissions is also anticipated; however, it is believed that symmetric encryption and small authenticator size may be advantageous in terms at least of efficiency. In some cases making using the same key for different functions is known to inhibit the release of the key for one function as it also enables other functions; though multiple purposes for a single key may be frowned upon for cleanliness in secure designs.

Referring now specifically to the figure, step 910 is the establishing of the keying information at least by the nodes that is known to pairs made up of a user and a node. Step 940 includes nodes receiving authenticators and checking the validity of the authenticators using the common keys corresponding to the sending subscribers. Then in step 970 nodes may optionally signal other entities, such as for instance other nodes, that a particular authentication has failed to check. In some examples, if authentication fails a message may simply not be forwarded, be replaced by some other information, or not be passed forward. As will be understood, not shown for clarity, is signaling that authentication is successful.

FIG. 10 through FIG. 27 to be described are believed to be transaction overlays that can apply to or be adapted to apply to a wide range of untraceable sending schemes, including mixes, and specifically also including the mixes described here with reference to FIG. 1 and FIG. 3.

Figure 10A:
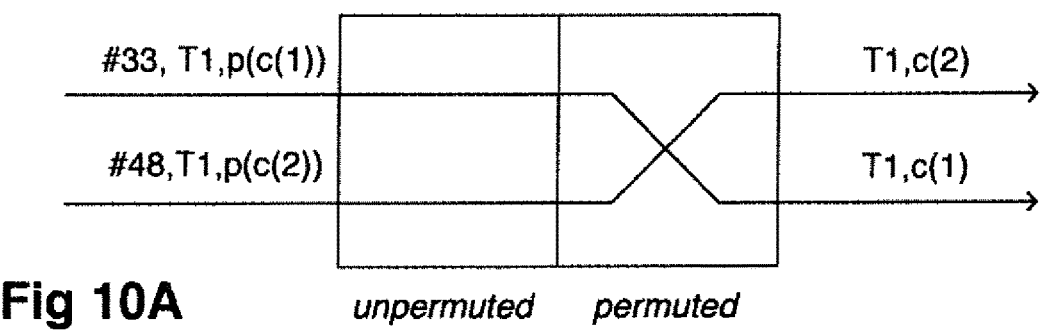
FIGS. 10A and 10B show combination block and cryptographic schematic diagrams for basic single and multiple message block sending in accordance with aspects and teachings of the present invention, with FIG. 10A related to the sending of a single block message and FIG. 10B related to sending of an example of two messages that are linked at output and forming a single concatenated message.
Figure 10B:
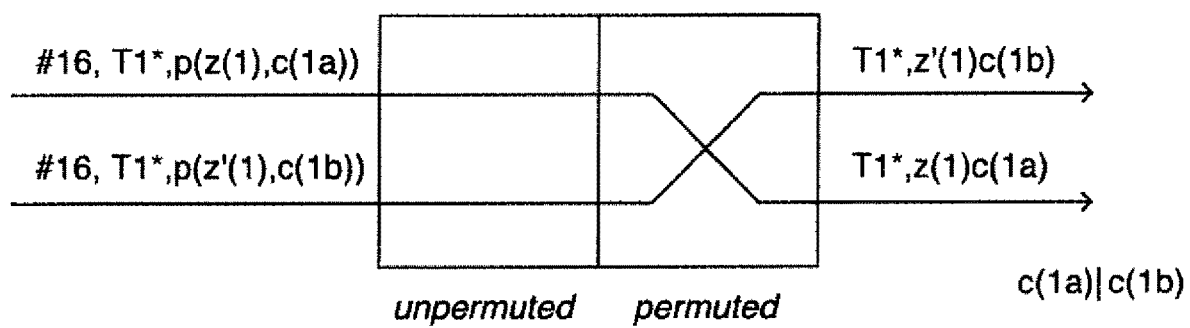

Turning now to FIG. 10AB, combination block and cryptographic schematic diagrams are shown for basic single and multiple message block sending in accordance with aspects and teachings of the present invention. FIG. 10A is the sending of a single block message; FIG. 10B depicts sending of an example of two messages that are linked at output to form a single concatenated message.

The diagrams show two example phases of mixing, unpermuted and permuted. They apply for instance to the embodiments described with reference to FIGS. 3 and 4 to those of FIG. 1 and FIG. 2, as well as to a wide range of mixing. A multiplicative notation may be used for clarity, as already described, but without limitation. The particular order and to some extent groupings are examples, as will be understood.

As used elsewhere here, such as with reference to FIG. 12, FIG. 14, FIG. 16, FIG. 17, FIG. 19, FIG. 21, and FIG. 23 the rectangles in the center show two aspects of the novel mixing disclosed here, unpermuted and permuted phases, respectively; the messages travel straight through the unpermuted phase and are shown with an example interchange in the permuted phase. In some cases dotted lines illustrate other traffic not described in detail for clarity. Example snapshots of message form are provided, such as for the input on the left and the output on the right and in some examples in the intermediate phases. The hash sign "#" followed by an integer is intended to denote the identity of a user or subscriber. Elements in coma-delimited lists that begin with a capital "T" are here called "tags," data items identifying a type of data.

Referring now more specifically to FIG. 10A, a basic untraceable messaging system is shown. Two example senders, #33 and #48 are shown using the basic message tag "T1," as mentioned. What is sometimes referred to here and elsewhere as the "payload" of their messages is message content c(1) and c(2), respectively. The tag is included in the input, in a way intended to indicate that it may be visible to the mix nodes and when visible in the output may be shown there as well. The "p(c(1))" notation is intended to indicate that the message content c(1) is encrypted for decryption by the mix nodes as the payload carried by the message and is in some examples cleartext or the like on output. Each message may be thought of as being treated separately in this example.

Referring to FIG. 10B, however, messages may be grouped so that the resulting payloads can be combined, such as by concatenation, into larger message outputs. The tag for this type of message is shown as "T1*" in order to suggest that it may be a candidate to replace tag "T1" throughout a system to offer larger payloads and accordingly the other examples shown using "T1" may be taken to be "T1*" tags as an alternate embodiment.

In the example illustrated, for clarity and concreteness, two inputs are shown from the same user, #16, one with a payload of c(1a) and the other with payload c(1b). The two inputs from the same user are mixed to different and essentially randomized positions in the output vector; however, because of the tag "T1*" the first field of each is treated as what will here be called a "marker," shown as "z(1)" and "z'(1)," allowing the pair to be recognized and the two outputs to be grouped together, such as by the concatenation "c(1a) c(1b)," as will be understood. In some examples the outputs may be sorted and these fields may be in the higher-order positions and such pairs or larger sequences may appear as adjacent, particularly if they differ only in their lower order bits as sequence bits and are chosen randomly and of sufficient length to reduce the possibility of collisions, as will be understood. Thus, markers may be said here to "match" if they appear to relate to the same message at least with high likelihood.

Figure 11:
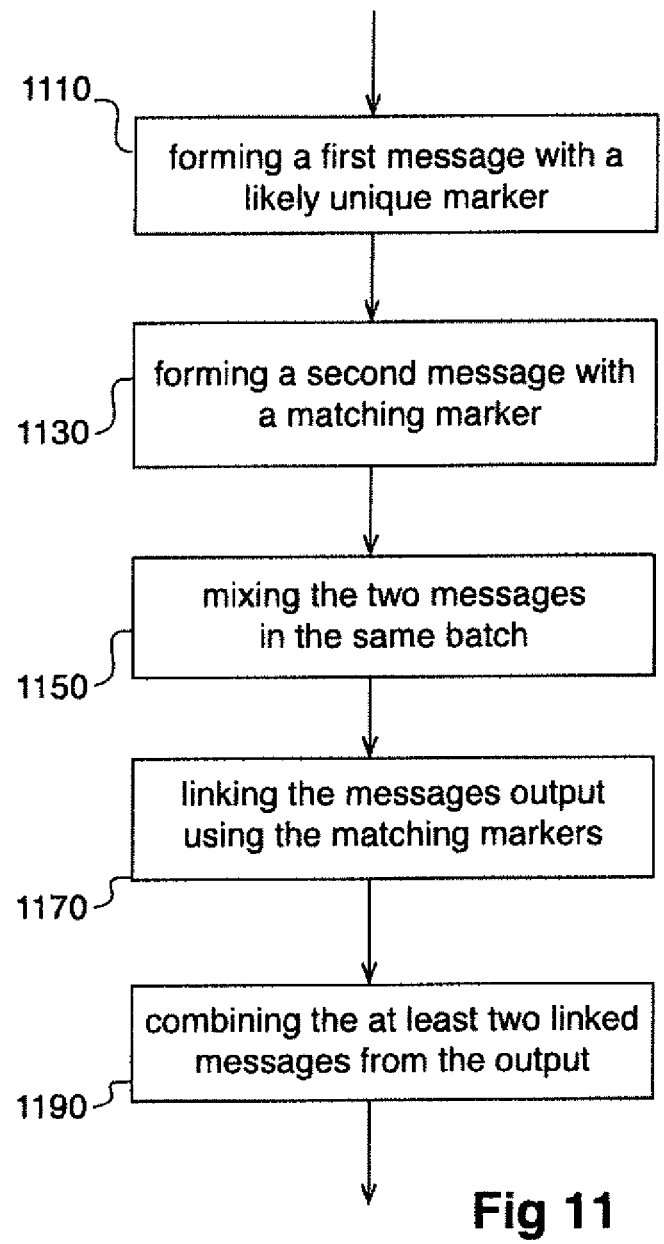
FIG. 11 is a flowchart depicting multiple message block sending in accordance with aspects and teachings of the present invention.

Turning now to FIG. 11, a flowchart is shown for multiple message block sending in accordance with aspects and teachings of the present invention. The steps correspond to the operation according to FIG. 10B already described.

Referring to step 1110, a subscriber forms a first message input to the mix that includes a marker that is at least unlikely to be chosen by another user instance, such as by choosing the marker at random. A second message with a related marker is also formed 1130 by a user. The messages are treated as inputs to a mix, in some examples for the same batch, and they are mixed 1150. The resulting messages in the output of the mix are linked 1170 by the related markers, such as by appearing adjacent in sort order as mentioned earlier. Finally, the linked message outputs are assembled and/or treated together 1190.

Figure 12A:
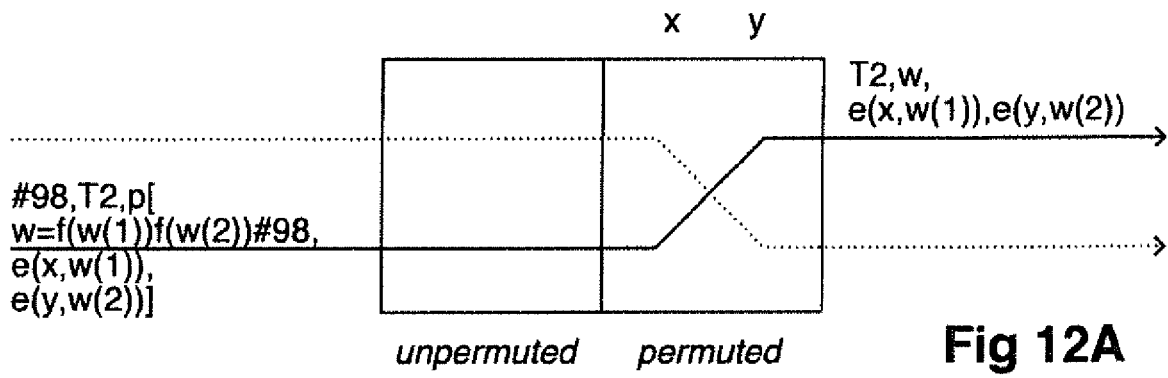
FIGS. 12A and 12B, are combination block and cryptographic schematic diagrams for untraceable return addresses in accordance with aspects and teachings of aspects of the present invention, with FIG. 12A relating to the establishing of an untraceable return address and FIG. 12B relating to the sending of a message using such an untraceable return address by a sender directing the message to the creator of the untraceable return address, even though the identity of the creator of the untraceable return address is unknown to the sender.
Figure 12B:
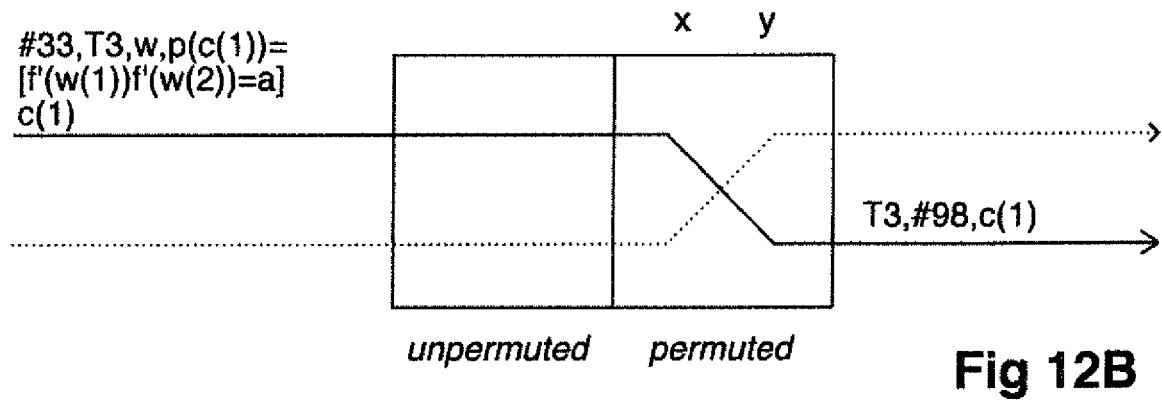

Turning now to FIG. 12AB, combination block and cryptographic schematic diagrams are shown for untraceable return addresses in accordance with aspects and teachings of aspects of the present invention. FIG. 12A illustrates the establishing of an untraceable return address; FIG. 12B depicts the sending of a message using such an untraceable return address by a sender directing the message to the creator of the untraceable return address, even though the identity of the creator of the untraceable return address is unknown to the sender.

What are here called "untraceable return addresses," such as those proposed by the present applicant in the original mix publications mentioned earlier, are known in mixing systems. The present example illustrates how they can be achieved in a novel aspect of the present novel mixing. An example use of such a technique is where the sender of a request wishes to remain anonymous to the recipient of the request, but still wishes to receive the reply.

Referring specifically first to FIG. 12A, in what may be referred to here as "establishing" the untraceable return address, the user #98 in the example provides an input with the tag "T2." What will be called here a "marker" is the first component of the payload. In the example shown, the marker w is formed as the product of images under a one way function $f$ of two keys, w(1) and w(2), and the address of the user #98. These keys are shown as each separately encrypted, one as the third component of the payload and the other as the fourth: the encryption of w(1) for node X using the public key of node X is denoted e(x,w(1)); the encryption of w(2) for Y similarly as e(y,w(2)).

In the output, the same tag appears again to denote the type of mix, with w in the clear, identifying this output instance so that in some examples the decrypted keys can be linked to it and used with it as a first payload as will be described with reference to FIG. 12B.

Referring now to FIG. 12B, a subscriber #33 wishes to send the message c(1) to the subscriber who has established the untraceable return address. The untraceable return address is supplied in some way by subscriber #98 to subscriber #33. In some examples, the untraceable return address may be sent, for instance, by being published or as a payload in a T1 message as already described. In whatever way the untraceable return address is sent, in the example it consists of w=$f$(w(1))$f$(w(2))#98 and ac(1), where a=$f'$(w(1))$f'$(w(2)).

When the tag "T3" appears in the input, the mixes know to use the secrets that were encrypted under their respective public keys from the corresponding instance of FIG. 12A, identified by the w that also appears in the input. Each mix applies the one-way function $f$ to the secret w( ) separately received in the instance of FIG. 12A and divides the result out of the third input component, w. The result, after passing through all mixes, is that the delivery address #98 appears as the second output component. Treatment of the fourth input component by the mixes is similar, but instead of $f$ a different one-way function, $f'$, is used, believed advantageous in the example for instance in terms of keeping #33 from discovering the address #98. Accordingly, the cleartext payload c(1) is shown as the third component of the output.

It is anticipated that payload content may be encrypted by the second subscriber, such as using keys also supplied by the first subscriber. It is further anticipated that a single first establishing instance can be used for multiple sendings.

Figure 13:
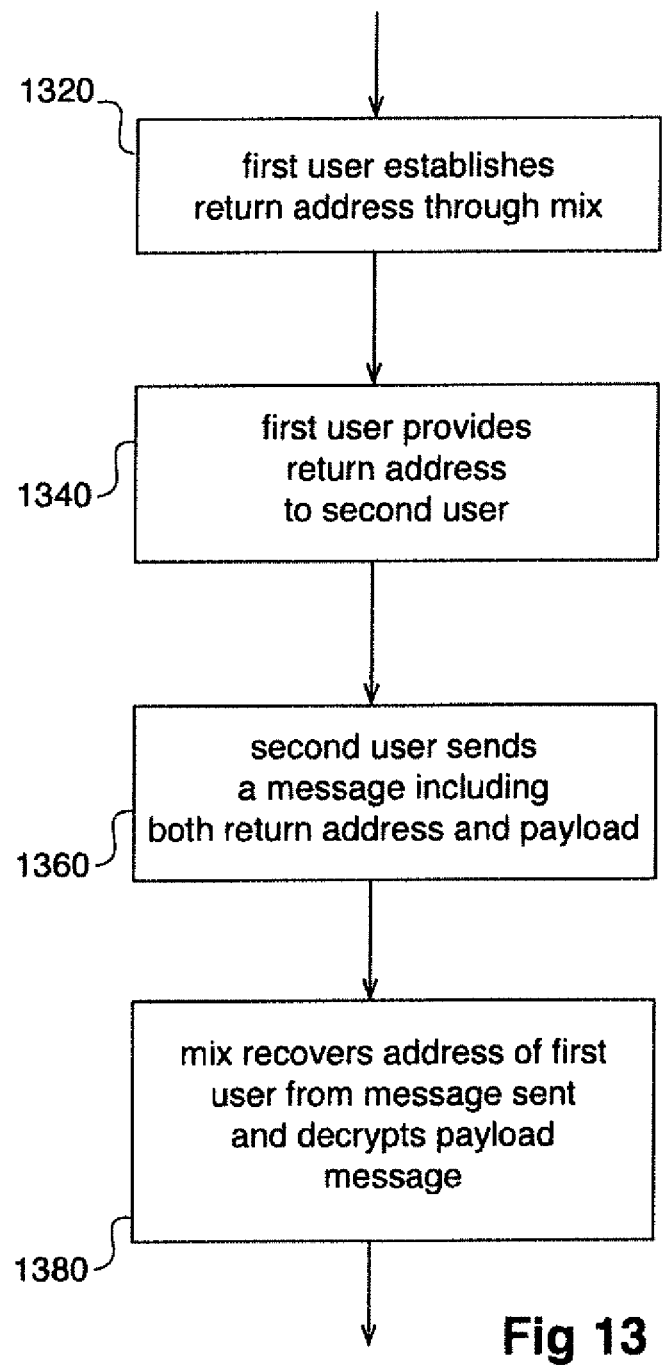
FIG. 13 is a return address sending flowchart in accordance with aspects and teachings of the present invention.

Turning now to FIG. 13, a return address sending flowchart is shown in accordance with aspects and teachings of the present invention. The steps correspond to the operation according to FIG. 12A and FIG. 12B, as already described.

The first user sends the return address through a mix 1320, to hide the correspondence between the user and the address, establishing the untraceable return address. Then the first user provides 1340 a second user with the address. Next, the second subscriber who has obtained the return address from the first subscriber uses it 1360 to form a mix input that includes both the return address and an actual message content. Once this input from the second user is mixed 1380 the recipient address and payload appear in the output.

It will be appreciated that among the advantageous properties achieved by the examples shown are believed to be: that the second user cannot learn the identity of the first user; that the first user does not need to anticipate the identity of the second user in forming the untraceable return address; that no persistent public keys are maintained by the nodes across the various batches; and that no public key operations are performed in sending, mixing or delivering the message from the second subscriber.

Figure 14A:
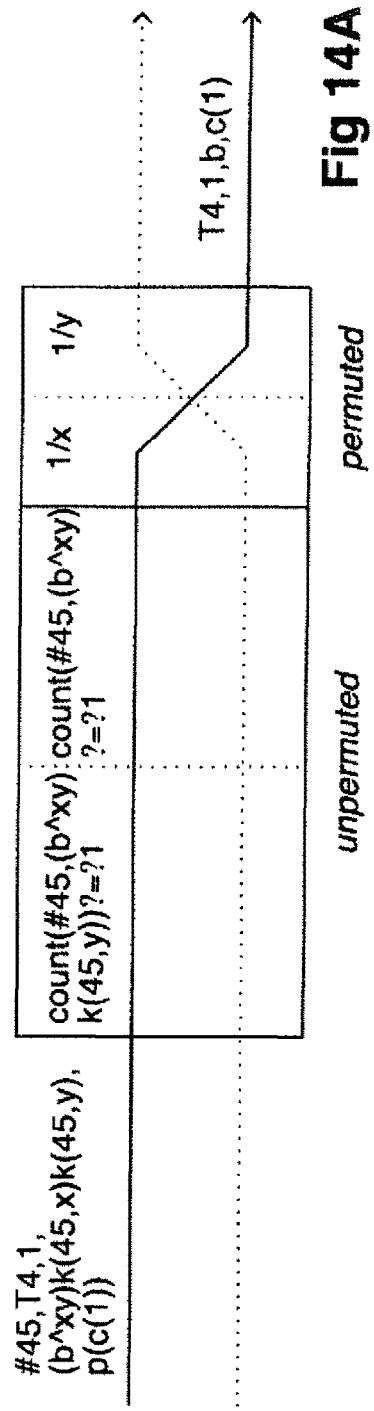
FIGS. 14A, 14 B and 14C are combination block and cryptographic schematic diagrams for limitation of multi-sending in accordance with aspects and teachings of the present invention, with FIG. 14A related to the limitation to a single sending of a particular type per user, FIG. 14B related to the indication being determined in a way that at least the user cannot readily guess what it will be or control what it will be, and 14C related to designators repeated across users when parameters are repeated by users.
Figure 14B:
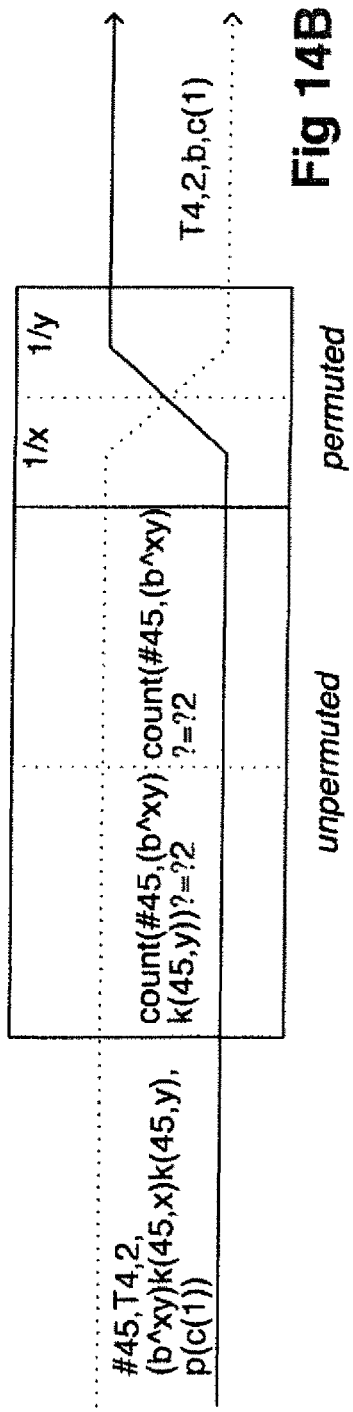

Turning to FIG. 14AB, combination block and cryptographic schematic diagrams are shown for limitation of multi-sending in accordance with aspects and teachings of the present invention. FIG. 14A is the limitation to a single sending of a particular type per user; and FIG. 14B shows the indication being determined in a way that at least the user cannot readily guess what it will be or control what it will be. The same tag type "T4," optionally with variations, is used for both kinds of messages and variations with any number of messages, with revealed and or partially or fully hidden count anticipated.

Referring more specifically to the example of FIG. 14A, the input from user #45 is shown with tag "T4.1" as mentioned, a count of one, a value u here called a "designator" in an encrypted form and a p( ) encrypted payload message c(1) as described already elsewhere. The first node, x in the example, removes the base common key value, shown as k°(45,x), which is fixed for this pair of user and node, such as for instance being computed by each as unique one-way function of a common seed. Node x also checks that this designator has not been used previously by #45, in accordance with the count of one, as indicated by the "?=?" equality test notation used here. Then the second node removes the base common key value, k°(45,y) from #45, and also similarly checks that this designator has not been used previously by #45.

In another novel aspect, with more general applicability, but shown only here for clarity, instead of factors r(x) and r(y) being included in what is sometimes called the "base," that is the value being raised to whatever power, factors denoted v(x) and v(y) are shown in the exponent of a modular arithmetic system. Accordingly, these factors are removed by raising to powers corresponding to their inverses during the permuted phase, as will be understood. The result is the cleartext designator u, already described and to be described further, being output.

Not indicated for clarity as elsewhere here, as will be appreciated, are the additional factors or encryptions inserted during the non-permuting phase, as already described, such as with reference to FIG. 1 and to FIG. 3.

It will be appreciated that the user/subscribed being able to choose the designator while keeping confidential which designator which sender chooses but ensuring that no user/subscriber can repeat a designator, allows the designator to be chosen by the user/subscriber, for instance, as the name of an election or online forum or other association of data where such assurances are advantageous. For instance, voting a particular contest is typically to be limited to one vote per user and posting on a forum or group or whatever associated public or limited distribution data under a pseudonym in some circumstances is advantageously done while establishing that the user posts there under no other pseudonyms.

Technically, as will readily be appreciated by those of skill in the art, in some embodiments the users should not be able to choose the a values freely, but rather in a way that limits what can be known about the structure of these values in the number system. Such issues are well known in signature schemes and are solved, for instance, by including padding structure requirements in the number or requiring that the number be an image under other cryptographic functions and the like. A variety of ways are known and anticipated to allow the users to choose the values to encode the election or forum or the like without giving too much control over the structure of such numbers. As a concrete example, u can be defined as the image under a hash function of a unique encoding of text defining the actual election contest or forum or the like.

It will also, however, be appreciated related to FIG. 14A that a believed advantageous inventive aspect is that by varying the number shown as one in the figure, a different limit can be put on the number of instances, and the subscriber sending the limited number of messages can remain anonymous among the subscribers sending limited messages for whatever designations.

Referring now to FIG. 14B, an example is provided of a message designator that is believed hard for the sender to predict. It is moreover, in this example, what may be called here "repeatable across multiple senders": put differently, if two independent senders use the same input parameter, the same indication should result. DifferenceS with the examples described with reference to FIG. 14AB include that the count is not shown as checked and the exponents applied by the nodes are unknown to the users.

In one example application, users who wish to be in contact with each other only in the case that there is a mutual such interest can send messages with both user identities (e.g., concatenated in a fixed order such as lexicographic). If multiple items are posted as a result, replies can be generated. In some examples, replies can be by untraceable return addresses, such as those described with reference to FIG. 12AB and FIG. 13, contained in the payloads. In other non-limiting examples, return indications, such as those described with reference to FIG. 28ABC, FIG. 29AB and FIG. 30AB, can inform senders of a match.

Turning now to FIG. 15AB, flowcharts are given for limitation of multi-sending and other encrypted payloads in accordance with aspects and teachings of the present invention. The steps of FIG. 15A correspond to the operation according to FIG. 14A and FIG. 14B, as already described; those of FIG. 15B relate to those of FIG. 14C.

Referring now particularly to FIG. 15A, step 1510 is the subscriber forming the input to the mix, including by encrypting the designator in a way that yields the same encrypted value for that user and that designator, such as that described already with reference to FIG. 14A. The nodes check 1420 the encrypted designator and the count of the number of times if any it has been used previously; if this check fails, in some examples at least, the nodes abort the processing of the message.

It will be understood that the nodes may each "see" a different encryption of the designator, as they remove and/or apply encryption successively, as already mentioned or they may see the input data. Further processing 1530 in a permuted phase by the mix nodes further decrypts the designator. The output of the mix includes 1540 the decrypted designator and a count or the like if applicable.

Figure 14C:
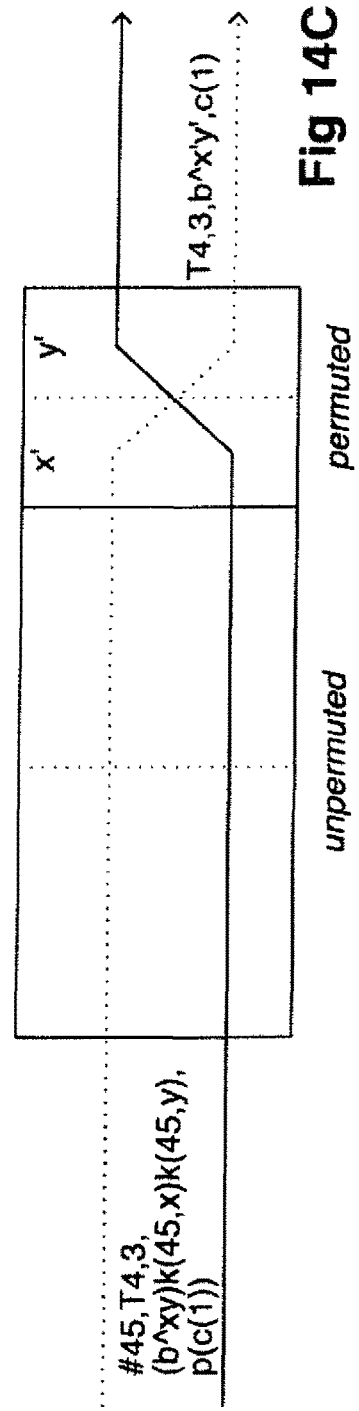

Referring to FIG. 15B, step 1550 is the user encrypting a designator so that it will repeat across users, as has already been mentioned with reference to FIG. 14C. The message may include a message type indicator and other payloads, as has been mentioned. Step 1560 shows the mix nodes encrypting the designator, successively, as it travels through the mix. The keys used for this encryption, need not be public, but for repeatability across users would typically be retained and used repeatedly, as will be understood. Also, as will be understood, if public keys are available related to these private keys, verification of the process may be provided for. Finally, referring to step 1570, the encrypted designators are output along with whatever types and optional payload(s), as mentioned.

Turning to FIG. 16AB, combination block and cryptographic schematic diagrams are shown for credential base establishing in accordance with aspects and teachings of the present invention. FIG. 16A is the establishing of a single base credential for a user; FIG. 16B shows establishment of a second credential base for the user. The same tag type "T5" is used for both kinds of messages and variations with any number of bases, with revealed and or partially or fully hidden count are also anticipated. It will be appreciated, however, that a believed advantageous inventive aspect is that the base credentials are not linked to the actual credentials, as will be described further with reference to FIGS. 17A and 17B.

Referring more specifically now to the example of FIG. 16A, the input from user #75 is shown in this example with tag "T5" as mentioned, and a count of one. The actual base number can be chosen by the nodes in various ways; an example provided is as a so-called "one-way" function $f$ of the user number and the count. This value, however, is encrypted by the nodes successively, in some examples using special keys for this purpose, shown here as x'" and y'". It is believed that these keys need not be made public, but are used here in some sense to keep users from being able to create these values themselves. The encrypted image under $f$ becomes the pseudonym base in the output, as shown, and can be recognized by the subscriber or simply returned to the subscriber, as there is no permuting phase in this example for clarity. The resulting credential base is shown as b and will be referred to again with reference to FIGS. 17A and 17B.

Referring to FIG. 16B, the input from user #75 is again shown in this example with tag "T5" as mentioned and a count of two, which is checked for by the nodes, only two of which are shown here for clarity as elsewhere and as will be understood. The other difference with FIG. 16A already described is that the output base is shown as b'. Any number of such additional instances may be allowed in some examples. When it is desired that they should be distinguished, different keys can be used by the nodes for the distinguishable instances.

Figure 17A:
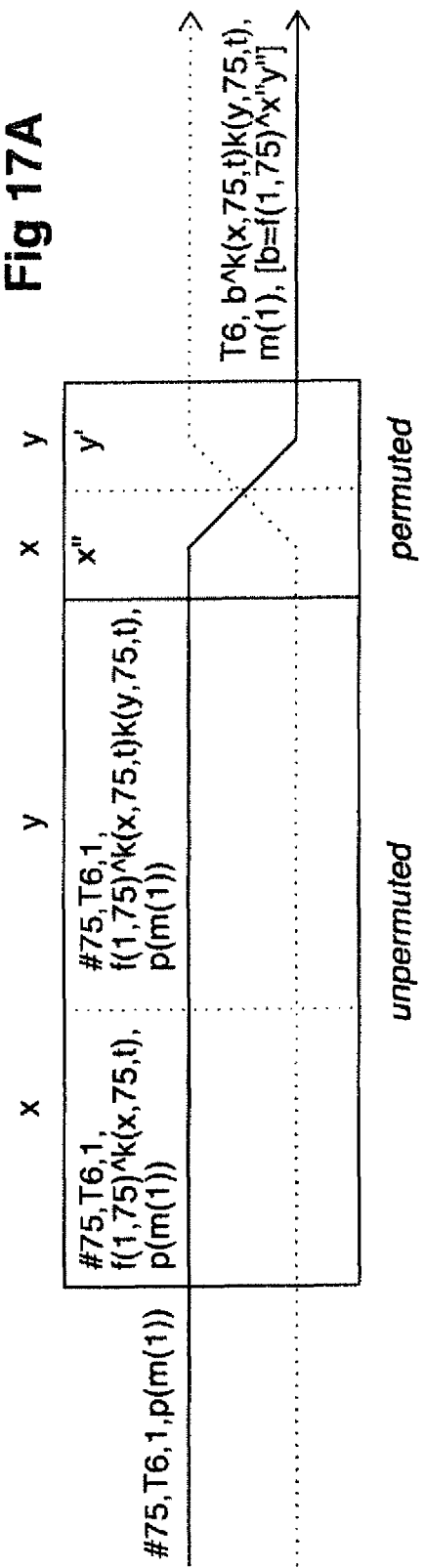
FIGS. 17A and 17B are a combination block and cryptographic schematic diagram for a pseudonym with credential showing in accordance with aspects and teachings of the present invention, with 17A related to the pseudonym itself and 17B related to the signature on the pseudonym.
Figure 17B:
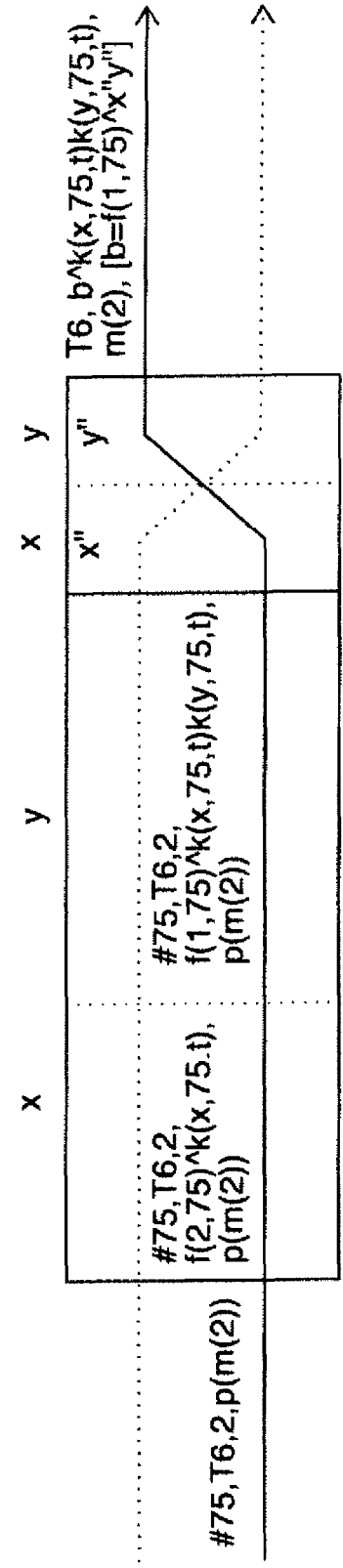

Turning to FIGS. 17A and 17B, a combination block and cryptographic schematic diagram is given for a pseudonym with credential showing in accordance with aspects and teachings of the present invention. A single pseudonym with a single credential is shown for a user; however, additional payload instances may advantageously show credentials on them, as will be mentioned, but these additional credentials are not shown for clarity.

Referring specifically now to the figure, subscriber #75 uses tag "T6" to indicate transmission of what will be understood by those of skill in the art may be referred to as a "credential on a pseudonym." This is made up of the two payloads shown for clarity: the first is the pseudonym itself; the second is the credential "power" or "signature" on the pseudonym.

At each unpermuted step, the nodes apply the same function $f$ used to create the base pseudonym in processing the first component, as already described with reference to FIG. 16. What they apply the function to, however, are images under k'. Each such k' in the example can also be computed by the user. Accordingly, the user is believed to know the power of the public generator g that is combined multiplicatively with the image under $f$.

During each permuted step, the nodes apply the x''' and so forth to the first payload component and the second payload is decrypted using x and y, as in already described examples as will be understood. What is believed accordingly to be provided to the recipient is a pair of values, the second being the secret q power of the first.

The value q in the example is the secret exponent of the organization or entity issuing the credential, as will be understood by those of skill in the art. This issuer in the example makes public a power of an already public number, in the example shown, the x''' and y''' power of the public generator g. Thus, user #75 can form c, as already mentioned, and then apply c to this public value to obtain the second component shown transmitted.

The recipient organization would of course typically wish to verify that the two components received are in fact related by the exponent of the issuer, q. One way this can be accomplished, as will readily be apparent to those of skill in the art, is through an interactive proof with the issuer. In such a proof, the pair can even be hidden from the issuer, by so-called "blinding," as will also be understood.

It is believed that in typical example applications the recipient may wish to what is sometimes referred to as "link" the various pseudonyms that arrive from the same user. One example way to accomplish this, as will be readily understood, is to include a further component in the transmissions and for it to be some form of authenticator of the user, such as a pass-phrase or signature or the like. In other believed advantageous examples, as will also be appreciated, a credential may be shown that is unique to the combination of issuer and user. Accordingly, for instance, the recipient chooses a unique exponent key for the user and issues the user a credential with it and then expects to see that power on the same base as already described for the other credential received in the transmission.

Turning now to FIG. 18AB, flowcharts are provided for credential base and credential pseudonym issuing in accordance with aspects and teachings of the present invention. The steps of 18A correspond to the operation according to FIG. 16A and FIG. 16B, as already described; while those of FIG. 17A and FIG. 17B, correspond to those of FIG. 18B, as already described.

Referring to FIG. 18A, the user begins by requesting 1810 a credential base using a particular message type for this purpose. Then the nodes check 1820 a count related to the type of base requested, to ensure that only the allowed number of instances of the base type are issued to the particular user. Next the nodes form 1830 a base in a way that the user cannot know the relation to another base, such as being able to express each as a different public-key encryption of a common value. In some examples, this is by choosing the bases as images under a so-called "one-way" or other cryptographic function without known structure related to the signature technique to be employed for the credential system. Finally, nodes mix 1840 the base as they apply encryptions so as to make the base in practice unlinkable to the requesting subscriber.

Referring to FIG. 18B, the user begins by requesting 1860 a credential pseudonym, using a designated message type for the request, so that the message receives corresponding processing by the nodes. The nodes then encrypt 1870 the submission by applying cryptographic transformations known to but at least not fully controllable by the user. This is believed to allow the user to transform signatures on one pseudonym of the same base onto the other pseudonyms of the same base, as in known credential mechanisms. Next the nodes mix 1880 the pseudonym from the previous step, applying encryptions that hide the association between the user and the output pseudonym. In the examples shown, but without any limitation, this is accomplished in a way that matches what was done in establishing the pseudonym base, so that the relationship between the base and the pseudonyms is known to the user, in the example in terms of an exponent.

Figure 19A:
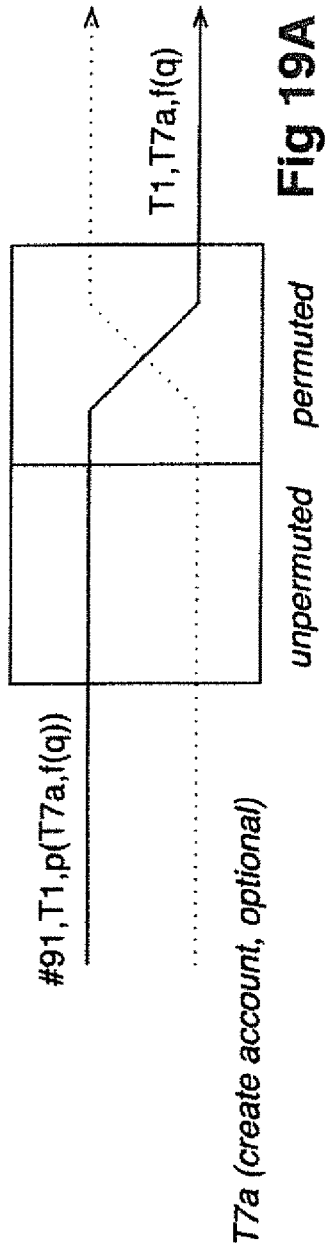
FIGS. 19A, 19B and 19C are combination block and cryptographic schematic diagrams for payment initiations in accordance with aspects and teachings of the present invention, FIG. 19A related to the creation of an account without initial funding, FIG. 19B related to the funding of an account from value outside the accounts, and with FIG. 19C relating to the transfer of value from an account to value held outside the accounts.
Figure 19B:
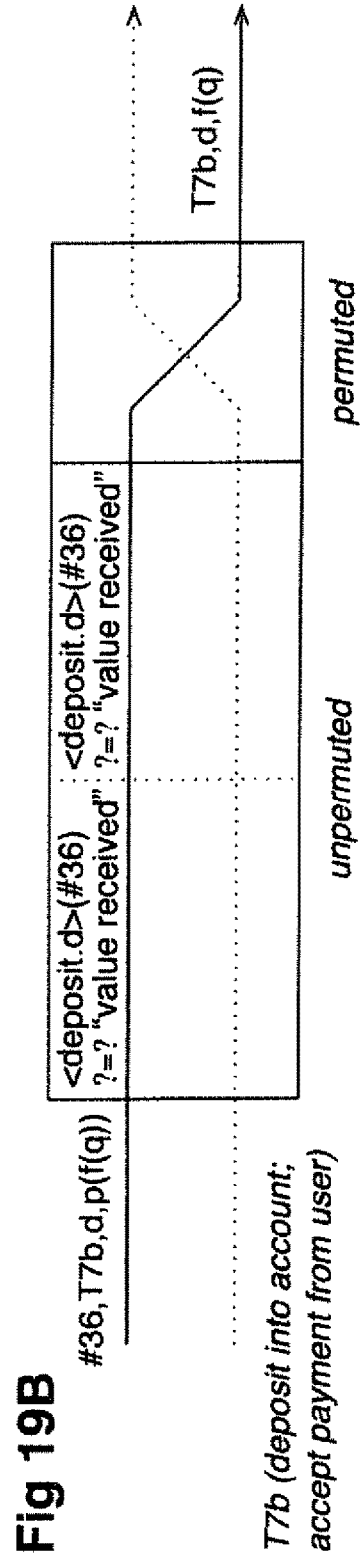
Figure 19C:
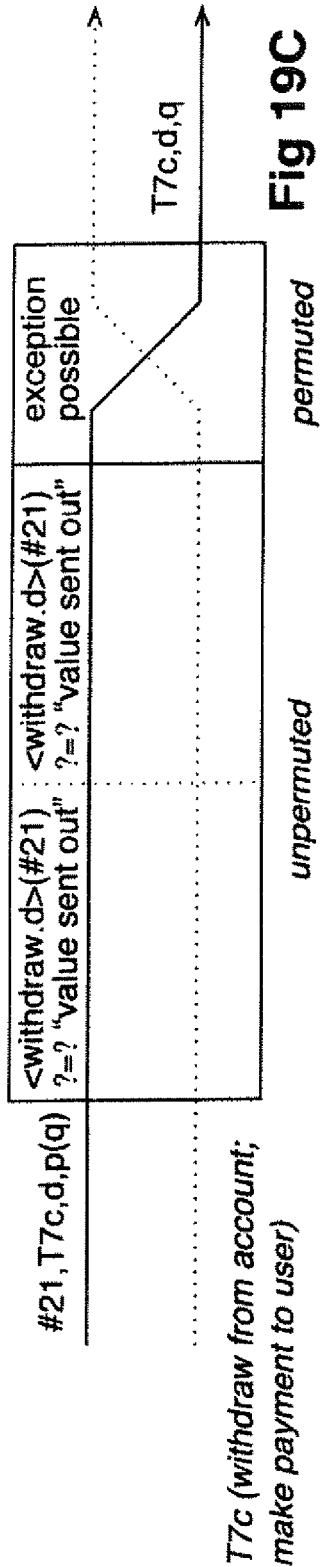

Turning to FIGS. 19A-C, combination block and cryptographic schematic diagrams are shown for payment initiations in accordance with aspects and teachings of the present invention. FIG. 19A is the creation of an account without initial funding, an optional facility; FIG. 1B shows funding an account from value held by a subscriber outside the accounts described here, which may include creating the account if it is not already extant. And FIG. 19C depicts the transfer of value from an account to value held by a subscriber outside the accounts described.

Referring more specifically to FIG. 19A, using a format and notation similar to that already described earlier, a tag of "T7a" is used to indicate this type of transaction, again merely for concreteness in the examples. The subscriber #91 sends the message of type "T1" on the send side, so that it can advantageously, it is believed, be hidden in among other messages of this type, many of which may for instance be for other purposes including non-transactional purposes. The payload, as shown, contains what will be called an "embedded" tag type, in this case "T7a," to indicate on the output side only that the message requests the creation of an account. The other component of the payload shown is the image under a one-way function $f$ of a random value chosen by the user, q. In some examples, control over an account is demonstrated by the showing of such a pre-image q; so, for instance, to move value from the account, at a later time once it has value in it by techniques to be described, the presentation of q in a message will authorize that transfer.

It will be understood by those of skill in the cryptographic transaction art that types of authenticators other than pre-images under a public one-way function may be employed for such authentication purposes. Examples include, public key digital signatures, undeniable signatures, hash function trees or chains, etc. It is believed that a one-way function may be more economical than a signature and adequate under some assumptions about the system; these functions will be used here in the description for concreteness and clarity but without any limitation whatsoever. In some examples, not shown for clarity, more than one such image or pre-image under the one-way function may fit in a single payload, and so more than one underlying operation can be performed per message. Also, as will be appreciated the choice of one-way function may encode denomination and/or currency.

An administrator of the accounts on the output side of the sending system is anticipated. This may be a entity separate from the nodes, related to the nodes, and/or with whatever multiplicity. It is anticipated that the account administrator, considered a single separate entity for clarity, maintains a list of accounts. Each account consists of at least some of: an identifier, an owner authentication, a balance a denomination/currency, and/or an indication of status such as open or closed. In some examples the identifier is the image under the one-way function (or the public key) related to the values used in establishing the account; the pre-image (or signatures) are then the authenticators used to move value from the account, whether to other accounts or to the subscribers, both as will be described. What will be referred to here as a "denomination" is the amount of value in the account. It is well known that a fixed binary denomination scheme, such as 2, 4, 8, and so forth units of value is efficient and can be enhance untraceability. Other denomination schemes are anticipated as are accounts with arbitrary value possibilities, such as integer number of cents, millicents, or even real number values.

The account(s) on the input side of the system, as will be understood, may be part of any known or existing type of financial or value system, such as bank accounts, digital currencies, or certificates of ownership. Moreover, as will readily be appreciated, whatever multiplicity and variety of such accounts may be provided. The accounts may be administered and/or owned and/or controlled by whatever entity or entities, such as the administrator of the output side, already mentioned, one or more nodes separately or jointly, and/or other entities for this purpose.

Referring now more specifically to FIG. 19B, a deposit transaction is shown. The user #36 deposits a denomination d worth of value from outside the system, such as from a bank account, credit card, or cash, to an account within the system that is identified as $f(q)$ in the example. Thus, this transaction can create an account and associate a value d with it and fund it with the value d. In the example, each node has the option to test, validate, or otherwise verify whether the value was transferred in, during the unpermuted phase as indicated by the term used here "value" and the "?=?" notation used here of a test. The output payload is believed essentially unlinkable to the user, since the identifier $f(q)$ is hidden as the payload within p( ). If a user were to choose an $f(q)$ that is already in use and already funded, some exception may occur. In one example, the user may be able to move the extra funding out of the account by showing q or for instance q', such that $f(q')=q$.

In some examples it may be required that the account exist before it can be funded and thus the transaction already described with reference to FIG. 19A may be used for this purpose. In other examples, however, it is believed adequate that the account would be created by the deposit transaction described with reference to FIG. 19B and/or by a transfer as will be described with reference to FIG. 21ABC and FIG. 22ABC.

Referring now to FIG. 19C, a transaction is shown that is believed able to allow what may be called the "owner" of an account to withdraw or remove the value from the account by in effect transferring that value outside of the system of accounts in favor of the subscriber. The example presented here may be regarded as a so-called "optimistic" one, in that it will be assumed that the account exists and is funded; however, in the case this turns out not to be true, provisions may be made to trace back to the user and undo or prevent the transaction from consummating. Such what will be called "exception" handling is indicated in the FIG. as being part of the permuting phase. This is to suggest that the nodes keep information sufficient to allow such exceptional transactions to be traced backwards (such as the permutations related to the transactions of this type in a batch); however, such tracing back may only be needed more or less instantly, as whether the account exists and is funded can be checked immediately when the payload arrives, at least in some examples.

In some applications of payments, withdrawals may be made directly by at least certain entities, such as shops, without the privacy of the protocol example described, as will be understood.

Also, in some applications the exception provision may be replaced by the use of a non-permuting tail technique and certified transactions that will be described with reference to FIG. 23AB, and that will also be mentioned with reference to FIG. 21. A relative advantage of the tail is that the exception possibility and lack of forward secrecy it implies may not be needed; a relative advantage of the exception, however, is believed greater efficiency.

Turning now to FIG. 20A-C, flowcharts are provided for establishing accounts and transferring value between the accounts and external systems in accordance with aspects and teachings of the present invention. The steps correspond to the operation according to FIG. 19A, FIG. 19B, and FIG. 19C, respectively, as already described.

Referring to FIG. 20A, although the user or subscriber action need not be considered a part of the novel aspects, as elsewhere here, as will be understood, they are shown explicitly for clarity. Accordingly, the user creates 2005 an authenticator and account identifier, such as by choosing a mainly random value and using it to generate a pair of keys such as a public key and a private key or, as in the example, a pre-image and an identifying image under a function believed one-way. Next the user requests 2010 creation of the account, by including an appropriate tag and the identifier as the payload of a message. The request can, it is believed, advantageously be included in among other messages being sent. The request can optionally include a denomination, as already mentioned.

The nodes process 2015 the request, such as by considering it a payload and passing it through the un-permuting and permuting phases already described, in order to hide the particular use requesting the particular account. Once the message appears in the mix output, the account is created 2020 with the corresponding identifier and optionally with the requested denomination. Any collision can result in no account being created and/or an exception, as already described with reference to FIG. 19C; however, it is believed that such provisions need not be made in practical systems.

Referring to FIG. 20B, payment by a user into an account include, for clarity, but without limitation, as mentioned, a request 2030 by a user in a designated message type. The user supplies 2035 value, or received from an external system or whatever other type of value is accepted. The nodes can check 2040 that the value was received relative to the request. The nodes decrypt 2045 the account designation, which travels as the payload in the example, during the mixing of the message. Nodes mark 2050 the output corresponding to the designated message type, such as corresponding to the amount deposited and include the account identifier. The account is then marked 2055 as funded.

Referring to FIG. 20C, in a payment to a user from an account, alternatively a withdrawal from the accounts, for clarity, but without limitation, as mentioned, may be considered to include a request 2070 by a user in a designated message type. The request received 2075 includes a user identifier, an amount, and a payload specifying the account authenticator and if not recoverable from the authenticator, the account identifier. The payload decryption 2080 by the mix reveals the authentication and denomination in the output of the mix in the corresponding designated message type. If the corresponding value is available in the corresponding account, and it is requested only this once in this batch, and the authentication is valid, then the value is removed from the account and the transaction completes successfully 2085. If, however, one or more conditions are not met, then an exception indication 2090 is sent back through the mix to reveal the input-side request that is then cancelled.

Turning to FIGS. 21A-C, combination block and cryptographic schematic diagrams are shown for payment transfers between accounts in accordance with aspects and teachings of the present invention. FIG. 21A is the transfer from one account to another, FIG. 21B shows a change transaction in which value in one account split into value funding two different accounts; and FIG. 21C depicts a consolidation of change in which value from two accounts is moved to a single account. It will be understood, however, that many other combinations and variations are readily conceived by those of skill in the payments art and these are merely examples based on an exemplary binary denomination scheme used here for clarity and to provide what is believed a relatively simple yet sufficient set of transaction types.

Referring specifically now to FIG. 21A, the transfer of value between two accounts is shown. The user #54 in the example requests the transfer and includes an authenticator (from which the identifier is assumed readily computable in the example) for the source account and an identifier for the receiving account. The payload is shown containing the tag "T7d" and the information about the two accounts.

As will be understood, various conditions that may not hold can be assumed and/or dealt with in various ways. For instance, (a) the source account may have no value; (b) the destination account may have a different denomination; (c) the destination account may already be funded; and/or (d) the destination account may not exist. Various strategies for dealing with these error situations may readily be conceived. For instance: non-existent accounts may be created (d); denominations of accounts adjusted (b); or the whole transaction cancelled (a) or (c). An exception could be generated, such as already described with reference to FIG. 19B. It is believed that, for efficiency it may be assumed that the user has checked on these potential errors and avoids them, particularly if destruction of value is the system rule in such cases and so the cost of providing for an exception condition may be avoided in practice.

Referring specifically next to FIG. 21B, the transfer of value from one account into two is shown. The user #99 in the example requests the split, such as part of a change making, and includes an authenticator (from which the identifier is assumed readily computable in the example) for the source account and identifiers for the receiving accounts. The payload is shown containing the tag "T7e" and the information about the three accounts and authenticator for the source account. As will readily be appreciated, the various example conditions already described with reference to FIG. 21A have close analogies here and there may be additional issues raised by the addition of a third account. However, the same comments generally apply, as will readily be understood.

Referring finally now to FIG. 21C, the consolidation of value from two accounts into one is shown. The user #16 in the example requests the change transaction of "merging of two coins into one," and includes the two authenticators (from which the identifiers are assumed readily computable in the example) for the source accounts and an identifier for the consolidation destination account. The payload is shown containing the tag "T7f" and the information about the three accounts and authenticators for the source accounts. Again, the various example conditions already described with reference to FIG. 21A and FIG. 21B have close analogies here; however, the same comments again generally apply, as will readily be understood.

As just one example variation, it will be understood that the initiator of a transfer or change transaction may wish to be notified in case it succeeds or in other examples if it fails. One way to accomplish this is using the non-permuting tail techniques that will be described with reference to FIG. 23AB, as already mentioned with reference to FIG. 19C. An example of where this may be useful is to a subscriber that sends identifiers of a number of unfunded coins as a kind of invoice and then wishes to transfer those to other coins and learn that the transfers were successful in order to determine that the invoice was paid.

Figure 22:
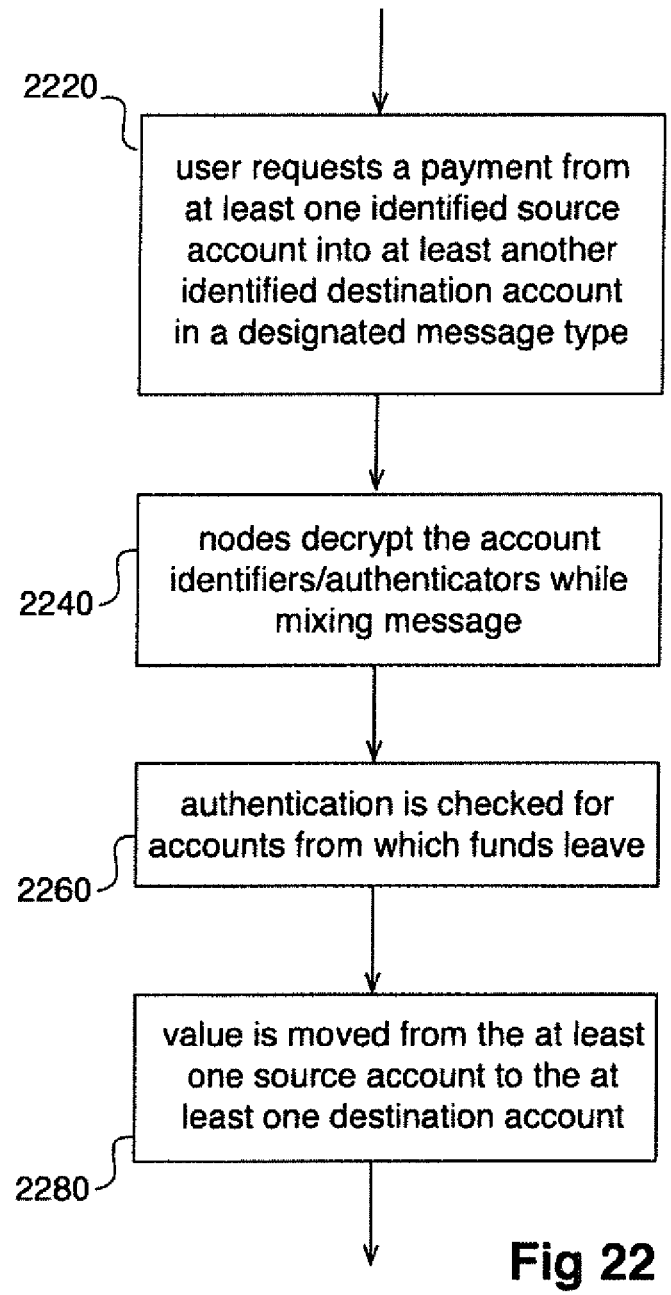
FIG. 22 are flowcharts for transferring value between accounts in accordance with aspects and teachings of the present invention.

Turning to FIG. 22, flowcharts are provided for transferring value between accounts in accordance with aspects and teachings of the present invention. The steps correspond to the operation according to FIG. 21A, FIG. 21B, and FIG. 21C, as already described.

The transactions are initiated by receipt of a request, or depending on the perspective, the sending of a request, as mentioned. The request includes 2220 designation of at least one source account and at least one destination account. Authentication is supplied 2240 for the at least one source account. The payload mixed includes 2240 identifiers for the at least one destination account. The step, accomplished after the mixing, of checking 2260 the authentication for the at least one source account, which as mentioned earlier may be assumed to allow ready determination of the corresponding account identifiers(s). Finally, value is transferred 2280 from the at least one source account to the at least one destination account, assuming the conditions for the transfer, such as those described with reference to FIG. 21A, FIG. 21B and FIG. 21C are satisfied. Various such transactions can, as mentioned, be combined in a single message.

Turning to FIG. 23AB, combination block and cryptographic schematic diagrams are shown for protected communication from a first to a second subscriber in accordance with aspects and teachings of the present invention. FIG. 23A shows an example with message confidentiality; FIG. 23B gives an example with both message confidentiality and authentication of sender. The diagrams are similar to those already described, such as with reference to FIG. 16, FIG. 17, FIG. 19, and FIG. 21; however, additional processing is shown. (Somewhat more detailed examples, as will be appreciated, related more to the embodiment of FIG. 23A will also be described with reference to FIG. 24 without precomputation and with precomputation in FIG. 25 and FIG. 26.)

Referring specifically now to FIG. 23A, a subscriber shown in the example as "#40" provides input to the mix in a "T8" tag type message. The payload includes an embedded type tag "T8," specific to this type of message, a recipient identifier, "#21" in this example, and a payload c(1), shown in the example multiplied by or what may here be called "protected" by two group elements combined by a group operation g(x) and g(y).

Processing recovers the payload, in a manner roughly similar for example to that for tag type T1 already described with reference to FIG. 10A.

An additional unpermuted processing by nodes, what may here be called a "tail," is shown. The tail decrypts the received payload in stages, by the corresponding nodes successively removing the corresponding protection, as will be understood; however each also includes the k(,) respective encryption for the recipient already identified as #21. Thus, the message content can be delivered to the recipient, identified in the example output in cleartext, in a form that the recipient can decrypt, by re-constructing the k(,), and thereby recover the message content c(1).

Referring now to the exemplary embodiment of FIG. 23B, a difference with FIG. 23A already described is that the tag type is "T9" for clarity and there are two separate payloads. The first payload is decrypted by the unpermuted and permuted phase as already described above, to yield #21 as the output; the second payload, however, may be considered to be created by the nodes from the sender identity "#40," in the example, as will be appreciated. It is protected, as shown, by the factors d(x) and d(y), injected by the respective nodes. (In some examples, as will be understood, these factors may be included in a portion of the pre-computation that follows the permutation portion but is still under homomorphic encryption; when the homomorphic decryption is removed, these factors are thus in the corresponding messages of the unpermuted post phase.)

In the tail processing shown, which is non-permuting, each successive node replaces its d( ) by a corresponding k(,) for the recipient #21. This is delivered to the recipient who is able to decrypt the k(,) factors and thereby recover the "#40" that identifies the sender.

As just one example to illustrate uses for a tail that includes the sender identity the option for a "certified" transfer between accounts has been mentioned earlier with reference to FIG. 21. Even without payload, the receipt of such a message could indicate that one or more transfers, whether or not they include combining or splitting coins, completed successfully; in other examples, such a message might be sent without identifying the original sender in case transfers do not succeed. (The distinction believed significant as the party who wishes to verify that the payment were successful could be defrauded if another party could falsify such a message indicating that they were successful; whereas, a party that only expects to be notified in case the payments fail could only be defrauded by deletion of such a message.)

As already mentioned with reference to FIG. 14, a variation generally would allow the user to have a pseudonym identify postings that are made public in the output, such that the user cannot choose the pseudonym, but it can be used repeatably by that user. As just one example, the revealing of the user identity in an intermediate stage as described here with reference to FIG. 23 is believed also optionally modified to allow the user identity to appear in an encrypted form, such that the encryption remains the same across instances.

Figure 24:
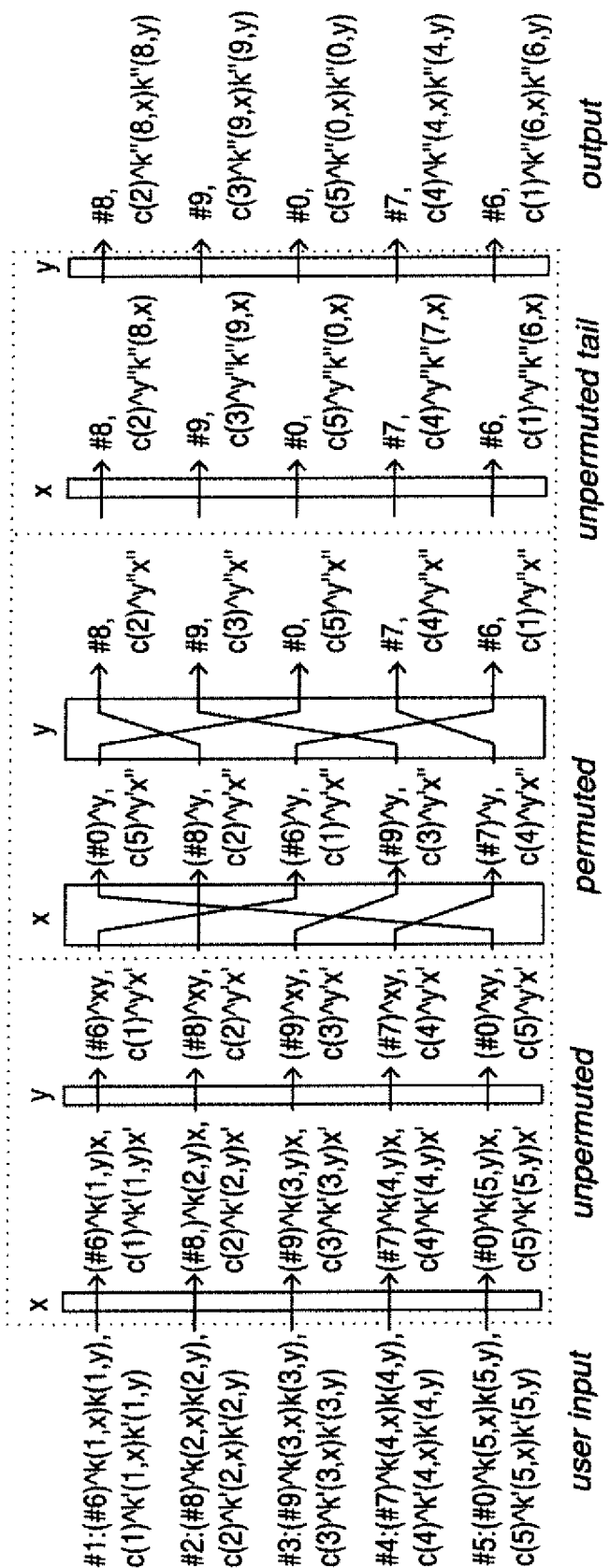
FIG. 24 is a combination block diagram and cryptographic schematic of a non-precomputation mix with message confidentiality in accordance with aspects and teachings of the present invention.

Turning now to FIG. 24, an exemplary combination block diagram and cryptographic schematic of a non-precomputation mix with message confidentiality is shown in accordance with aspects and teachings of the present invention. The subscriber sending the message includes an intended recipient as well as a payload, as separate components of a transmission.

Relative to the example already described with reference to FIG. 1, it will be appreciated that an additional payload input is shown introduced by the user that includes an encryption of identification of the intended recipient. For instance, in the first input by user "#1" (for clarity also in input slot one, even thought the particular slots need not be related to the user identities, as already mentioned), the recipient is designated as subscriber "#6," and this is hidden by the applications of k(1,x) and k(1,y) and then by x and y.

The payload c(1) is protected, in this example, first by k'(,) and then by x' and y' and then by x" and y" and then by k"(,).

As the messages travel through the stages of the three phases, the pair consisting of these two payloads travels together, as can be seen. In the first phase, which is unpermuted, the k(,) and k'(,) are exchanged for xy and x'y', respectively. Then, in the permuting phase, the x,y are removed but the x',y' are replaced by x",y". This allows the next phase, the unpermuted tail, to deliver to the intended recipients using the cleartext recipient identifier revealed by the decrypted first payload; but with message content, c( ), that remains protected and at this stage by the application of k"(,) with the recipient identity as the first parameter.

Figure 25:
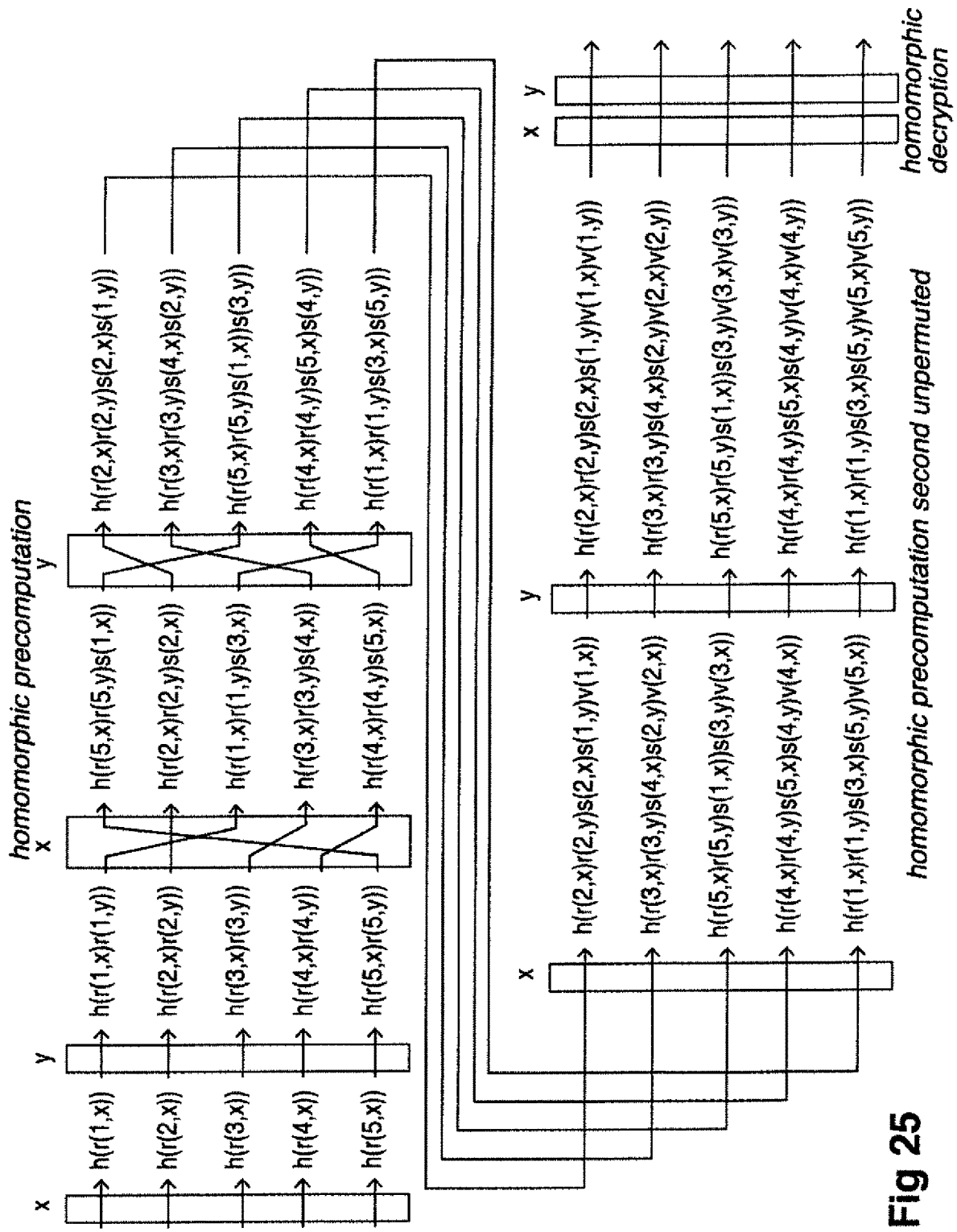
FIG. 25 is a combination block diagram and cryptographic schematic of a precomputation portion of a mix with tail in accordance with aspects and teachings of the present invention.

Turning now to FIG. 25, an exemplary combination block diagram and cryptographic schematic of a precomputation portion of a mix with tail is shown in accordance with aspects and teachings of the present invention. (The corresponding realtime portion will be described in detail with reference to FIG. 26.)

Relative to the example already described with reference to the upper portion of FIG. 3, it will be appreciated that an additional random factor v(,), similar to r(,) and s(,), is shown introduced in the non-permuted phase.

Figure 26:
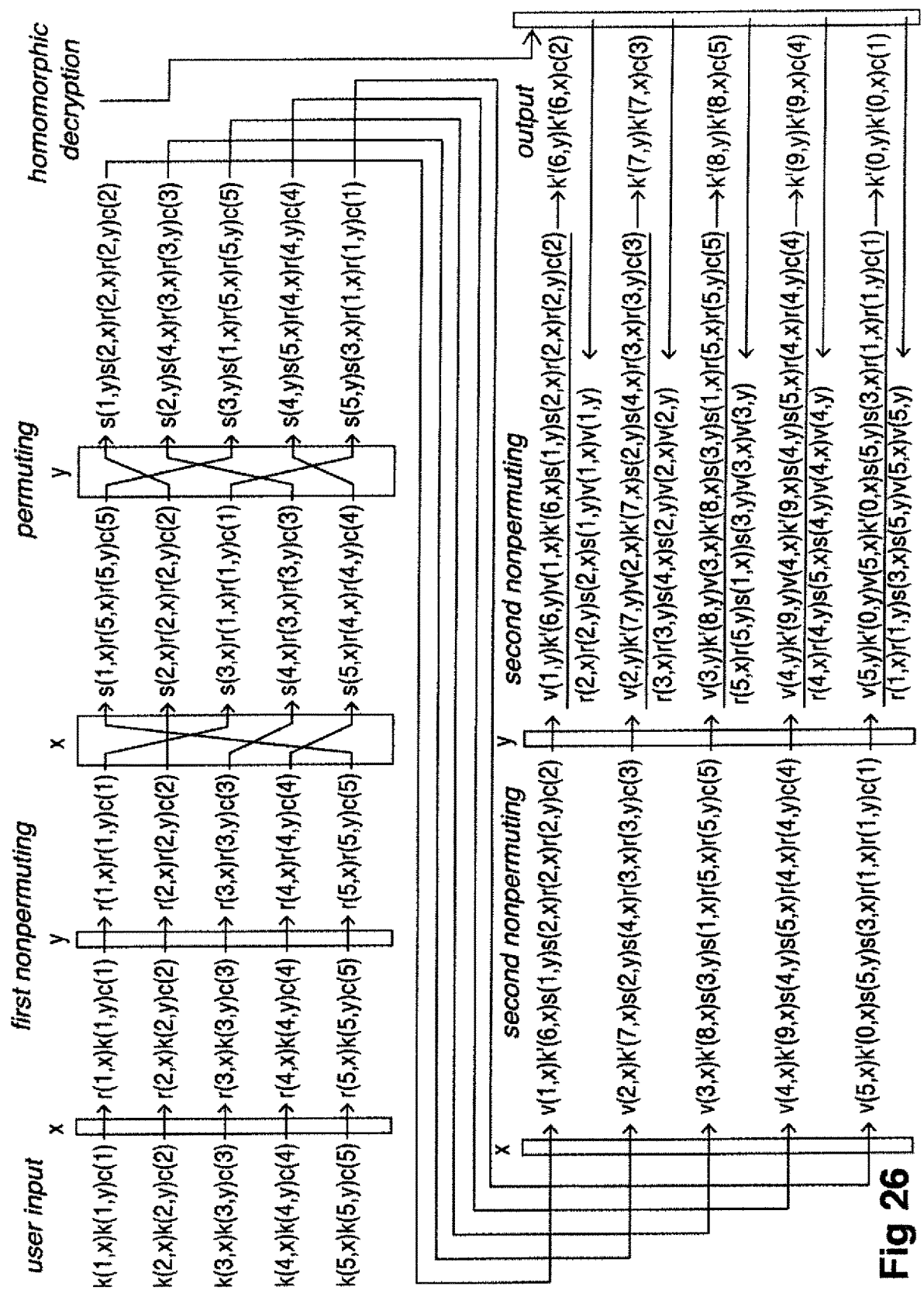
FIG. 26 is a combination block diagram and cryptographic schematic of a realtime portion of a precomputation mix with tail in accordance with aspects and teachings of the present invention.

Turning now to FIG. 26, an exemplary combination block diagram and cryptographic schematic of a realtime portion of a precomputation mix with tail is shown in accordance with aspects and teachings of the present invention. (The corresponding precomputation portion has already been described in detail with reference to FIG. 25.)

Relative to the example already described with reference to the lower portion of FIG. 3, it will be appreciated that an additional random factor v(,), similar to r(,) and s(,), is shown introduced in the non-permuted phase. Also introduced in the non-permuting phase are the k' common keys with the designated recipients. For example, in the first row the designated recipient revealed by the output of the permuting phase, but for the component not shown for clarity that carried the recipient identity, is the identifier #6. (Again, the choices for these identifiers corresponding to the slots is for convenience and clarity, as will be appreciated, but does not limit the dynamic choice of identities to slots that can be made in realtime.)

The results of the homomorphic decryption, from FIG. 25, similar to those from the upper half of FIG. 3, are divided out as shown and cancel the v, r, and s factors. Thus, the recipient subscriber identified (not shown for clarity, but 6 through 0 from top to bottom in the example) is able to decrypt the content using the common keys.

Turning to FIG. 27ABC, combination block diagrams and flowcharts of mixing with output delivery are shown in accordance with aspects and teaching of the present invention. FIG. 27A relates to three-phase embodiments; FIG. 27B to examples including authentication of sender to recipient; and FIG. 27C to examples including secrecy of payload delivered to recipient.

Referring specifically now to FIG. 27A, a first step 2705 is shown as optionally performing a pre-computation to obtain keying information, as has been described already earlier here. Next step 2710 shows developing common secrets between nodes and subscribers, as also described elsewhere here. These first two steps may be an whatever order or parallel as will be understood.

The next three steps are the unpermuted, permuted, and unpermuted processing, such as for example described with reference to FIG. 23, FIG. 24, FIG. 25, and FIG. 26. The first unpermuted phase 2720 removes common keying related to the subscribers providing the input, while providing protection through injection of other keying aspects. The permuted phase 2725 permutes the items while modifying the keying, also as already described. The second unpermuted phase 2730 removes keying and also includes common keying with recipients.

Referring to FIG. 27B, three phases are shown for providing authentication of sender, such as already described with reference to FIG. 23B. A first unpermuted phase 2740 the common keying with subscribers is replaced by protection including of the sender address, which may not be identified as a payload item explicitly. A permuting phase 2745 modifies keying to hide the permutation. Then a second non-permuting phase 2750 removes sender address protection while substituting common keying for the intended recipient, such as described already with reference to FIG. 23B.

Referring finally now to FIG. 27C, three phases are shown for providing confidentiality of message content delivered, such as already described with reference to FIG. 23A and FIG. 23B. A first unpermuted phase 2760 replaces common keying with subscribers by protection. A permuting phase 2765 modifies keying to hide the permutation. Then a second non-permuting phase 2770 removes sender address protection while substituting common keying for the intended recipient, such as described already with reference to FIG. 23A.

Figure 28A:
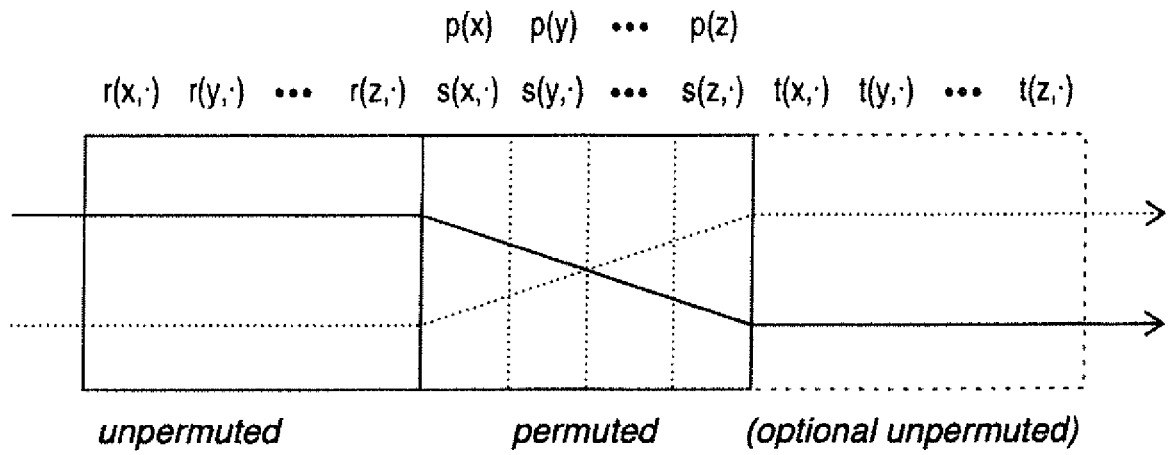
FIGS. 28A, 28B and 28C are combination block diagram and cryptographic schematic diagrams of mixing with coordinated instances in accordance with aspects and teaching of the present invention, with FIG. 28A related to multi-node mixing with pre-unpermuted and optional post-unpermuted phases, FIG. 28B related to multi-node mixing with coordinated permutations and optional pre-unpermuted and optional post-unpermuted phases, and FIG. 28C related to multi-node mixing with coordinated inverse permutations and optional pre-unpermuted and optional post-unpermuted phases.
Figure 28B:
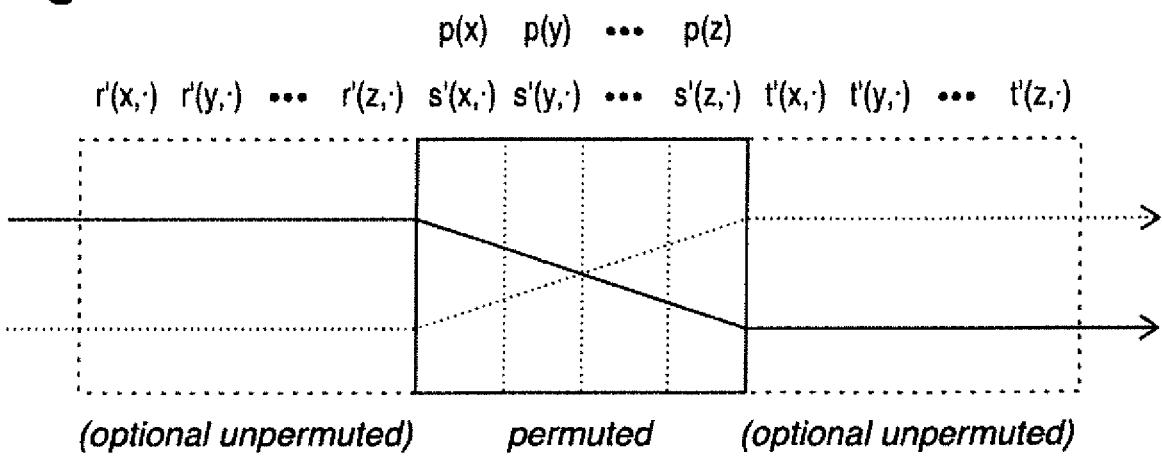

Turning to FIG. 28ABC, combination block diagram and cryptographic schematic diagrams of mixing with coordinated instances are shown in accordance with aspects and teaching of the present invention. FIG. 28A relates to multi-node mixing with pre-unpermuted and optional post-unpermuted phases; FIG. 28B relates to multi-node mixing with coordinated permutations and optional pre-unpermuted and optional post-unpermuted phases; and FIG. 28C relates to multi-node mixing with coordinated inverse permutations and optional pre-unpermuted and optional post-unpermuted phases.

Referring more particularly to FIG. 28A, three nodes are shown identified, x, y, and z; however, the ellipsis explicitly indicates, as will be readily understood and appreciated, that any number of nodes may be used in the cascade structure shown. The multiplicity of nodes in the particular order is indicated by the vertical dotted lines for the permuted phase; whereas, for the unpermuted and optional unpermuted phases also shown, as will be understood, the order may not be the same or the processing even linear, such as has been described with reference to FIG. 5, FIG. 6, and FIG. 7AB. These considerations are also believed applicable to FIGS. 28B-C, to be described further.

The permutations realized by the respective nodes, x, y, and z, are shown as p(x), p(y), and p(z), respectively. The nodes use these in the optional pre-computation and in the processing, as already described.

Referring more particularly now to FIG. 28B, the same permutations, p(x), p(y), and p(z), are shown performed by the same nodes, x, y, and z, and in the same order. The pre-unpermuted phase and the post-unpermuted phase may each separately be considered optional in such an embodiment. To the extent used, however, the values r, s, and t, from FIG. 28A are shown replaced by the values r', s', and t', respectively. Thus, it is believed that an instance from FIG. 28A and one from FIG. 28B will process messages with the same composition of permutations. For instance, examples such as described with reference to FIG. 23B, that include multiple payloads traveling together through a mix could each be realized by coordinated instances with the same permutation. In some examples, not shown for clarity, also a short confirmation of acknowledgement may be generated through such a mix, such as to confirm that an acknowledgement has been received, as will be described, or to provided a delayed confirmation of sending.

Figure 28C:
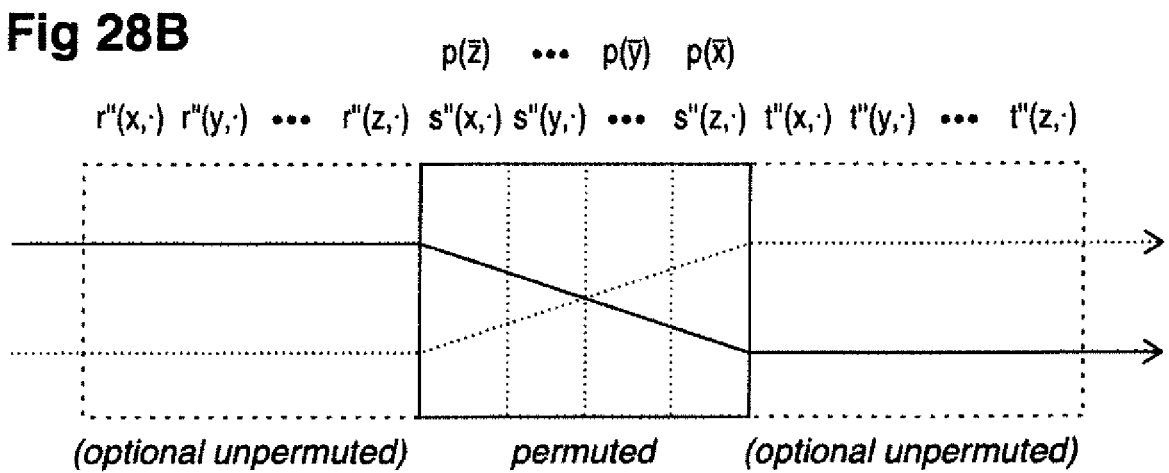

Referring more particularly to FIG. 28C, the inverse of the same permutations, p(x), p(y), and p(z), are shown performed by the same nodes, x, y, and z, and in the reverse order of nodes. The inverse permutations are indicated by the bar over the name of the respective node: x̄, ȳ, and z̄. The values protecting the permuted and optional unpermuted phases are shown with double primes, r″, s″, and t″, as they are believed advantageously distinct from those already described with reference to FIG. 28B using single primes.

The pre-unpermuted phase and the post-unpermuted phase may again each separately be considered optional in such an embodiment. Some example uses include for confirmation of transactions, such as those already described with reference to FIG. 19ABC, FIG. 20ABC, FIG. 21ABC, and FIG. 22. In particular, the exception condition already described with reference to FIG. 19C would be advantageously realized using the techniques of the present figure, as tracing would be avoided even though certain transactions are cancelled. Other non-limiting example uses anticipated include so-called "delivery" notification of short text messages and acknowledgements of receipt/acceptance in posting posting messages or credentials.

Turning to FIG. 29AB, combination block diagrams and flowcharts of mixing with general coordinated instances are shown in accordance with aspects and teachings of the present invention. FIG. 29A relates to embodiments including those without pre-computation; FIG. 29B relates to examples including pre-computation.

Referring more particularly to FIG. 29A, box 2910 is the application of a first permutation by a set of nodes in processing a first batch of input items. Step 2915 shows the application of a second permutation that is related to the first permutation and the processing using that second permutation of a second batch. Third and further batches are also anticipated. The actual processing of messages is for clarity shown in separate boxes in this example: box 2920 is the application of the first processing to first messages making up a first batch of messages; box 2925 is the step of second processing of second messages making up a second batch of messages.

Referring more particularly now to FIG. 29B, box 2950 is the application of a first permutation by a set of nodes in a pre-computation for a first batch of input items. Step 2955 shows the application of a second permutation by a set of nodes for at least a second batch of items related to the delivery of the items output by the first processing. Third and further batches are also anticipated. Box 2960 is the application of the first processing using the first permutation to first messages making up a first batch of messages; box 2965 is the step of second processing using the second permutation of items related to the delivery of the items of the first processing.

Turning now to FIG. 30AB, combination block diagrams and flowcharts of mixing with specific coordinated instances are shown in accordance with aspects and teachings of the present invention. FIG. 30A relates to embodiments with application of the same permutation; FIG. 30B relates to examples including application of an inverse permutation. The figure is believed applicable whether or not there is precomputation.

Referring to FIG. 30A, the same permutation is applied to at least two batches, with a first application shown in box 3050 and the second shown in box 3055. Then box 3020 and box 3025 show the processing of messages in batches with the permutation, first in one batch 3020 and then in another example 3025.

Referring finally to FIG. 30B, a first permutation is applied in a first order 3050 in the processing of a first batch of items, where the items in the example are from multiple senders, such as one item per sender. The messages are accordingly delivered 3055 to the intended respective destinations. Next the nodes cooperate in an ordering that is the reverse of that used in the first steps and the nodes apply permutations that are inverses of those that they applied in the first step. The nodes apply 3060 these transformations in processing at least a second batch. The processing returns 3065 to at least a portion of the senders of messages from step 3050 at least indications as the second batch that are related to respective messages and/or destinations.

Figure 31:
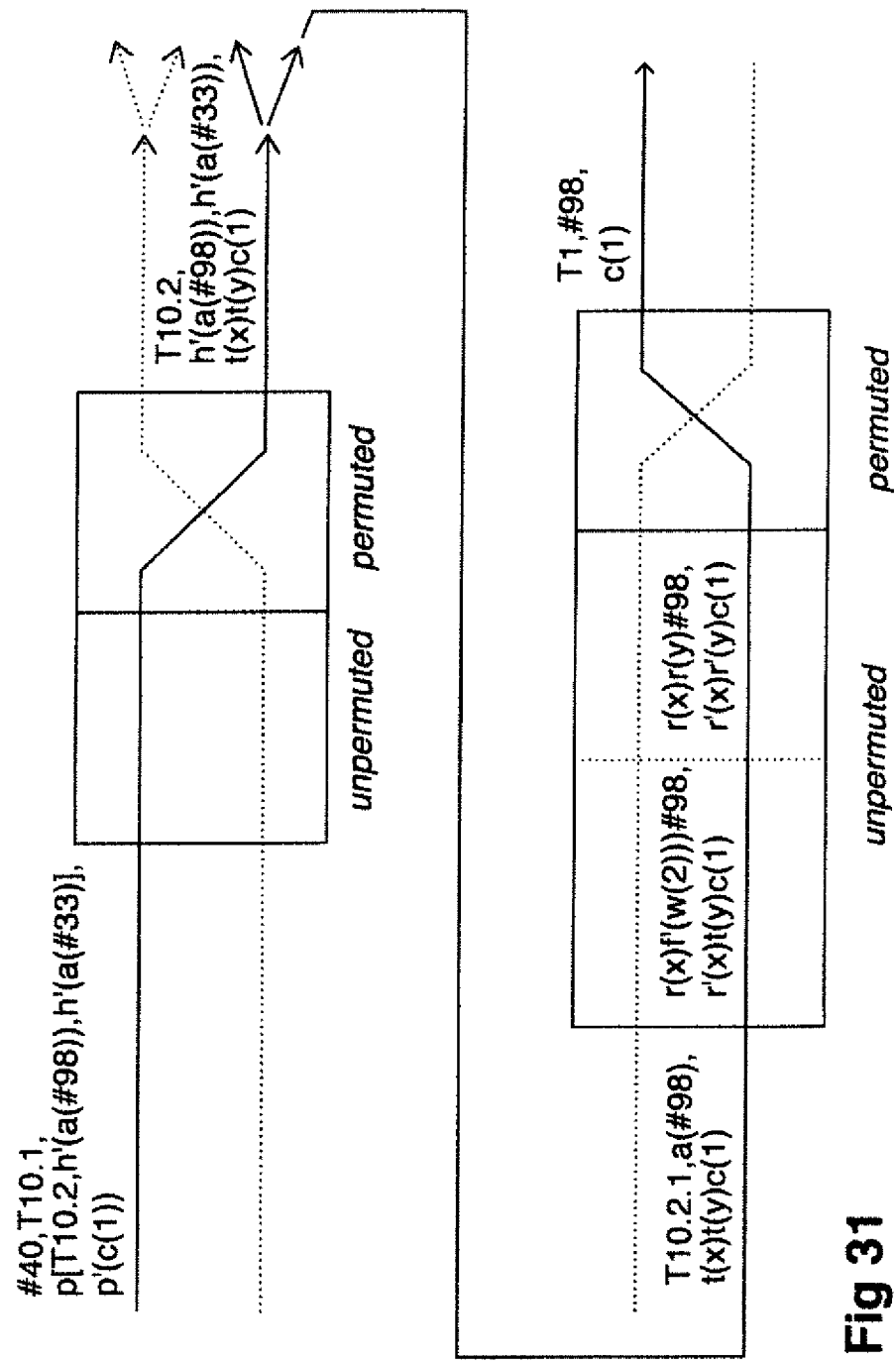
FIG. 31 is a combination block and cryptographic schematic diagram for multicast in accordance with aspects and teachings of the present invention.

Turning to FIG. 31, a combination block and cryptographic schematic diagram is provided for multicast in accordance with aspects and teachings of the present invention. The upper portion of the figure relates to the sending of a single initial transmission by the originating subscriber; the lower portion of the figure relates to the forwarding on by the nodes of a single branch of the in general multi-way branching of the of copy instances of the single initial transmission content payload.

Referring more specifically to the figure, two payloads are shown on the L.H.S. of the upper portion, making up the main portion of initial transmission already mentioned. The first payload contains an embedded tag, T10.2, that will label the components on the R.H.S. of this initial mix.

The two values following the tag each correspond to a respective destination for a copy of the multicast second payload. The h' operator is intended to indicate that a so-called hash or other compression of the full untraceable return address, as already described with reference to FIG. 12AB, may advantageously not be included at least in some examples, since it is believed sufficient to identify the particular untraceable return address already sent in an earlier protocol instance, such as an instance of FIG. 12A that has been stored for later access by the nodes. The a(#98) style notation is intended to indicate an instance of w related to the protocol of FIG. 12A corresponding to user #98, as will be understood; similarly, a(#33) corresponds to a separate instance of the untraceable return address establishing protocol, as already described with reference to FIG. 12A.

The output of the upper portion, on the R.H.S., indicates the copying into instances, each to be delivered using a corresponding untraceable return address. It will be appreciated that the t( ) values remain in place and will be replaced by each respective node during the unpermuted phase of the lower portion LHS.

In the example shown, the particular untraceable return address instance depicted for clarity is, arbitrarily chosen for the illustration, the one related to user #98. The full w, in FIG. 12A notation, shown as a(#98), as mentioned, is copied in as the first component; the second component has the t( ) values and the original transmission actual second payload c(1), the content being multicast as mentioned. The processing through the mix is roughly as already described with reference to FIG. 12B. The result is that the message content c(1) is delivered to user #98; however, not shown for clarity, such delivery it is believed would typically include protection of message content, such as, for example, by the techniques already described with reference to FIG. 23A.

Figure 32:
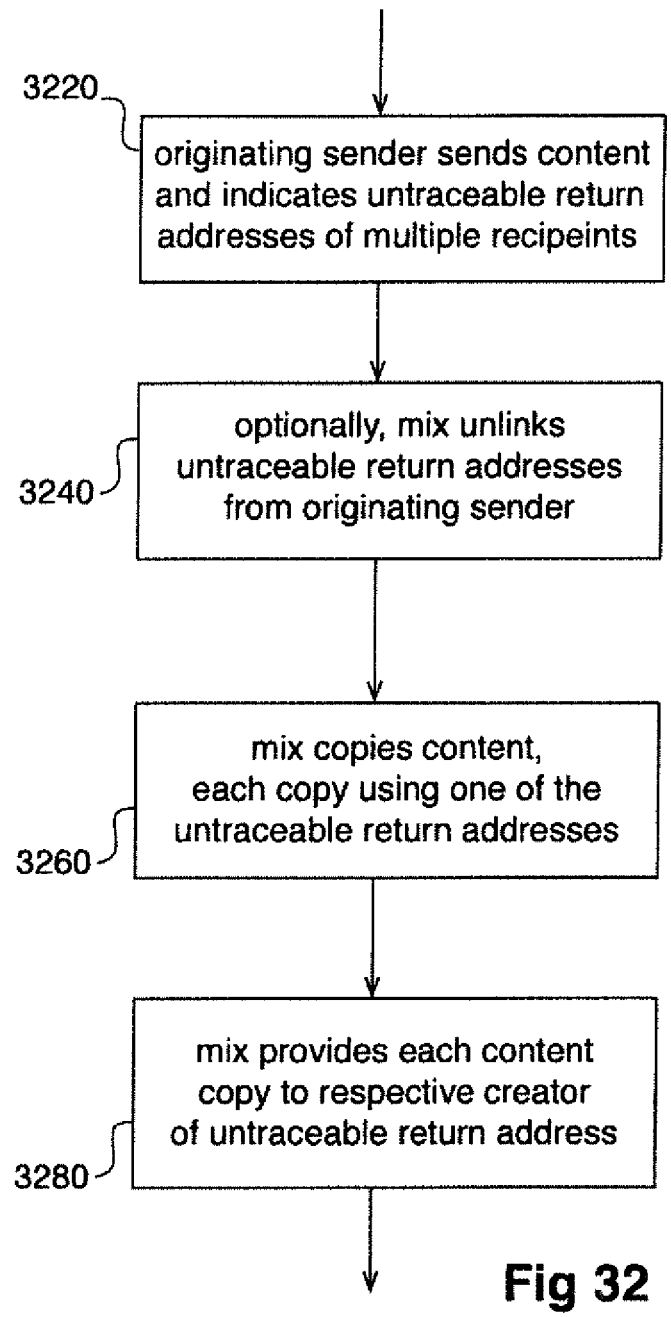
FIG. 32 is a combination block diagram and flowchart of multicast in accordance with aspects and teachings of the present invention.

Turning now to FIG. 32, a combination block diagram and flowchart of multicast is shown in accordance with aspects and teachings of the present invention. The content sent by the originating sender is associated with corresponding untraceable return addresses, as already described with reference to FIG. 32.

Referring more particularly to the figure, box 3220 is the sending, by the originating sender, of at least one message that includes both some kind of indication of the untraceable return addresses and some content to be copied to the corresponding recipients. Next, box 3240 shows that the mixing disassociates or unlinks the untraceable return addresses from the sender. This step is optional but believed desirable. For one thing, it may hide the number of copies sent; for another, it may hide the repeated use of a set of untraceable return addresses.

The next step in processing by the mix nodes is shown in box 3260 as including copying the content, typically still in protected form, such as already described with reference to FIG. 31. The final step shown, in box 3280, is the mix nodes providing or delivering the content according to each corresponding untraceable return address.

Figure 33:
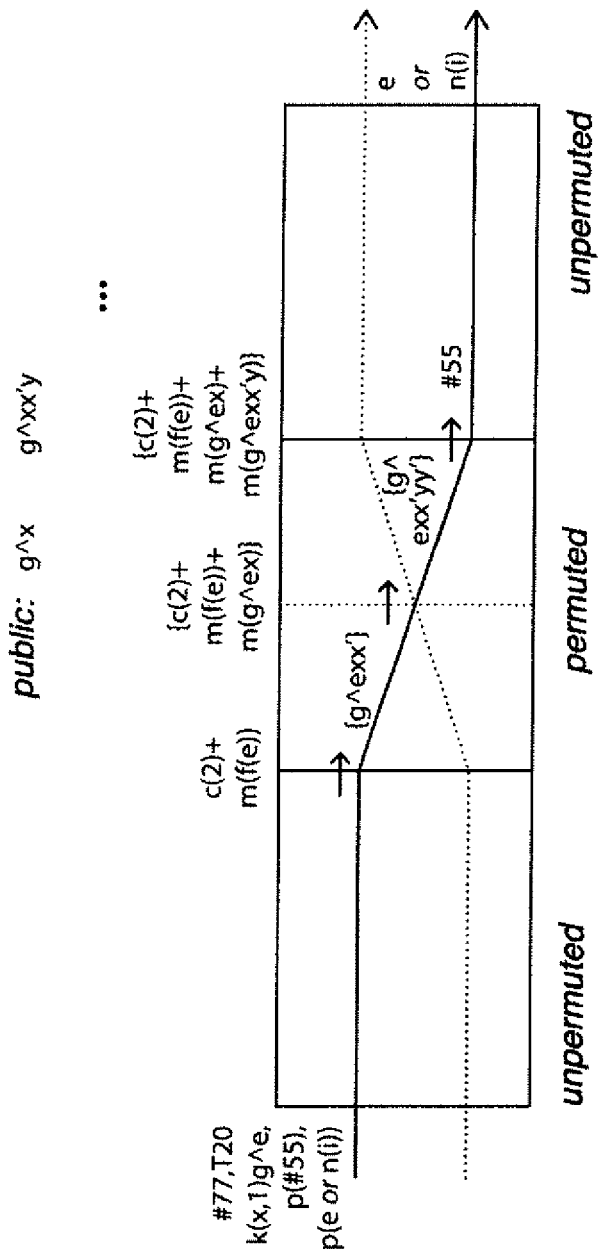
FIG. 33 is a combination block and cryptographic schematic diagram for hybrid encryption in accordance with aspects and teachings of the present invention.

Turning to FIG. 33, a combination block and cryptographic schematic diagram is provided for hybrid encryption in accordance with aspects and teachings of the present invention. The example shown includes a single sender of a potentially large payload c(2) that is encrypted with so-called "symmetric" or "conventional" cryptography, using a so-called "stream cipher" for clarity in the example, but which can readily be extended to whatever block or other cryptographic modes, as will readily be understood.

The sender, user #77 in the example, chooses a key e, ideally in a way that is hard or infeasible for others to guess, as is well known. The sender then forms the transmission shown on the left hand side, including the tag T20 for this type of message. The next component is the public generator, g, raised to this key power, g^e, encrypted for node x, with a single shared key k(x,1) in this example of this transaction type. Because of the large message stream cipher of this figure, the stream cipher encryption of c(2), is shown above the box; the short arrow between the unpermuted and permuted phase is intended to suggest this first stream encryption directly above it. The stream cipher is denoted by the plus symbol "+" for clarity, as will readily be understood, as by any suitable operation, such as for instance the often used exclusive-OR.

The penultimate component on the left has the addressee identifier as payload, p(#55). The final component contains as payload two exemplary alternate forms of keying material: the first is simply the secret exponent e itself; the other example option is a vector of the actual keys used to successively encrypt c(2), as will be explained further. The former is believed faster for the sender to compute but more time consuming for the recipient; the latter faster for the recipient but more time consuming for the sender. These last two components travel through the unpermuted and permuted and final unpermuted phases much as with output delivery, as already explained such as with reference to FIG. 27A.

The first node, x, receives the data from the sender and transforms it and forwards the result on to the second node. More particularly, the third from last component already described is decrypted by the first node x, after which x applies the example secret exponent x to it and uses the result as input to m that yields a value with the same size as c(2) that can be combined with c(2) as an additional stream cipher sequence. This transformation is indicated by the short arrow at the interface between the first and second halves of the permuted phase and relates to the result of the transformation shown above the box, as mentioned. The curly braces "{ }" are used to indicate that these quantities are ideally encrypted by keys unique to each adjacent pair of nodes in sequence. The node x further transforms the third from last component by raising to a further secret power shown as x' before transferring to the next node in sequence, y. This is believed to allow y to produce the next key stream but to keep y from being able to re-produce the key stream used by x.

The second node, y, receives the data from its predecessor and forwards on to its successor essentially as any subsequent node in the sequence would, as already described for x. This is also indicated by the ellipsis in the figure. For one thing the third from last component is encrypted, in this case using key y, and this is used to generate a key sequence to further stream encrypt the c(2) payload. For another, the third from last component is further encrypted by using y' before being sent on, as already mentioned.

Once the messages are delivered to the recipient, user #55 in the example, the final component reveals the keying material to user #55 so it can recover c(2). In the first example option, more particularly, the value e is received. In this case, #55 can apply $f$ to e to recover the first key stream and raise the first public value $g^x$ (shown above the stream encrypted values) to the e power in order to obtain the seed for the second key stream and then raise the second public value to the e power to get the seed for the next stream. Removing the streams, such as by exclusive-OR as is well known, the message content c(2) is obtained by #55. In the second example option, the seeds for the various streams are simply computed by #77 instead of #55 and formed into the vector n(i) for #55 to use to recover c(2).

Figure 34:
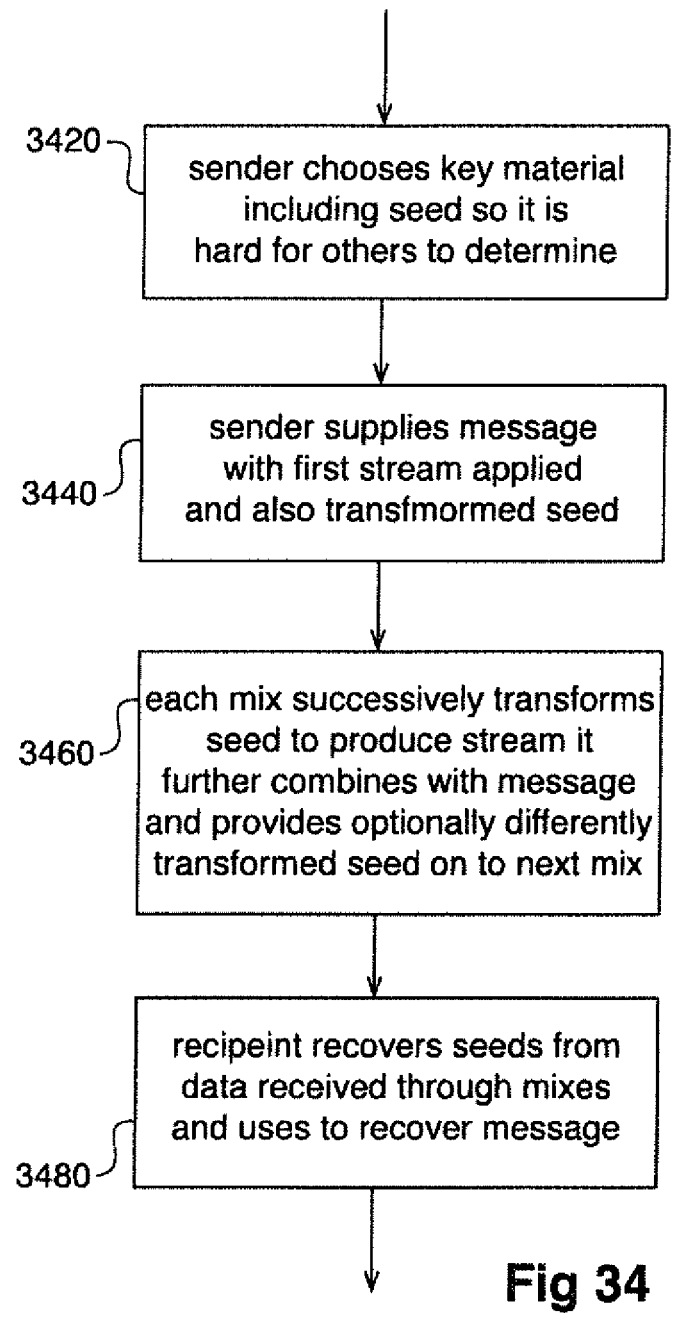
FIG. 34 is a combination block diagram and flowchart of hybrid encryption in accordance with aspects and teachings of the present invention related to the embodiment also described in FIG. 33.

Turning now to FIG. 34, a combination block diagram and flowchart of hybrid encryption is shown in accordance with aspects and teachings of the present invention. The process steps relate to the description already provided for FIG. 33.

Referring more particularly to the figure, box 3420 is the creation of the key or keys by the sending subscriber. Then box 3440 shows the encryption of the content by the user with at least a part of the key matter; also, the sender transforms the seed so that it will not be readily computable by the first node.

Each node in sequence performs at least the encryption of the message portion of the mixing cascade, as described in box 3460. One operation related to this is to transform the seed received from the previous stage to produce the seed used for the encryption at this stage. Another operation, which may be optional but believed desirable, is to hide the value used for the encryption at this stage in what is forwarded on to the next node.

Referring finally to box 3480, after the cascade has successively encrypted the message, the recipient subscriber receives the seed from the send via the mix, as already described earlier, and uses it to re-construct the seeds and corresponding streams and to remove these from the message in order to recover the cleartext message.

Figure 35:
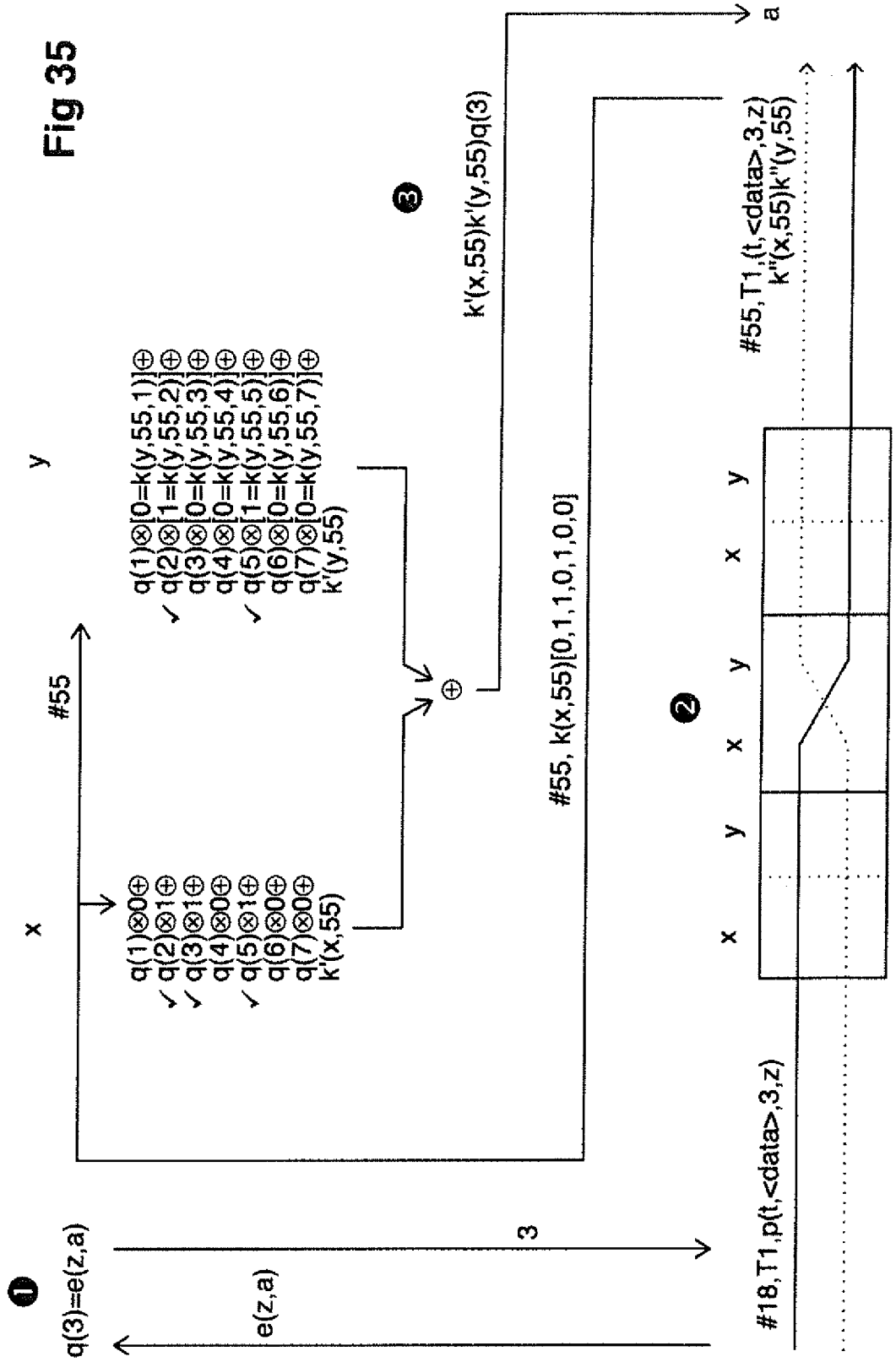
FIG. 35 is a combination block and cryptographic schematic diagram for asynchronous sending of larger payloads in accordance with aspects and teachings of the present invention.

Turning to FIG. 35, a combination block and cryptographic schematic diagram is provided for asynchronous sending of larger payloads in accordance with aspects and teachings of the present invention. In addition to the mixing shown as a second phase at the bottom of the figure, there is a first posting phase and a third asynchronous recovery phase. The inventive techniques in part relate to known so-called "multi server private information retrieval," a subject about which there is believed considerable academic literature.

Referring more specifically to the figure, the left side shows the first or posting phase (as indicated by the numeral one reversed from the black disc). The user, in the example shown as #18, has what is denoted for clarity as a, an item of data, such as for example but without limitation chosen from the group including for instance a photograph, a sound clip, a video clip, a scan, a software program, a digital document, any or all in whatever format. The user "uploads" the data item, such as by sending it to a designated server or service over a computer network, but in an encrypted form. The example form of encryption shown for clarity uses an encryption function, e, with a first argument z that is a unique key of the user and the second argument that is the data item to encrypt, as will readily be understood.

Obtained by the sending user #18, in the example, is an identifier from a conveniently dense space of such identifiers, such as a sequence number or the like. For clarity and so as to fit on the page, a very few data items are shown in the illustration; typically, there might be from thousands to millions of such items. The identifier for the particular example uploaded data item is shown as the number three.

Referring now to the second phase, mixing with pre- and post-unpermuted phases is shown, such as has already been described, for instance with reference to FIG. 28. Thus user #18 in the example sends a message to user #55 through the mix that includes the identifier and the key z, as already mentioned.

(As an illustrative example, for clarity but without any limitation, user #55 may, for instance, have received the message including some text, t, and an indication that there is a photo that can be obtained. The message may, not shown explicitly for clarity, contain and/or reference some kind of compact indication of the nature of the photo, such as an icon or low-res image. It may also typically be referred to in the text portion of the message. In any event, user #55 may not immediately try to obtain the photo, but rather may do so after some delay, such as after reading the text message.)

Referring to the third and final phase, where user #55 seeks to obtain the particular data item without revealing which of the data items that user has selected and will receive. To accomplish this, in outline, the user first forms a request, sends it to the servers x and y, two instead of a larger number being shown for clarity as will be appreciated, who operate according to it, providing a response to the user shown, and then the user is able to recover the encrypted data item and decrypt it using the already mentioned received key z. The request includes an indication of the user identity #55.

The request also includes what may be called here a "sent selection string," shown as a literal binary string in square brackets, which is encrypted using a key shared with a selected one of the servers, in the example x. The sent selection string in the example illustrated is seven bits long, one bit for each of the identifiers in this as-already-mentioned small example for clarity. Each non-selected server recreates a corresponding selection string using its respective shared key with the identified user. Thus, the non-selected server y generates the seven bit string in the example, "0100100," from the shared key in an agreed manner replicable by the user, as shown: applying k(y,55,i) for the ith bit of the string.

The user, as will be appreciated, also computes the exact same generated selection strings and then uses these to determine the sent selection string. This is done so that the bitwise-sum of all the selection strings, one per server, is all zero except that there is a one in the position corresponding to the identifier of the desired data, in this example the number three received. Put differently, the selection strings sum bitwise to the zero vector apart from the single set bit in the position of the desired data item.

As indicated in the figure, each bit of a selection vector is combined with the entire corresponding data item, which is shown for clarity using the symbol "☐." This in the example group, without limitation for clarity, flips every bit of the data item if the selection bit is one and does not flip any of the bits if the selection bit for that item is zero; put differently, all the unselected items are forced to appear with even parity and the selected item with odd parity. Thus, every item—except the single one desired by the user—cancels, since each set bit of it enters the exclusive-or sum an even number of times; however, the third data item in the example is the result, since each of its bit positions with a set bit results in a set bit in the component-wise sum of all the vectors. Those data items that are inverted are shown with a check symbol, "ü," and are to be flipped; those without the check are not to be flipped. It will be appreciated that only the data item q(3) has an odd number of checks/flips, and so it is the only item not cancelled and appears in the sum in its entirety unmodified.

The bitwise exclusive-or sum, the group used without limitation in the example, is formed by the servers; however, included in the vector each server contributes is an ideally fresh key sequence generated from the shared key, as indicated by the k' function. So user #55 also computes these key sequences and bitwise exclusive-or's them into the received vector, so that the user-generated and node generated pairs cancel each other, and the user recovers the encrypted data item, e(z,a), which the user then decrypts with the key z as already described as received.

Turning to FIG. 36AB, a combination block and cryptographic schematic diagram is provided for anonymous selection of feeds in accordance with aspects and teachings of the present invention. There are common elements with the embodiment described already with reference to FIG. 35. One difference is that the sender does not provide the data to the recipient, but rather the recipient chooses a number of senders, such as posters or publishers of data, whose data "feed" the recipient wishes to "follow" with the recipient revealing to neither the senders nor the system which senders the user wishes to receive feeds from. FIG. 36A shows the recipient establishing the choice of feeds; FIG. 36B shows the recipient polling the feeds using the established choice of feeds.

Referring specifically now to FIG. 36A, user #22 in the example wishes to receive feeds from senders s(1) through s(z), and so sends this list to, for instance a public place or specific servers or the like, with the tag <feeds>. The system replies with an identifier, this time five in the example. The messaging described elsewhere here, such as with reference to FIG. 28, can be used for this. The intention is that the system will now collect together the latest from the senders on the list and maintain this collection under the identifier five; however, which user requested this collection be made available is believed hidden in some embodiments even from collusion of a proper subset of nodes.

Referring now to FIG. 36B, the same user in the example who has established the list of senders that was assigned position five in FIG. 36A above, now wishes to download over a public network the latest collection of postings associated with that list.

The underlying technique for this is similar to that already described with reference to the third phase of FIG. 35. The user forms the generated selection strings and computes the selection string to send to a node, y in this example. The bit positions to be cancelled, all but position five in this example, are given even parity, as already described in detail with reference to FIG. 35; those with odd parity are marked by a check and a check in the sent selection string indicates that the parity is to be flipped by y responsive to the sent selection string. The resulting bitwise sum computed by the servers is shown again encrypted with a fresh portion of the shared key sequences. The requesting user #22 computes all the encryption sequences and combines them with the received vector and recovers the cleartext feeds as prepared by the servers responsive to the requested list.

Not shown for clarity, but as will be understood, an example architecture for use by a node in forming the sum of the possibly many vectors of feeds (or of photos or the like as in the example already described with reference to FIG. 35) is as follows: a single server broadcasts repeatedly the entire set of d( ) vectors over a so-called "local area network" to a number of servers that each separately handle a number of requests for selected data and use the corresponding selection vectors to compile sums of those respective items broadcast that are selected.

Figure 37A:
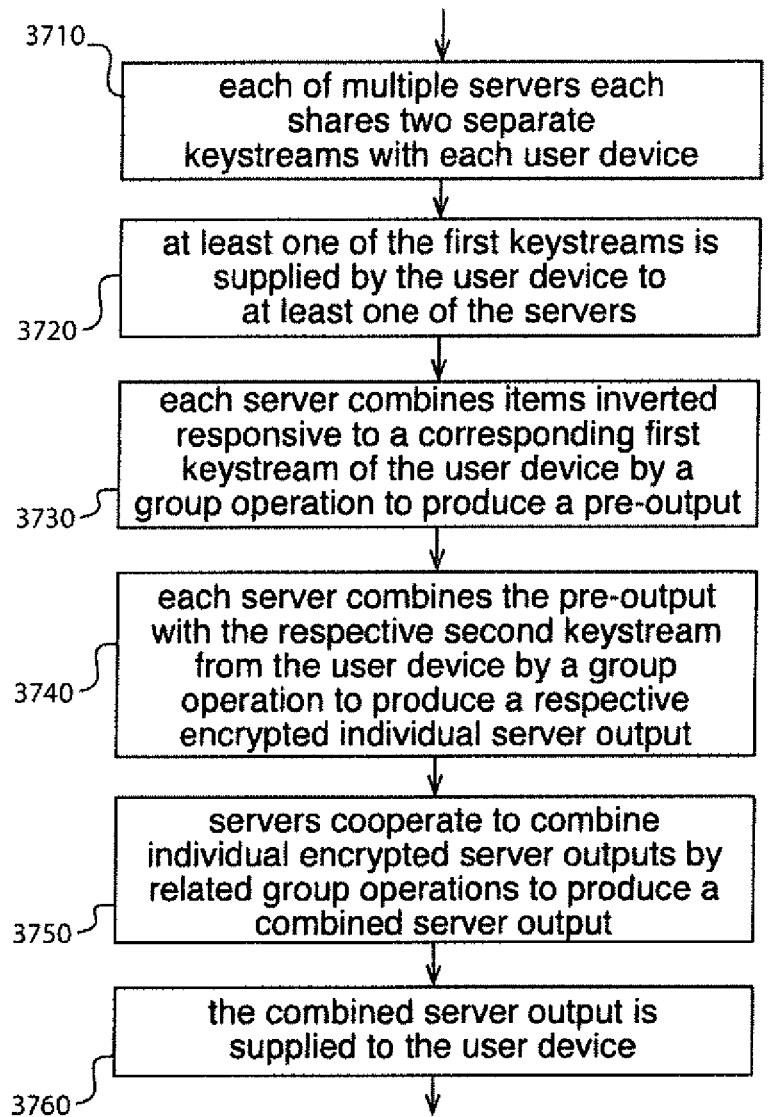
FIGS. 37A and 37B are combination block diagrams and flowcharts of low-bandwidth selection are shown in accordance with aspects and teachings of the present invention, with FIG. 37A related to aspects common to FIGS. 35 and 36 and FIG. 37B related to a server-side architecture.
Figure 37B:
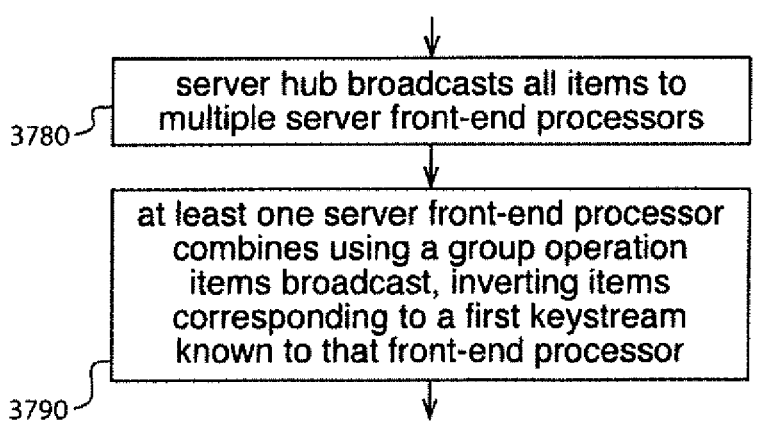

Turning now to FIG. 37AB, combination block diagrams and flowcharts of low-bandwidth selection are shown in accordance with aspects and teachings of the present invention. The process steps or parts relate to the description already provided with reference to FIG. 35 and FIG. 36. FIG. 37A shows aspects common to FIGS. 35 and 36; FIG. 37B depicts the server-side architecture described at the end of the description of FIG. 36.

Referring specifically now to FIG. 37A, the first box 3710 indicates that each node/server develops or obtains two keystreams per user requesting an item and these keystreams are known to the user device. One keystream is the generated selection string, used by all servers (except not believed needed for the server that receives the sent selection string). The second keystream is that, also already described with reference to FIGS. 35 and 36, used to encrypt, such as by so-called "stream cipher," the pre-output of each server.

Box 3720 indicates that the user supplies a server with the sent selection string to be in effect a substitute for that server's first keystream. Box 3730 describes how each server uses the first keystream, including the sent selection string, to select the items for the group operation that in effect causes all but the desired items to cancel. In the examples, this includes inverting or not inverting based on the whether the selection bit is zero or one. Box 3740 depicts each server combining the pre-output of the server with corresponding second keystream to produce the server outputs, which are each in effect encrypted with the respective shared keys. Box 3750 is the cooperation of the servers in forming the combination under the group operation of the server outputs to produce the combined encrypted server output. Box 3760 is the supply of the combined server output to the user and/or user device, which may for instance be accomplished by the servers forming a ring or tree structure and/or by cooperation with other nodes that combine separately received streams and forward them on to users.

Referring specifically now to FIG. 37B, the first box 3780 describes the operation of a server hub that broadcasts or streams the items that can be selected to at least one front-end server processor. Box 3790 then shows the front-end server processor using the group operation, such as bitwise exclusive-or in the examples, to invert those items selected for inversion and to include either the inverted or the non-inverted version, at about the time that they are received as broadcast by the hub.

Turning now to FIG. 38ABC, a combination block diagram and flowchart of anonymous selected data and subsets of data and user computation is shown in accordance with aspects and teachings of the present invention. The process steps relate to the description already provided for FIG. 35 and FIG. 36 and a user portion for FIG. 37AB. FIG. 38A is the posting of data and forwarding of access to it and subsequent downloading by the recipient; FIG. 38B is the posting by a user of a set of feed identifiers and their subsequent use in receiving feeds; and FIG. 38C is the user device side of the embodiments described with reference to FIG. 37AB.

Referring to FIG. 38A, box 3810 is the initial uploading of a data item, such as for instance a photo or other digital information, by the first user and for which the user receives an identifier. Box 3820 is the sending of a message, such as using the techniques described with reference to FIG. 28, by the first user to at least a second user. The message sent may and generally advantageously is anticipated to contain keying material at least partially allowing the second user to perform decryption of the data item once it has been downloaded. The message sent from the first to the second user may also contain the identifier obtained through uploading the data, which identifier was used in the process described with reference to FIG. 37AB.

Box 3830 indicates first that the second user receiving the message from the first user may wait some time after receipt of the message before sending a request, which includes a sent selection string, to a server. The sent selection string includes a desired position selected that is related to the identifier received by the second user.

Referring to FIG. 38B, the use shown in and described with reference to FIG. 36AB is depicted. Box 3840 includes the user and/or device sending through a system, such as that described with reference to FIG. 28AB, a list of feeds; corresponding to such provision of the list, the user device receives a position indication, such as a for instance a sequence number assigned a posted list.

Referring to FIG. 38C, the user or device aspects of the processes and apparatus described with reference to FIG. 37A are included here. In box 3850 the user/device computes the first keystreams for all the servers except for the server to which a selection string will be sent. The user/device combines these keystreams, such as by bitwise exclusive-or as has been described with reference to FIGS. 35, 36 and 37, to produce a pre-cursor to the sent selection string. Box 3860 next shows the user/device creating the sent selection string by flipping the bit in the pre-cursor string in the position corresponding to the desired item.

Next 3870 is the sending of the request, including the sent selection string, to the particular server chosen for this purpose. One example way the server may be chosen, for instance, is that the choice is fixed for all users; another non-limiting type of approach would attempt to load balance and/or provide locality.

Finally box 3880 is first the receiving of the combined output from the servers or entity they cooperate with in forming this. Then the user device exclusive-or's, assuming this group operation for clarity, the received string bitwise with the received vector and the result should be the item, whether encrypted by the sender or not-encrypted by the nodes compiling the various feeds.

Turning to FIG. 39, a combination block and cryptographic schematic diagram is provided for additive split mixing in accordance with aspects and teachings of the present invention. The example shown includes two senders, for clarity, three initial mix nodes and two second-column mix nodes. It will be understood, however, that any number of senders may be incorporated and that the number of initial nodes and columns may also be adjusted as desired, such as for instance to form a three by three or four by four configuration of nodes.

The cryptographic embodiment described includes three main parts: the inputs to the initial column of nodes; the transformation results by each respective node in each respective column; and the outputs provided by the final columns of nodes. Two alternate forms of input are shown, as are two alternate forms of the output; in both cases an alternate is indicted as an option, partly because the non-option case is believed best explained first for clarity.

Referring particularly now to the inputs, they are shown as having originated from users number twenty-three and eighty-five, respectively, as indicated by the user number prefix on the messages. The second component of each message is a sum, in a suitable finite group, such as for instance, an additive group modulo a large prime, for which additive notation is used in this figure for clarity. The second component is shown as a quotient, with the divisor equal the number of initial nodes. It is believed that when this quotient appears as a term three times, the sum that is the resulting group element will be the numerator. Thus, when the outputs of a column are summed per a respective input, two things are believed to occur: the result is the payload c(1); and the additive inverses of the shared keys shown, one per initial node, cancel the shared keys added in by the initial nodes.

Referring specifically to the first or initial mixing stage, the three example nodes, x, y and z, are shown each as a respective row. The output of each is shown enclosed in a box for clarity; the arrows indicate that these outputs are provided as inputs to the respective nodes of the next column or stage of mixing, as will be apparent. It will be appreciated that the individual user inputs are permuted in the outputs; however, the same permutation is used for the column. In this initial column example with only two inputs for clarity the non-identity permutation has been chosen. (This can be seen by noticing the subscripts on the payload and the shared keys.) Other terms are added in by the nodes; for clarity, these are shown as a, b, and −a-b, though whatever group elements that cancel may be used. In some example implementations, for instance, each node computes the permutation and the other terms from a seed known to all the initial nodes.

Referring to the second mixing stage, the results of the first stage are received by the respective nodes of the second column from the nodes of the first column, as already mentioned is indicated by the arrows. The processing of what is received by the second and subsequent columns is about the same as that by the initial nodes, apart from the shared key terms being omitted in the later stages. Thus, for clarity again as mentioned, the a, b, and −a-b terms are added in and each node performs the same permutation on the user input positions.

Referring to the outputs, now, it will be appreciated that it is believed all terms apart from the c( ) terms cancel. Again, the reason believed for this is that the various shared keys were re-constructed in their additive inverse form from the quotients in the input and the various additional terms were designed to cancel when respective entries are added for a column, which also applies to the last column. It will be appreciated that this example embodiment corresponds in input and output roughly to the basic mixing already described, with reference for instance to FIG. 10 and FIG. 12, and for which numerous examples and extensions and variations have been described with reference to other figures here as well. It will be appreciated that these alternate embodiments illustrate the more general nature of the related applications and variations described.

Some exemplary input options will now be described further. The input option shown on the upper right-hand side of the figure is believed applicable where the initial nodes (or the final nodes in the case of inverse/ack as described with reference to FIG. 28C) each have a portion of the payload. In such examples the nodes may it is believe dispense with keys shared with users and create the a, b, and −a-b terms already described above and shown here with prime diacritics to distinguish them.

Some exemplary output options will now be described further. In the example shown, a particular user or recipient is intended for each of the example messages. In such cases, the shared keys for that user can be included as terms by the respective nodes, as shown. Thus, the payload privacy can be protected as it is delivered to the user or user equipment; once received, the user can remove the shared keys, such as by in this example subtracting them. Examples of such encrypted delivery have already been described, such as with reference to FIG. 23. It will again be appreciated that these alternate embodiments illustrate the more general nature of the related applications and variations described elsewhere here.

It will be appreciated that what may be called parallel or coordinated instances of messages, such as those occupying the same slot in two or more mixes that are run more or less at the same time with the same permutations, for instance as already described with reference to FIG. 28A and FIG. 28B, may also be realized with the techniques disclosed with reference to the present figure and to FIG. 40 to be described. It will again be appreciated that these alternate embodiments illustrate the more general nature of the related applications and variations described elsewhere here.

Turning finally now to FIG. 40ABC, a combination block diagram and flowchart of additive split mixing is shown in accordance with aspects and teachings of the present invention. The process steps relate to the description already provided with reference to FIG. 39. FIG. 40A is related to the case shown on the left of FIG. 39, whereas FIG. 40B and FIG. 40C relate more to the input and output options already described with reference to the right side of FIG. 39.

Referring specifically now to FIG. 40A and box 4010, in a first step or part, the sender or user creates an input item that includes terms intended to be inverses of the shared keys that are known to the sender and that will be added in by the nodes.

In box 420, other inverses are included to cancel unwanted multiplicities of the cleartext, also as already described. Box 430 indicates that the user sends the sum prepared as just described ideally as a single group element, but this may also be as multiple such elements, depending on the coding scheme (for instance, bitwise addition modulo two is also believed an example of a suitable group or direct product of groups.)

Box 4040 suggests that each initial node receives the same sending from the user, such as a single group element, instead of sending the elements separately to each node. However, some known systems, such as those proposed by Rabin and Rivest in a paper entitled "Efficient End to End Verifiable Electronic Voting Employing Split Value Representations" separately encrypt and provide that encrypted value separately to each entry node or the like. Here, nodes each "add in," that is combine using group operations, the respective shared key or key sequence, in order to hide the payload, advantageously reducing bandwidth upload requirements by a factor believed equal the number of initial nodes.

Box 4050 and 4060 also relate to the known systems just mentioned, as will be understood. In particular values that cancel are added in and the same permutation within a column are used. Which entries in the output correspond to the same, yet unidentified, entry in the input, is known.

Box 4070 represents an optional improvement that reduces bandwidth requirements by again a significant factor. The outputs are summed by the nodes, or in cooperation with them, before being provided to at least some other entities.

Referring to FIG. 40B, an optional improvement, already described with reference to the input option of FIG. 39, relates for example to the case when a set of nodes, such as those making up a column on the input side (whether the permutations and node sequences are being run forwards or in reverse, as already explained) each have a corresponding split portion of the cleartext that they would like sent through the system. Without using the shared keys the nodes include the split random values already described and a quotient related to the payload to hide the payload from the next column nodes.

Referring to FIG. 40C, an optional improvement, already described with reference to the output option of FIG. 39, relates to the inclusion of shared key terms at the output side (as already mentioned, whether in forward or reverse direction, relative to other processing steps); these terms are intended to be shared with the recipient. Thus, the recipient can subtract the terms and recover the content in the examples shown from the combined message sum.

Turning to FIG. 41, a combination block and cryptographic schematic diagram is provided for pseudonymous sender authentication in accordance with aspects and teachings of the present invention.

Two coordinated components are shown, much as in earlier described embodiments, such as those related to FIG. 23B and FIGS. 28A-C; however, in this embodiment instead of the identity of the user, a pseudonym is authenticated. In some examples pseudonyms are a cryptographic function of both the user or subscriber identity and the recipient user or subscriber identity. Other parameters, such as a time period identifier, scope/subject identifier, or a sequence or variation number may also be included to provide more than one pseudonym for the subscriber pair. In some examples pseudonyms may not be absolutely guaranteed to be unique, even though they may be so with very high probability.

Referring specifically now to the figure, in the unpermuted phase shown on the left, a second (lower) coordinated instance is introduced by the nodes without a corresponding input or payload from the sending user/subscriber. This component is shown as the product of factors, one supplied by each node, such as successively during this unpermuted phase. The function j(,) is used by each node to compute its factor in the example shown. In one exemplary embodiment this function is a cryptographic function of the first argument using a secret key known to the node whose name appears in the second argument. In the example shown, each node uses the sender subscriber number as the first argument and the resulting product is a function of the subscriber number.

After the permuting phase, the s" factors have been removed by the nodes, as already explained, and the j' factors are shown being substituted in for the t factors. The j' function may be an independent function and/or use an independent key, to create separate factors related to the recipient subscriber. (In other examples, the j' function may be the same as j, to give the same pseudonym no matter which direction the message is being sent.) The product of the j and j' factors is shown as u, which is provided to the recipient. In the example shown, this is provided privately by way of the k" factors; in other examples, it may be provided publicly, even though different recipient subscriber identities may be used to allow the same sender more than one public pseudonym.

Figure 42:
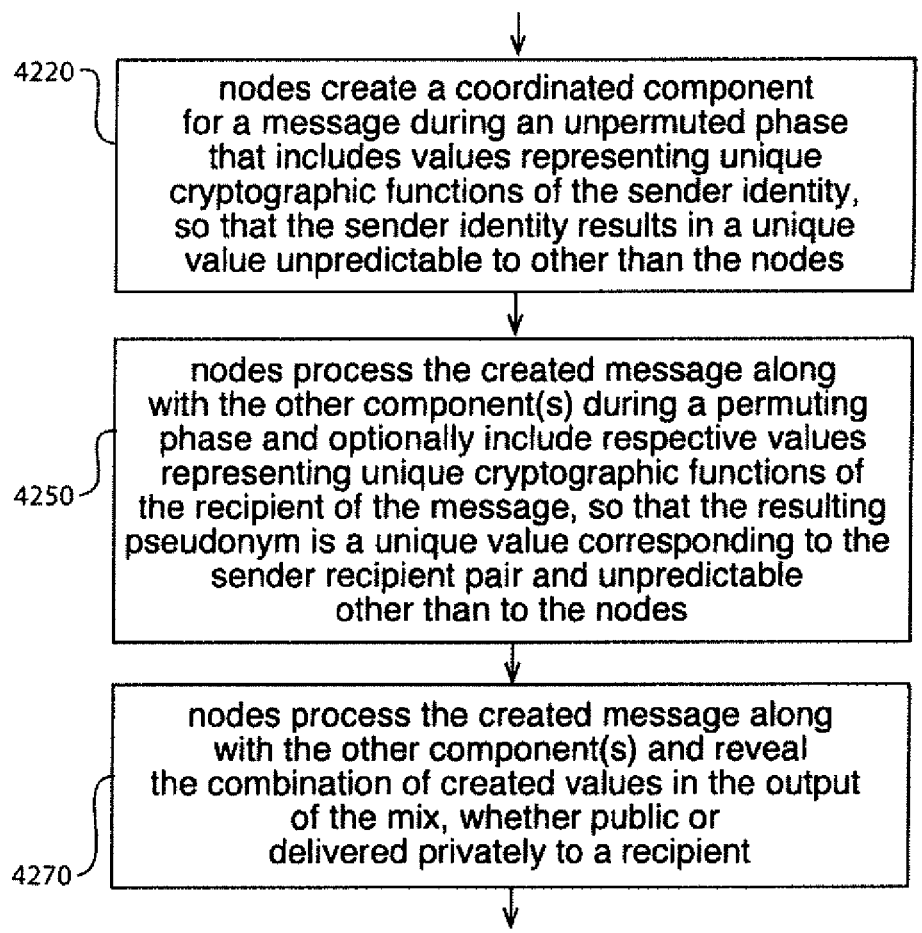
FIG. 42 gives a combination flowchart and block diagram for pseudonymous sender authentication in accordance with aspects and teachings of the present invention.

Turning to FIG. 42, a combination flowchart and block diagram is provided for pseudonymous sender authentication in accordance with aspects and teachings of the present invention.

Referring specifically to the figure, and the first box 4220, mixes create and inject during an unpermuted phase a coordinated component. The values, which in the example are factors, injected into the coordinated component by the mixes include images under a cryptographic function that includes keying material accessible to the respective nodes, to produce a pseudonym that is at least very likely unique and believed ideally hard for other than the cooperation of nodes to recreate or check.

In box 4250, the nodes first perform a permuting phase on the components. Then at least some of the nodes include cryptographic functions of the recipient in the example as factors. Again, the cryptographic function includes keying material accessible to the respective nodes to produce a pseudonym that is at least very likely unique and believed ideally hard for other than the cooperation of nodes to recreate or check.

Box 4270 is the revealing of the created combined value pseudonym to the recipient, and/or to a wider audience.

Figure 43A:
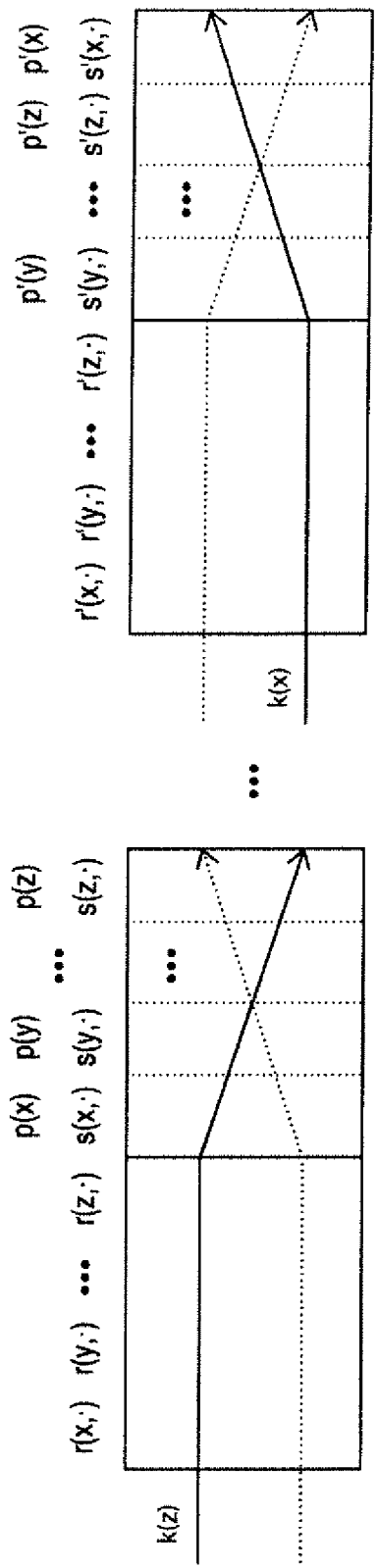
Turning to FIGS. 43A and 43B are combination block and cryptographic schematic diagrams for hybrid sending in accordance with aspects and teachings of the present invention, with FIG. 43A related to the preparing a hybrid sending channel and with FIG. 43A related to the sending of an encrypted payload through an established hybrid sending channel.

Turning to FIG. 43AB, a combination block and cryptographic schematic diagram is provided for hybrid sending in accordance with aspects and teachings of the present invention. FIG. 43A shows the preparing a hybrid sending channel; FIG. 43A shows the sending of an encrypted payload through an established hybrid sending channel.

Referring specifically to FIG. 43A, the cryptographic schematics and block diagram notation already introduced, such as with reference to FIG. 28A-C, is used to show the preparation of a hybrid channel. In particular, for each node a separate mixing is shown in the example. Each such mixing delivers to the respective node a key, which may be called here a "mix-stage" key. For instance, key k(z) is shown delivered to node z in the first mixing. The ellipsis between the two mixing instances shown indicates this process is also conducted for the other nodes, as will readily be appreciated and as indicated further by the final mixing in the set shown.

Figure 43B:
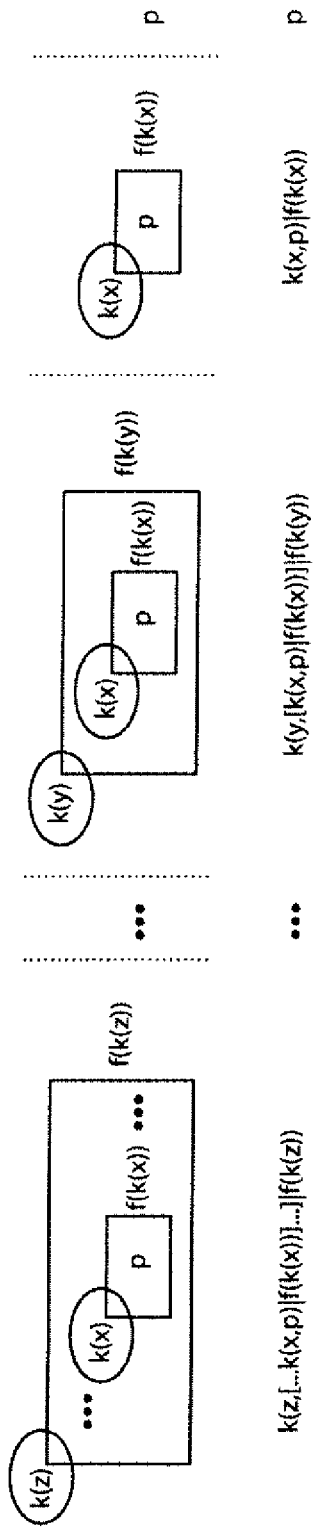

Referring specifically now to FIG. 43B, two separate notations are used to show each stage, one notation on top of the corresponding portion of the other for the same stage. The lower notation shows the composition of encryptions and concatenation, in similar manner to that used widely elsewhere here, with the inclusion of the concatenation or append operation shown as "|" sometimes referred to as "vertical bar." The upper notation is in cryptographic schematic and block diagram style, with corresponding expressions and ellipsis as in the notation below and with concatenation shown as juxtaposition instead of vertical bar. The vertical dotted lines indicate the separation of mix stages, or the processing by a mix, much as already elsewhere here. In particular, the oval containing a key at the upper left corner of a rectangle indicates the encryption with that key of the content of the rectangle.

Accordingly, as will be appreciated, the payload p shown on the right resulted from the final mixing stage, indicate by the vertical dotted line, that takes the element on its left, the encryption of p with key k(x) into the decryption p. The notation k(x,p) denotes the encryption of p with key x, where here as will be appreciated x stands for a key provided to node x in the establishing described with reference to FIG. 43A.

The structure shown to the immediate left of that just described indicates that the key known to node y was used to place a layer of encryption around that just described and concatenated with what may be referred to here as a "fingerprint" or hard to invert or cryptographic one-way function of the key that may be compact but ideally avoids collisions to at least a practical extent. The expression below indicates the essentially the same thing using square brackets to enclose the structure on the right, as will be appreciated. The sequence defined thus begins on the left with the outermost encryption layer formed using the key k(z) as indicated and its concatenated fingerprint.

In operation, the first node in this example, z, receives the data shown on the left of the leftmost dotted line and uses the fingerprint it calculated of the mix-stage key already received in cleartext, during the establishing as already described with reference to FIG. 43A, to locate the cleartext of that received key, by whatever data structure technique, such as lookup in a sorted list or more direct indexing such as using so-called "hash table" techniques. Each node thus proceeds in a similar manner, finding the key using the hash or fingerprint, applying it to remove the layer of encryption, and forwarding on, so the last mix provides the payload as its output.

It will be understood that the example shown for clarity includes mixes applying successive decryption of layers of encryption formed by the sender. In other examples, however, the mixes may actually apply encryption using the keys provided; the recipient would in such examples remove such layers of encryption. For instance, a sender may apply only a single layer of encryption to the payload and provide the recipient with the keys, or a suitable cryptographic method to generate them; layers are added by the successive mixes as the payload passes through them, but the recipient is able to remove the layers because of access to the mix-stage keys.

Figure 44A:
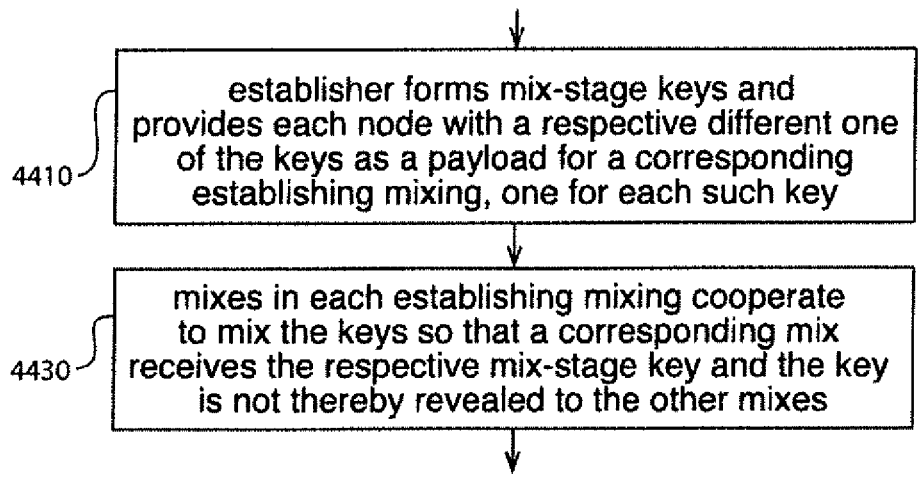
FIGS. 44A and 44B, finally, are combination block diagrams and flowcharts of hybrid sending in accordance with aspects and teachings of the present invention, with FIG. 44A related to preparing a hybrid sending channel and FIG. 44B related to the sending of an encrypted payload through an already established hybrid sending channel.
Figure 44B:
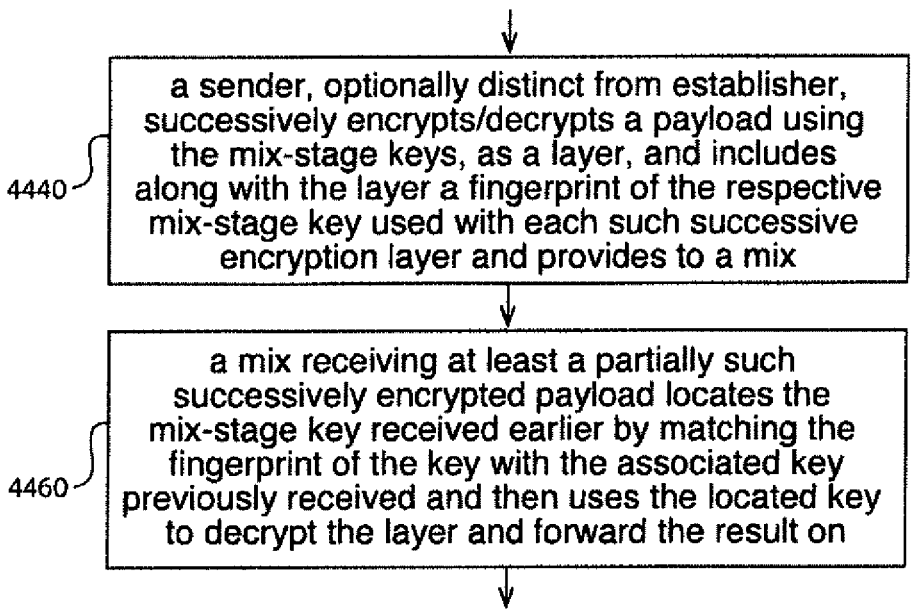

Turning finally now to FIG. 44AB, a combination block diagram and flowchart of hybrid sending is provided in accordance with aspects and teachings of the present invention. FIG. 44A shows preparing a hybrid sending channel; FIG. 44B shows the sending of an encrypted payload through an established hybrid sending channel.

Referring first specifically to FIG. 44A, the establisher entity is shown in box 4410 forming keys, the mix-stage keys already described with reference to FIG. 43A. Forming keys is well known, such as by random number generators and/or cryptographic whitening and so forth. In some such examples, these related keys are readily generated from a seed and this seed may be more convenient to store and/or communicate to other entities. Symmetric keys or stream cipher keys are believed adequate for this purpose, though other types of encryption may be applied as will be understood.

Each mixing node is supplied one of the mix-stage keys. In the example already described with reference to FIG. 43A each node is supplied with an independent key and through independent mixing, thereby providing it is believed independent unlinkability. It will be appreciated by those of skill in the art that the keys may not be fully independent, depending on the threat models and so forth, and also that the independent unlinkability may be diminished in some embodiments and applications, without departing from the spirit of the invention.

Box 4430 shows the mixes cooperating in performing the separate mixing to provide the mix-stage keys to the respective mixes without revealing the keys to other mixes and without revealing the linking between the establisher entity and keys. Moreover, the mix-stage keys may themselves be unlinkable, to whatever extent, as mentioned.

Referring finally specifically now to FIG. 44B, the use of the mix-stage keys already described in sending at least one payload in at least one direction is shown. First box 4440 shows the sender encrypting a payload, thereby forming what may be called here a "layer." The sender may have established the keys and/or the sender may have received the keys or a seed or the like for the keys from the establisher, as will be understood. Each successive enclosing layer of encryption formed has an associated fingerprint, such as appended or concatenated or otherwise included. The sender provides the data to a mix, such as the first mix in a cascade, for instance a fixed cascade or a cascade defined by which nodes know the respective mix-stage keys of the sequence.

Box 4460 finally shows a mix receiving a message as input and providing a corresponding output responsive to at least a mix-stage key previously reachieved, such as from the establishing already described. The mix uses the fingerprint associated with the encrypted portion of the input to find the corresponding key previously received. What may be called "matching the key" or locating it can be by looking up the fingerprint in a list or hash table or whatever data structure as already mentioned may have been used to save it. The key can be used to decrypt the layer (or in other examples mentioned to encrypt the layer) and then forward the result. One example of such forwarding would be to another mix node, such as might be indicated in a header not shown or mentioned elsewhere for clarity or that may be implicit in a fixed cascade ordering. As another example, the result may be the final payload that is published or includes an optional header indicating to whom it should be delivered.

It will be appreciated that the same channel established, such as described with reference to FIG. 44A, can be used to send one or more messages in one or both directions at whatever times and by whatever parties that may have access to the mix-stage keys. As just one example, a first party establisher may provide a seed to a second party and one or more messages may be sent through the mixes using the mix-stage keys generated from the seed as described in whatever combination of directions and at whatever times.

Although the present invention has been described and illustrated in respect to exemplary embodiments, it is to be understood that it is not to be so limited, since changes and modifications may be made therein which are within the full intended scope of this invention as described in the background section and claimed.

The terms and expressions which have been employed in the foregoing specification are used therein as terms of description and not of limitation, and there is no intention, in the use of such terms and expressions, to exclude equivalents of the features shown and described or portions thereof, it being recognized that the scope of the invention is defined and limited only by the description in the background section and claims.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. For instance, the first node may combine the two operations since it can know the subscriber corresponding to a message, in some examples. In other examples, a more general mixing is anticipated through which messages travel differing routes and/or not in a single batch cascade and/or spread out over time in an at least partially randomized way. These and other variations and modifications of the embodiments disclosed herein may be made without departing from the scope and spirit of the invention.

What is claimed is:

1. A cryptographic apparatus comprising:
a plurality of cryptographic node devices, each node device at a substantially different fixed location, and each node a separately-secured device, and each node securing plural substantially different symmetric cryptographic keys;
a plurality of mobile cryptographic unit devices, each unit device separately substantially controlled by a respective user, and each unit device securing plural substantially different symmetric cryptographic keys;
a substantially distinct common key, for each distinct pair of node device and unit device, stored in the respective node device and stored in the respective unit device, and the common key for that respective pair of node and unit substantially available to that respective node and that respective unit exclusively; and
the plurality of cryptographic node devices configured to cooperate in cryptographic transformation of information received by a first one of the node devices from plural unit devices and the resulting information communicated to plural unit devices,
wherein the cryptographic apparatus is configured for digitally mixing at least a batch of items of information to substantially thwart traffic analysis of communication between the unit devices, and further comprises:
one of the nodes, the entry node, first in at least a fixed cascade ordering of the nodes, including communication means to receive from plural unit devices at least parts of a batch comprising plural items of information;
a different one of the nodes from the first node, the exit node, the last node in the at least fixed cascade ordering, including communication means to provide to respective plural unit devices at least respective parts of a batch comprising plural items of information;
intermediate communication means at least connecting nodes, pairwise, in the at least fixed ordering, forming a pairwise communication cascade from the entry node to the exit node;
each node including means to transform each item of information in an input batch, the input batch received over a respective communication means, into an item of information in an output batch, the output batch sent over the corresponding communication means to the next node in the at least fixed ordering and by the exit node to, at least in parts, at least some of the unit devices;
the transformation means of a node for its respective input batch including means to change the order of the items of information in the input batch into a substantially unpredictable, at least without secret key information available to the node, order in its respective output batch; and
the transformation means of a node for its respective input batch including means to make the correspondence between the information item in the input batch, when they correspond to the information item in its respective output batch, substantially unrecognizable, at least without secret key information available to the node.

2. The cryptographic apparatus of claim 1, where cryptographic node devices configured to obtain common keys from a unit device by a technique selected from the set including: public-key protocols, physical meetings, key-guns, out-of-band channels.

3. The cryptographic apparatus of claim 1, where the cryptographic node devices and cryptographic unit devices configured to advance the common key through a one-way forward-secrecy transformation at corresponding times.

4. The cryptographic apparatus of claim 1, where common keys included in respective information items sent by respective unit devices make up a batch received by the entry node, these included common keys being removed from the information items by the respective nodes.

5. The cryptographic apparatus of claim 1, where common keys included in respective information items received by respective unit devices as at least a part of a batch from the exit node and the respective common keys being removed from the information items by the respective unit devices.

6. The cryptographic apparatus of claim 1, where the real time cooperation of the nodes produces an output batch and in advance of the real-time cooperation of the nodes a pre-computation produces pre-computed items of information and the pre-computed items of information then combined with respective items of information in the output batch, such that the combined items of information cancel the effect of at least some information included by the nodes in the output batch and such that the real-time work of the transformation of items by nodes is reduced by at least a factor of ten.

7. The cryptographic apparatus of claim 1, where nodes are configured for coordinated batches, so that when at least a first and a second coordinated batch of information items is received as input, each item in the first input batch is re-arranged in the first output batch to be in the same position as the corresponding item in the same position in the second input batch is re-arranged to in the second output batch.

8. The cryptographic apparatus of claim 7, wherein at least one of the coordinated batches comprise information items containing payload data from the respective unit devices, at least a different batch of the coordinated batches made up of information items containing address information of the respective recipient unit devices.

9. The cryptographic apparatus of claim 1, where nodes configured to make the same fixed substantially cryptographic transformation on information items for each of plural batches, such that the same information item input, in whatever different positions of the plural input batches, results in the same respective information item output for each of the plural output batches.

10. The cryptographic apparatus of claim 1, where nodes are configured to provide a reverse-path batch, corresponding to at least a forward-path batch, and the reverse-path batch traveling through the nodes in the reverse node sequence of the forward-path cascade sequence and the nodes each make, with respect to the forward path re-arrangement, the inverse re-arrangement for the reverse path batch, such that for each information item position in the forward-path input order, the resulting position in the forward-path output order when taken by the reverse path as part of its input batch, results in the original position in the forward-path input order.

11. The cryptographic apparatus of claim 10, where for a transaction the reverse-path provides a confirmation of the transaction to a unit device that initiated the transaction, the confirmation in an information item of the reverse-path that corresponds to the information item in the forward-path batch in which the transaction was initiated, such that the confirmation is substantially assured to have only resulted from the same transaction initiation by the unit device.

12. The cryptographic apparatus of claim 10, where plural separately-secured means each maintain a copy of at least one list of images under a substantially one-way function and only when an image is removed from a list without the addition of corresponding images on at least one of the at least one lists, the nodes allow a return path message indicating such.

13. A cryptographic apparatus comprising:
a plurality of cryptographic node devices, each node device at a substantially different fixed location, and each node a separately-secured device, and each node securing plural substantially different symmetric cryptographic keys;
a plurality of mobile cryptographic unit devices, each unit device separately substantially controlled by a respective user, and each unit device securing plural substantially different symmetric cryptographic keys;
a substantially distinct common key, for each distinct pair of node device and unit device, stored in the respective node device and stored in the respective unit device, and the common key for that respective pair of node and unit substantially available to that respective node and that respective unit exclusively; and
the plurality of cryptographic node devices configured to cooperate in cryptographic transformation of information received by a first one of the node devices from plural unit devices and the resulting information communicated to plural unit devices,
the cryptographic apparatus, configured for private information retrieval, comprising:
plural data items, copies of substantially all the data item stored by each node and the data items having a maximum size;
each node, apart from a distinguished node, combining the same set of data item copies responsive to keying information corresponding to the corresponding requesting unit device;
a requesting unit device request including a string communicated by the unit device to the distinguished node, and the distinguished node combining data items responsive to the string; and
such that in the combination of the items received by the requesting unit device all items but the selected item substantially cancel.

14. The cryptographic apparatus of claim 13, where the outputs of the nodes being combined to messages sent to the requesting unit device substantially of the same total size as the maximum size.

15. The cryptographic apparatus of claim 13, where the nodes encrypting their respective outputs cooperating with the combining of data items, so that the output received by the requesting unit device can be decrypted by the unit device and the data item recovered.

16. The cryptographic apparatus of claim 13, where a node comprises plural distribution devices, each distribution device communicating with plural requesting unit devices, the distribution devices additionally connected to a broadcast network, the distribution devices each combining data items as broadcast over the broadcast network and responsive to requests from requesting unit devices.

* * * * *